US012651827B2

(12) United States Patent
Kim et al.

(10) Patent No.: US 12,651,827 B2
(45) Date of Patent: Jun. 9, 2026

(54) ELECTRONIC DEVICE INCLUDING ANTENNA

(71) Applicant: SAMSUNG ELECTRONICS CO., LTD., Suwon-si (KR)

(72) Inventors: Youngsub Kim, Suwon-si (KR); Juneseok Lee, Suwon-si (KR); Kwanghyun Baek, Suwon-si (KR); Jungyub Lee, Suwon-si (KR); Dohyuk Ha, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 237 days.

(21) Appl. No.: 18/384,156

(22) Filed: Oct. 26, 2023

(65) Prior Publication Data

US 2024/0266716 A1 Aug. 8, 2024

Related U.S. Application Data

(63) Continuation of application No. PCT/KR2023/015656, filed on Oct. 11, 2023.

(30) Foreign Application Priority Data

Feb. 8, 2023 (KR) ........................ 10-2023-0016848

(51) Int. Cl.
*H01Q 1/24* (2006.01)
*H01Q 1/22* (2006.01)
(Continued)

(52) U.S. Cl.
CPC ........... *H01Q 1/246* (2013.01); *H01Q 1/2283* (2013.01); *H01Q 9/16* (2013.01); *H01Q 21/062* (2013.01)

(58) Field of Classification Search
CPC ........ H01Q 1/2283; H01Q 1/246; H01Q 1/38; H01Q 9/0414; H01Q 9/06; H01Q 9/065;
(Continued)

(56) References Cited

U.S. PATENT DOCUMENTS 10,135,133 B2 11/2018 Wu et al.
10,553,945 B2 2/2020 Yong et al.
(Continued)

FOREIGN PATENT DOCUMENTS

KR 10-2021-0038651 A 4/2021
KR 10-2022-0046416 A 4/2022
(Continued)

OTHER PUBLICATIONS

International Search Report (PCT/ISA/210) issued Jan. 22, 2024 by the International Searching Authority in the International Patent application No. PCT/KR2023/015656.
(Continued)

*Primary Examiner* — Jason M Crawford
(74) *Attorney, Agent, or Firm* — Sughrue Mion, PLLC

(57) ABSTRACT

A radio unit (RU) module may include: a first substrate comprising a first surface and a second surface opposite to the first surface; a radio frequency integrated circuit (RFIC); a second substrate comprising a plurality of layers that comprises a plurality of second layers that comprises at least one first layer; a plurality of antenna elements comprising a first antenna element and a second antenna element; and a plurality of conductivity members comprising a conductivity member. The RFIC may be coupled to the first surface of the first substrate. The second substrate may be coupled to the second surface of the first substrate. The plurality of antenna elements may be disposed on the at least one first layer of the second substrate. The plurality of conductivity
(Continued)

members may be disposed across the plurality of second layers of the second substrate.

20 Claims, 28 Drawing Sheets

(51) Int. Cl.
*H01Q 9/16* (2006.01)
*H01Q 21/06* (2006.01)

(58) Field of Classification Search
CPC .... H01Q 9/16; H01Q 21/0025; H01Q 21/062; H01Q 21/065; H01Q 21/24
See application file for complete search history.

(56) References Cited

U.S. PATENT DOCUMENTS 10,797,405 B1 * 10/2020 Baek .................... H01Q 1/2283
10,833,491 B2 11/2020 Robinson
10,950,933 B2 3/2021 Xu et al.
11,139,588 B2 10/2021 Edwards et al.
2016/0049723 A1 * 2/2016 Baks ........................ H01Q 1/22 343/848
2017/0047634 A1 * 2/2017 Kato ........................ H01Q 7/00
2017/0125895 A1 * 5/2017 Baks .................... H01Q 21/065
2018/0159203 A1 * 6/2018 Baks ...................... H01Q 9/045
2018/0358685 A1 * 12/2018 Han ....................... H01Q 21/06
2019/0229413 A1 * 7/2019 Jong ...................... H01Q 1/523
2019/0229426 A1 * 7/2019 Kim ......................... H01Q 1/48
2019/0279950 A1 * 9/2019 Kim .................... H01L 23/3114
2020/0106188 A1 4/2020 Ou et al.
2020/0161766 A1 * 5/2020 Liu ........................ H01Q 9/045
2020/0227832 A1 * 7/2020 Nemoto ............... H01Q 21/065
2020/0243462 A1 * 7/2020 Hsu ...................... H01Q 1/2283
2020/0303805 A1 9/2020 Ryoo et al.
2020/0303806 A1 * 9/2020 Wu ..................... H01L 25/0655
2020/0329556 A1 * 10/2020 Baek ...................... H05K 3/429
2020/0367359 A1 * 11/2020 Baek .................... H05K 1/0222
2021/0036413 A1 2/2021 Kim et al.
2021/0175609 A1 * 6/2021 Ryoo ........................ H01Q 9/42
2021/0203059 A1 7/2021 Ryoo et al.
2021/0257318 A1 * 8/2021 Han .................. H01L 23/49827
2021/0296773 A1 * 9/2021 Baniya ................... H05K 1/181
2021/0384615 A1 * 12/2021 Jia ......................... H01Q 21/065
2022/0085496 A1 3/2022 Nair et al.
2022/0109249 A1 4/2022 Lee et al.
2022/0344806 A1 10/2022 Cho et al.
2023/0019144 A1 * 1/2023 Lee ...................... H01Q 1/2283
2023/0062765 A1 * 3/2023 Jo .......................... H01Q 1/243
2023/0099560 A1 * 3/2023 Ha ......................... H01Q 21/28 343/702
2023/0105182 A1 * 4/2023 Lee ........................ H01Q 1/246 343/702
2023/0129937 A1 * 4/2023 Kim ..................... H01Q 21/065 343/853
2023/0163465 A1 5/2023 Tehran et al.
2023/0163488 A1 * 5/2023 Park ....................... H01Q 21/06 343/893
2023/0187833 A1 * 6/2023 Baek .................... H01Q 9/0414 343/702
2023/0216180 A1 * 7/2023 Lee ........................ H01Q 1/246 343/702
2023/0387598 A1 * 11/2023 Kim ..................... H01Q 21/065
2024/0056520 A1 * 2/2024 Kim ..................... H01Q 15/006
2024/0266716 A1 * 8/2024 Kim ..................... H01Q 21/062
2024/0266738 A1 * 8/2024 Woo ....................... H01Q 5/357
2024/0429621 A1 * 12/2024 Suh ........................ H01Q 21/08

FOREIGN PATENT DOCUMENTS

KR 10-2022-0158558 A 12/2022
KR 10-2022-0158562 A 12/2022
KR 10-2023-0012864 A 1/2023
WO 2020/124315 A1 6/2020

OTHER PUBLICATIONS

Written Opinion (PCT/ISA/237) issued Jan. 22, 2024 by the International Searching Authority in the International Patent application No. PCT/KR2023/015656.
Communication dated Mar. 18, 2026, issued by European Patent Office in European Patent Application No. 23921466.1.

* cited by examiner

902

907

ELECTRONIC DEVICE INCLUDING ANTENNA

CROSS-REFERENCE TO RELATED APPLICATIONS

This application is a by-pass continuation application of International Application No. PCT/KR2023/015656, filed on Oct. 11, 2023, which is based on and claims priority to Korean Patent Application No. 10-2023-0016848, filed on Feb. 8, 2023, in the Korean Intellectual Property Office, the disclosures of which are incorporated by reference herein their entireties.

BACKGROUND

1. Field

The following description relates to an electronic device including an antenna.

2. Description of the Relate Art

A beamforming technique is used as one of the technologies for mitigating propagation path loss and increasing transmission distance of radio waves. In general, the beamforming technique uses multiple antennas to concentrate the reach area of radio waves on a certain area or increase the directivity of reception sensitivity to a particular direction. In order to improve communication performance, products equipped with multiple antennas are being developed, and the equipment with a much larger number of antennas is expected to be used in the future.

When multiple antennas serving multiple frequency bands are used in an electronic device, such as a wireless phone, interferences of the multiple antennas cause degradation of signals. Thus, methods and systems to reduce the inferences need to be developed.

SUMMARY

According to an aspect of the disclosure, a radio unit (RU) module may include: a first substrate comprising a first surface and a second surface opposite to the first surface; a radio frequency integrated circuit (RFIC); a second substrate comprising a plurality of layers that comprises a plurality of second layers that comprises at least one first layer; a plurality of antenna elements comprising a first antenna element and a second antenna element; and a plurality of conductivity members comprising a conductivity member. The RFIC may be coupled to the first surface of the first substrate. The second substrate may be coupled to the second surface of the first substrate. The plurality of antenna elements may be disposed on the at least one first layer of the second substrate. The plurality of conductivity members may be disposed across the plurality of second layers of the second substrate. The conductivity member may be disposed across a first area in the plurality of second layers. The conductivity member may be disposed between the first antenna element and the second antenna element.

According to an aspect of the disclosure, an electronic device for a base station, may include: a power supply; at least one processor; a first substrate coupled to the power supply and the at least one processor; a plurality of radio frequency integrated circuits (RFICs) coupled to a first surface of the first substrate; and a plurality of second substrates coupled to a second surface of the first substrate.

The second surface may be opposite to the first surface of the first substrate. Each of the plurality of second substrates may be coupled to an RFIC of the plurality of RFICs. Each of the plurality of second substrates may include: a plurality of antenna elements disposed on at least one first layer of a plurality of layers of the second substrate; and a plurality of conductivity members disposed across a plurality of second layers comprising the at least one first layer. The plurality of antenna elements may comprise a first antenna element and a second antenna element. The plurality of conductivity members may comprise a conductivity member disposed across a first area in the plurality of second layers. The conductivity member may be disposed between the first antenna element and the second antenna element.

BRIEF DESCRIPTION OF THE DRAWINGS

The above and other aspects, features, and advantages of certain embodiments of the disclosure will be more apparent from the following description taken in conjunction with the accompanying drawings, in which.

In connection with the description of the drawings, the same or similar reference numerals may be used for the same or similar components.

DETAILED DESCRIPTION

Figure 1:
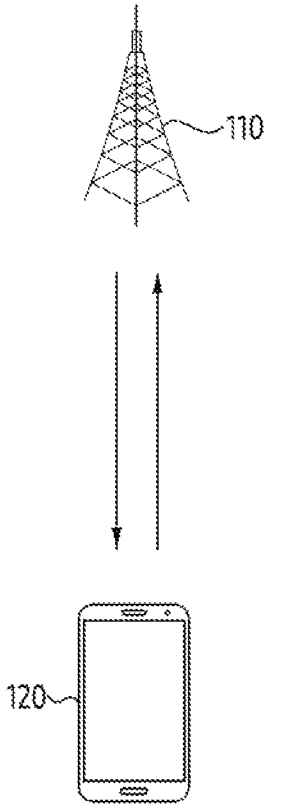
FIG. 1 illustrates an example of a wireless communication system.

The terms used in the disclosure are used only to describe specific embodiments and may not be intended to limit the scope of other embodiments. Singular expressions may include plural expressions unless the context clearly dictates otherwise. The terms used herein, including technical or scientific terms, may have the same meaning as those generally understood by those having ordinary knowledge in the technical field described in the disclosure. Among the terms used in the disclosure, terms defined in a general dictionary may be interpreted as having the same or similar meaning as those referred to in the context of the related art, and are not to be interpreted in an ideal or excessively formal meaning unless clearly defined in the disclosure. In some cases, even the terms defined in the disclosure cannot be interpreted to exclude embodiments of the disclosure.

In one or more embodiments of the disclosure described below, a hardware approach method will be described as an example. However, since one or more embodiments of the disclosure include technologies that utilize both hardware and software, one or more embodiments of the disclosure are not to exclude a software-based approach.

As used herein, terms referring to parts of a device (e.g., substrate, printed circuit board (PCB), flexible PCB (FPCB), module, antenna, antenna element, circuit, processor, chip, component, device, radiator, resonator, etc.), terms referring to the shape of parts (e.g., structure, construction, support, contact, protrusion, etc.), terms referring to connection between structures (e.g., connection, contact, support, assembly, etc.), terms referring to circuits (e.g., PCB, FPCB, line, signal line, feeding line, data line, RF signal line, RF path, RF module, RF circuit, etc.), and the like are illustrated for convenience of explanation. Therefore, the disclosure is not limited to the terms to be described below, and other terms having any equivalent technical meaning may be used. Further, as used herein, the terms '~part', '~ unit', '~ module', '~ device' or the like may refer to as least one structure of shape or a unit for processing a certain function.

In addition, in the disclosure, expressions 'greater than' or 'less than' may be used to determine whether a specific condition is satisfied or fulfilled, but this is only a description for expressing an example and does not exclude the description 'greater than or equal to' or 'less than or equal to'. Conditions described as 'greater than or equal to' may be replaced with 'greater than', conditions described as 'less than or equal to' may be replaced with 'less than', and conditions described as 'greater than or equal to and less than' may be replaced with 'greater than and less than or equal to'. Further, hereinafter, 'A' to 'B' refers to at least one of elements from A to (including A) to B (including B). Hereinafter, 'C' and/or 'D' refer to including at least one of 'C' or 'D', that is, {'C', 'D', 'C' and 'D'}.

The terms as used in the disclosure are provided to merely describe specific embodiments, not intended to limit the scope of other embodiments. Singular forms include plural referents unless the context clearly dictates otherwise. The terms and words as used herein, including technical or scientific terms, may have the same meanings as generally understood by those skilled in the art. The terms as generally defined in dictionaries may be interpreted as having the same or similar meanings as or to contextual meanings of the relevant art. Unless otherwise defined, the terms should not be interpreted as ideally or excessively formal meanings. Even though a term is defined in the disclosure, the term should not be interpreted as excluding embodiments of the disclosure under circumstances.

The term "couple" and the derivatives thereof refer to any direct or indirect communication between two or more elements, whether or not those elements are in physical contact with each other. The terms "transmit", "receive", and "communicate" as well as the derivatives thereof encompass both direct and indirect communication. The terms "include" and "comprise", and the derivatives thereof refer to inclusion without limitation. The term "or" is an inclusive term meaning "and/or". The phrase "associated with," as well as derivatives thereof, refer to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" refers to any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of A, B, and C" includes any of the following combinations: A, B, C, A and B, A and C, B and C, and A and B and C, and any variations thereof. Similarly, the term "set" means one or more. Accordingly, the set of items may be a single item or a collection of two or more items.

FIG. 1 illustrates an example wireless communication system.

FIG. 1 illustrates a base station 110 and a terminal 120 as a part of nodes using a wireless channel in a wireless communication system. Although FIG. 1 illustrates only one base station, a wireless communication system may further include another base station that is the same as or similar to the base station 110.

The base station 110 is a network infrastructure that provides wireless access to the terminal 120. The base station 110 has a coverage that is defined as a certain geographic area based on a reach distance capable of transmitting a signal. The base station 110 may be referred to as 'access point (AP)', 'eNodeB (eNB)', '5th generation node (5G node)', 'wireless point', 'transmission/reception point (TRP)', or any other term having the same or equivalent technical meaning thereto, in addition to the base station.

The terminal 120 is a device that is used by a user to perform communication with the base station 110 over a wireless channel. In some cases, the terminal 120 may operate without any user involvement. In other words, the terminal 120 is a device that performs machine-type communication (MTC) and may not be carried by a user. The terminal 120 may be referred to as 'user equipment (UE)', 'mobile station', 'subscriber station', 'customer premises equipment (CPE)', 'remote terminal', 'wireless terminal', 'electronic device', 'user device', or any other terms having the same or identical technical meaning thereto, in addition to the terminal.

A beamforming technique is used as one of the technologies for mitigating propagation path loss and increasing transmission distance of radio waves. In order to establish a beamforming coverage rather than forming a signal in an isotropic pattern by using a single antenna, a communication apparatus may have a plurality of antennas. Hereinafter, an antenna array with a plurality of antennas is described in greater detail. The base station 110 or the terminal 120 may include an antenna array. Each antenna included in the antenna array may be referred to as an array element or an antenna element. Hereinafter, such an antenna array is illustrated as a two-dimensional planar array, but it is only of an example embodiment and is not intended to limit other embodiments of the disclosure thereto. The antenna array may be configured of various forms, such as e.g., a linear array or a multi-layer array. That antenna array may be referred to as a massive antenna array.

One of main techniques for improving the data capacity in 5G communications is a beamforming technique using antenna arrays connected with multiple RF paths. For increasing the communication performance, the number of components that perform wireless communications is increasing. In particular, the number of antennas, and RF elements (e.g., amplifiers, filters) and various components for use in processing RF signals received or transmitted through the antennas also increases, it is essentially required to achieve better spatial gain and cost efficiency while meeting communication performance in configuration of communication equipment.

Figure 2A:
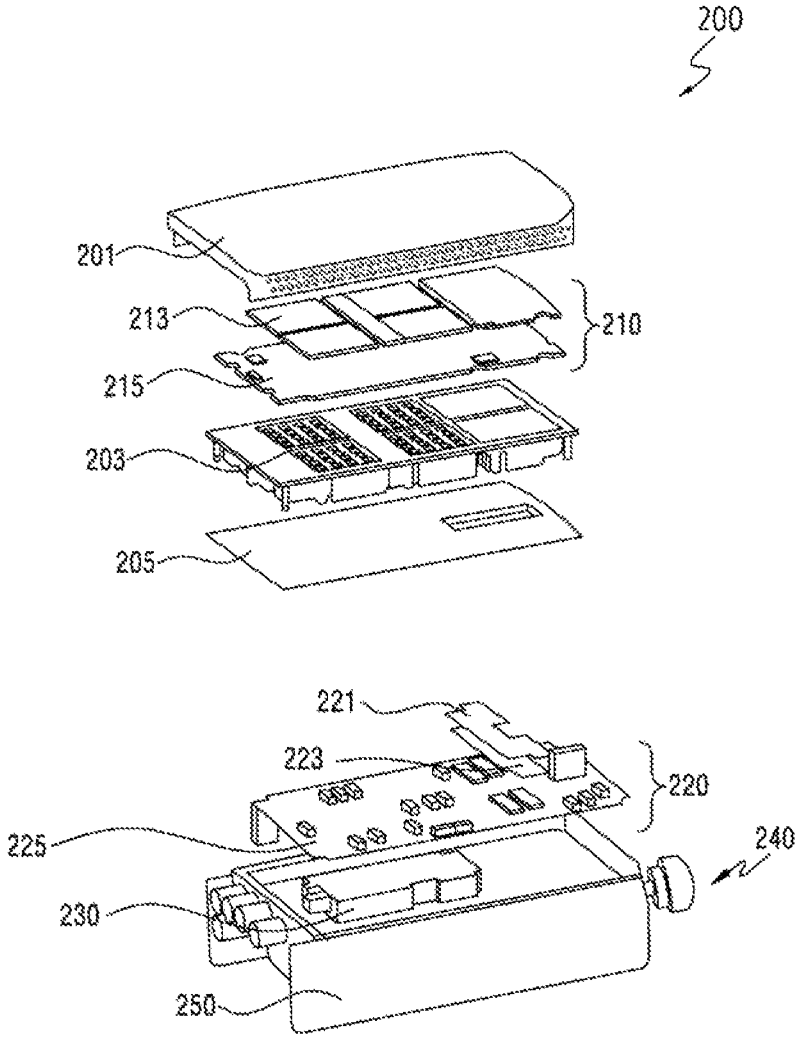
FIGS. 2A and 2B illustrate examples of components of an electronic device.
Figure 2B:
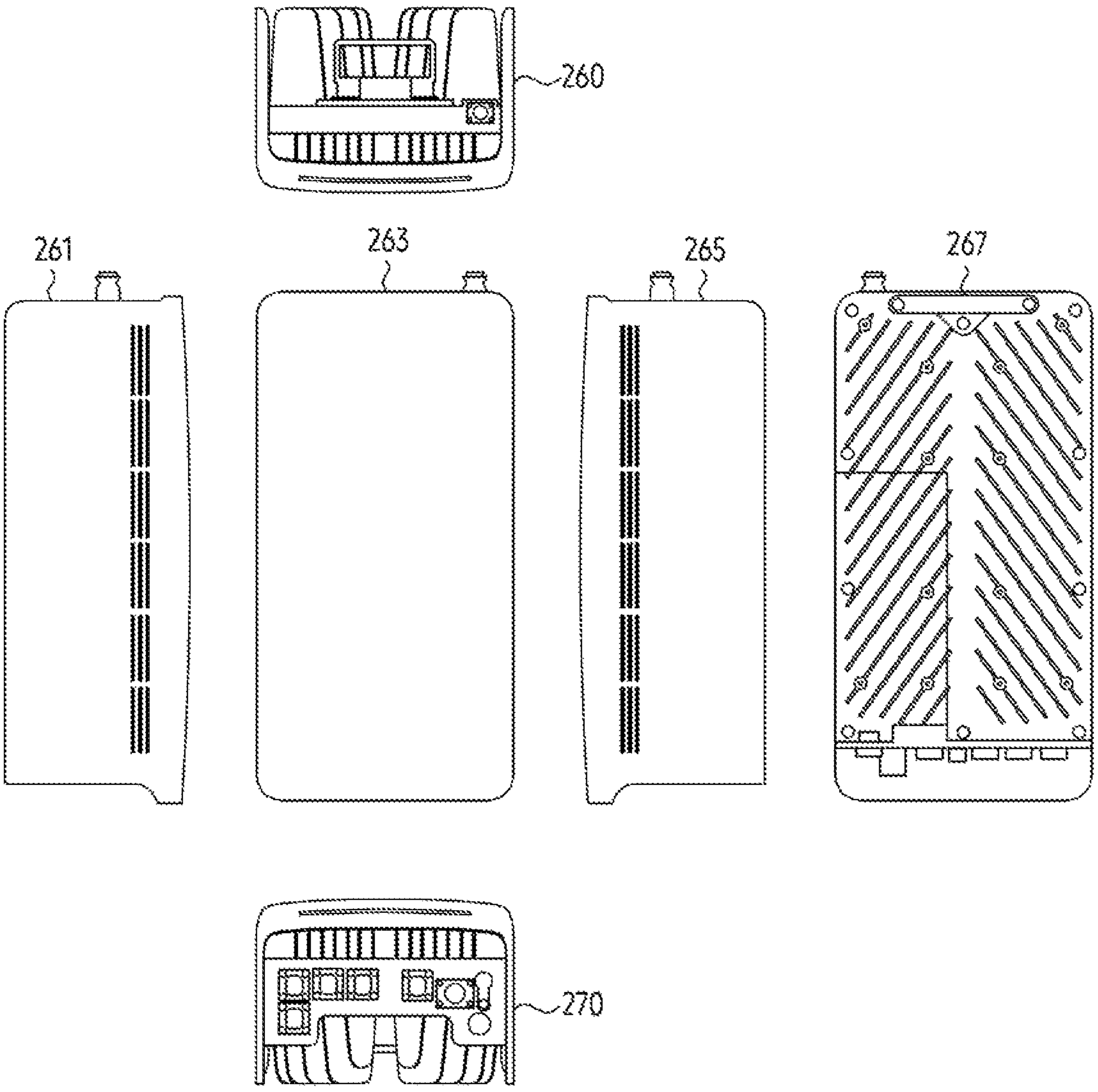

FIGS. 2A and 2B illustrate examples of components of an electronic device.

FIG. 2A shows internal components making up an electronic device 200. FIG. 2B illustrates six surfaces (e.g., top surface, bottom surface, side surfaces, back surface, and front surface) of the electronic device 200. The electronic device 200 illustrates the base station 110 of FIG. 1 as an example, but the following description of the electronic device 200 may be also applicable to the terminal 120.

Referring to FIG. 2A, the electronic device 200 may include a radome cover 201 (or a radome), a radio unit (RU) housing 203, a digital unit (DU) cover 205, and an RU module 210. The RU module 210 may include an antenna module 213 and an RU board 215. Radio Frequency (RF) components for the antenna module 213 may be disposed on the RU board 215. The RF components may include at least one of a connector for providing power, a DC/DC converter, a field programmable gate array (FPGA), a low dropout regulator (LDO regulator), or a local oscillator (LO). The RU module 210 may include an antenna module that includes a decoupling conductivity member (or a decoupling resonator) that is disposed along with an antenna element according to embodiments of the disclosure to be described later.

A substrate on which the antenna module 213 is disposed may be referred to as an antenna board, an antenna substrate, a radiating substrate, a radiating board, or an RF board. For example, the substrate on which the antenna module 213 is disposed may be a printed circuit board (PCB). Further, for example, the substrate on which the antenna module 213 is disposed may be a flexible PCB (FPCB). The RU board 215 may be referred to as a main board, a main substrate, a power board, a mother board, a package board, or a filter board. The RU module 210 may be referred to as a baseband unit (BBU) or a baseband equipment. In order to refer to an integrated-type base station installed with the RU module 210, terms such as an access unit (AU), a compact macro, or a link cell may be used instead to describe the operation and functionality of the RU module 210.

The electronic device 200 may include a DU module 220. The DU module 220 may include an interface board 221, a modem board 223, and a central processing unit (CPU) board 225. The electronic device 200 may include a power module 230, a global positioning system (GPS) 240, and a DU housing 250. The DU module 220 may be referred to as a radio unit (RU) or a remote radio head (RRH).

Referring to FIG. 2B, a drawing indicated by a reference numeral 260 illustrates a top view of the electronic device 200. Further, drawings indicated by reference numerals 261, 263, 265, and 267 illustrate schematic views of the electronic device 200 viewed from the left, the front, the right, and the rear, respectively. A drawing indicated by a reference numeral 270 illustrates a bottom view of the electronic device 200 taken from below.

Figure 3A:
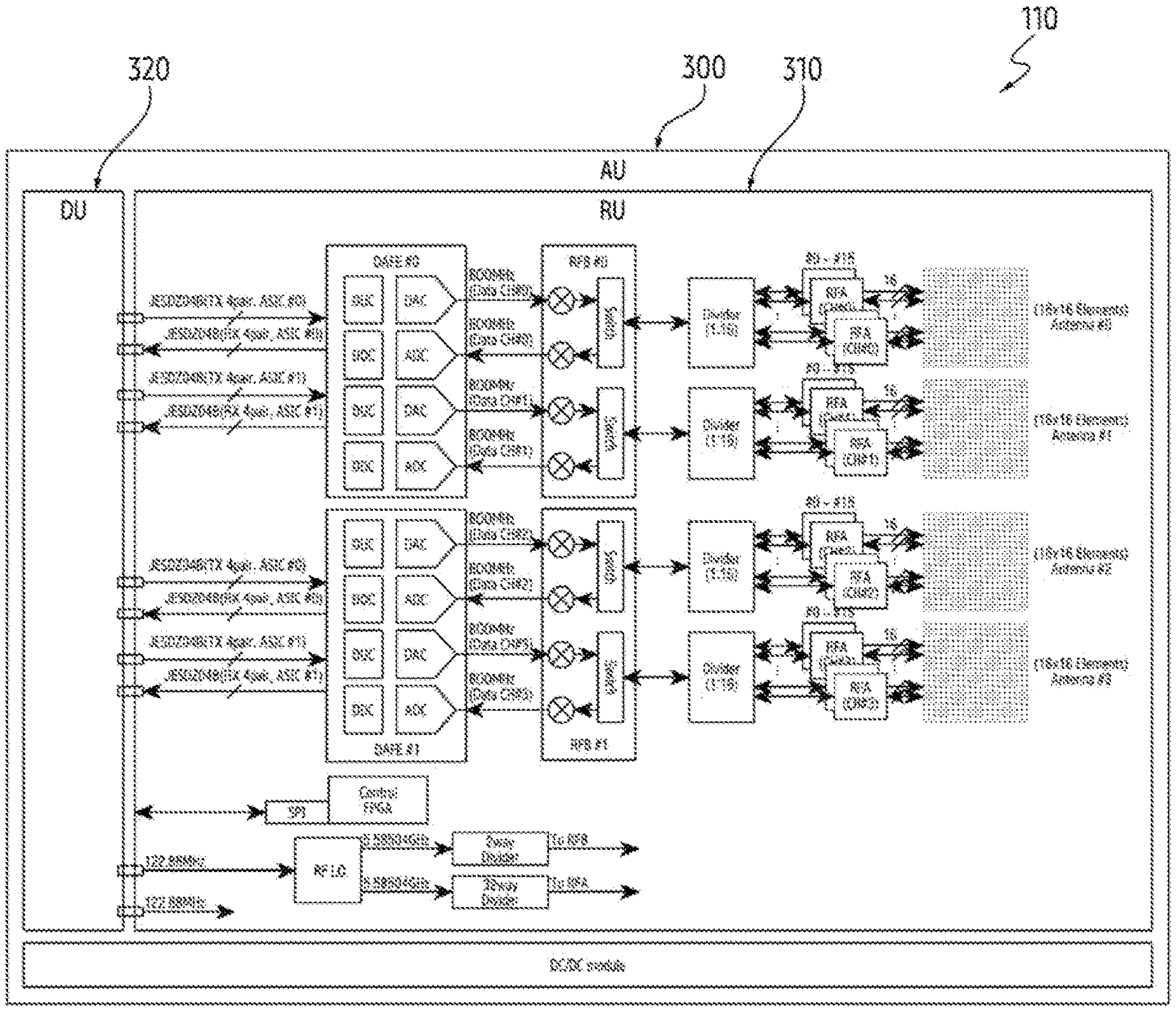
FIGS. 3A and 3B illustrate examples of functional configurations of an electronic device.
Figure 3B:
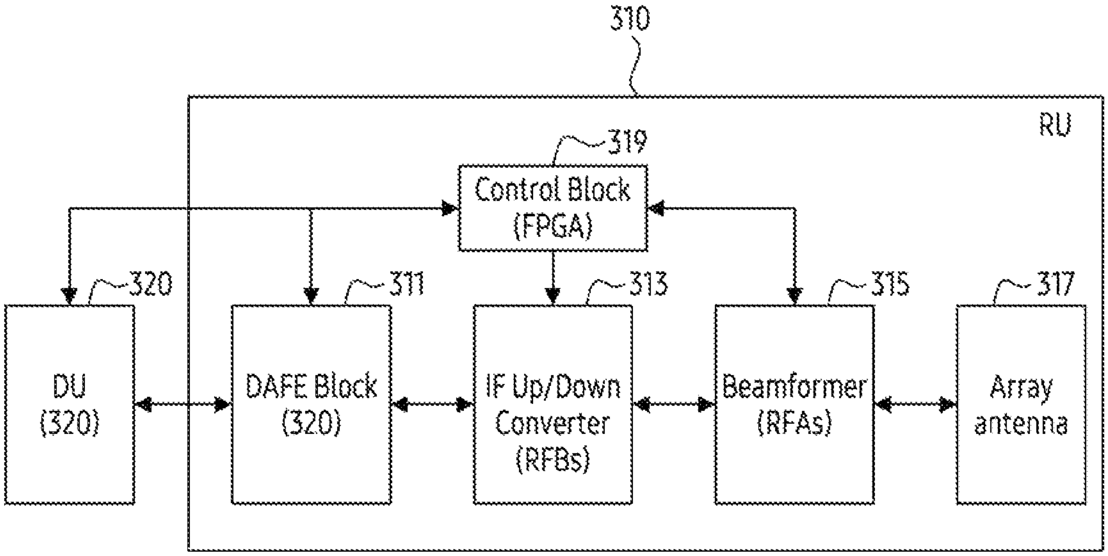

FIGS. 3A and 3B illustrate examples of functional configurations of the electronic device, respectively.

FIGS. 3A and 3B illustrate examples of functional configurations of the electronic device (e.g., the base station 110 or the terminal 120 of FIG. 1, the electronic device 200 of FIG. 2A). The electronic device may include an access unit (AU) 300. The AU 300 may include an RU 310, a DU 320, and a DC/DC module. For example, the RU 310 may refer to an assembly in which antennas and RF components are mounted. For example, the DU 320 may be configured to process digital wireless signals, encrypt the digital wireless signals to be transmitted to the RU 310, or decrypt the digital wireless signals received from the RU 310. The DU 320 may be configured to process packet data to perform communications with a higher node (e.g., a centralized unit (CU)) or a core network (e.g., 5GC, EPC).

Referring to FIG. 3A, the RU 310 may include a plurality of antenna elements. The RU 310 may include one or more array antennas. For example, the array antennas may be configured as a planar antenna array. The array antennas may correspond to one stream. The array antennas may include a plurality of antenna elements corresponding to one transmit path (or receive path). For example, the array antenna may include 256 antenna elements configured in a 16×16 arrangement. However, embodiments of the disclosure are not limited thereto, and the array antenna may include a plurality of antenna elements. For example, the array antenna may include 384 antenna elements configured in a 16×18 matrix configuration.

The RU 310 may include RF chains for processing signals from each array antenna. The RF chains may be referred to as 'RFA'. The RFA may include RF components for beamforming (e.g., phase converters, power amplifiers) and a mixer. The mixer of the RFA may be configured to down-convert an RF frequency of signal to an intermediate frequency of signal or up-convert an intermediate frequency of signal to an RF frequency of signal. According to an embodiment, one set of RF chains may correspond to one array antenna. As an example, the RU 310 may include four sets of RF chains for four array antennas. A plurality of RF chains may be connected with a transmit path or a receive path via a divider (e.g., 1:16 divider). According to an embodiment, the RF chains may be implemented as a radio frequency integrated circuit (RFIC). The RFIC may be configured to process and generate RF signals that are provided to a plurality of antenna elements.

The RU 310 may include at least one digital-analog front-end (DAFE) and at least one block 'RFB'. The DAFE may be configured to convert digital and analog signals to each other. For example, the RU 310 may include two DAFEs (DAFE #0, DAFE #1). The DAFEs may be configured to, in the transmit path, up-convert a digital signal (i.e., digital up-converting (DUC)) and convert the up-converted signal to an analog signal (i.e., digital-to-analog converting (DAC)). In the receive path, the DAFE may be configured to convert an analog signal to a digital signal (i.e., analog-to-digital converting (ADC)) and down-convert the digital signal (i.e., digital down-converting (DDC)). For example, the RFB may include mixers and switches corresponding to the transmit path and the receive path, respectively. The mixer of the RFB may be configured to up-convert a baseband frequency to an intermediate frequency or down-convert an intermediate frequency of signal to a baseband frequency of signal. A switch of the RFB may be configured to select one of the transmit path and the receive path. In an example, the RU 310 may include two RFBs (RFB #0, RFB #1).

The RU 310, which is a controller, may include afield programmable gate array (FPGA). The FPGA refers to a semiconductor device that includes designable logic elements and programmable internal circuitry. It may communicate with the DU 320 via serial peripheral interface (SPI) communication.

The RU 310 may include an RF local oscillator (RF LO). The RF LO may be configured to provide a reference frequency for up-conversion or down-conversion. According to an embodiment, the RF LO may be configured to provide a frequency for up-conversion or down-conversion of the RFB. For example, the RF LO may supply a reference frequency to RFB #0 and RFB #1 through a 2-way divider.

For example, the RF LO may be configured to provide frequencies for up-conversion or down-conversion of the RFAs. For example, the RF LO may provide a reference frequency to each of the RFAs (eight in each RF chain for each polarization group) via a 32-way divider.

Referring to FIG. 3B, the RU 310 may include a DAFE block 311, an IF up/down converter 313, a beamformer 315, an array antenna 317, and a control block 319. The DAFE block 311 may convert a digital signal to an analog signal or convert an analog signal to a digital signal. The IF up/down converter 313 may correspond to the RFB (e.g., the RFB of FIG. 3A). The IF up/down converter 313 may convert a baseband frequency of signal to an IF frequency of signal, or convert an IF frequency of signal to a baseband frequency of signal, based on a reference frequency supplied by the RF LO. The beamformer 315 may correspond to the RFA (e.g., the RFA of FIG. 3A). The beamformer 315 may convert an RF frequency of signal to an IF frequency of signal, or convert an IF frequency of signal to an RF frequency of signal, based on the reference frequency supplied by the RF LO. The array antenna 317 may include a plurality of antenna elements. Each antenna element of the array antenna 317 may be configured to radiate a signal processed through the RFA. The array antennas 317 may be configured to perform beamforming according to the phase applied by the RFA. The control block 319 may control each block of the RU 310 to perform commands from the DU 320 and the signal processing as described above.

While in FIGS. 2A, 2B, 3A and 3B the base station 110 is illustrated as an example of the electronic device 200, embodiments of the disclosure are not limited to the base station 110. The embodiments of the disclosure may be applied to any electronic devices for radiating wireless signals as well as the base station including a DU and/or an RU.

Figure 4:
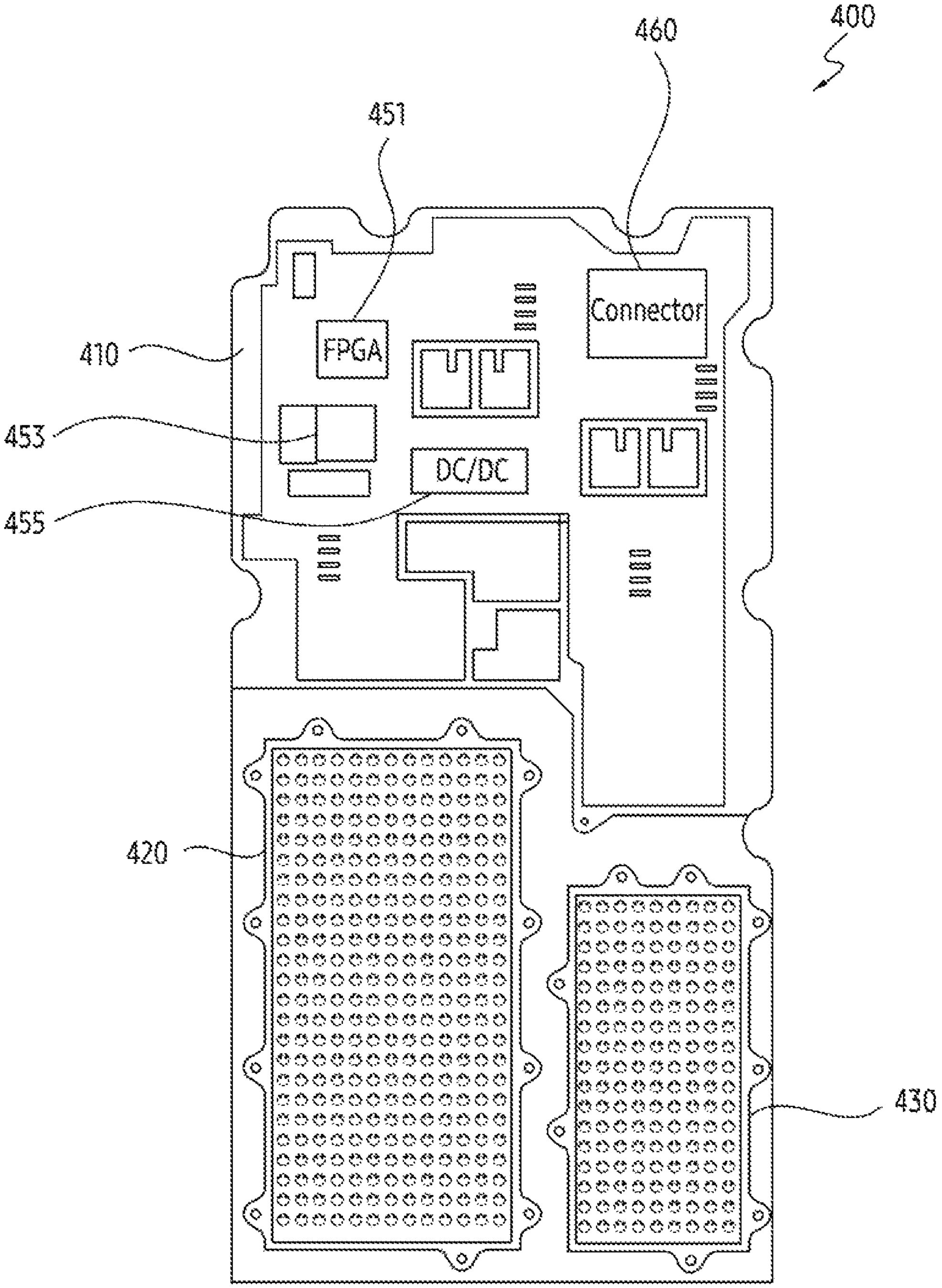
FIG. 4 illustrates an example of a radio unit (RU) module of an electronic device.

FIG. 4 illustrates an example of a radio unit (RU) module of an electronic device. For example, the RU module 400 may include the RU module 210 of FIG. 2A. For example, the electronic device including the RU module 400 may include a base station 110, a terminal 120, or an electronic device 200.

Referring to FIG. 4, the RU module 400 may include a substrate (hereinafter, referred to as a first substrate) (e.g., PCB) on which antenna modules and components for signal processing (e.g., connector, direct current (DC)/DC converter, DFE, etc.) are mounted. The RU module 400 may include a substrate (hereinafter, referred to as a second substrate) (e.g., PCB, FPCB) on which the antennas of the antenna module are mounted. The first substrate may be referred to as an RU board, a main board, a power board, a mother board, a package board, or a filter board. The second substrate may be referred to as an antenna board, an antenna substrate 420 or 430, a radiation substrate, a radiation board, or an RF board. Hereinafter, the first substrate will be referred to and described as an RU board and the second substrate will be referred to and described as an antenna substrate, but any other term having an equivalent technical meaning thereto may be used interchangeably.

The RU board 410 may include components for transmitting signals to a radiator (e.g., an antenna). According to an embodiment, one or more second substrates may be disposed on the RU board 410. The one or more second substrates may include an antenna substrate 420 for a first frequency band (e.g., about 28 GHz band) and an antenna substrate 430 for a second frequency band (e.g., about 39 GHz band). In other words, one or more array antennas may be mounted on the RU board 410. For example, two array antennas may be mounted on the RU board 410. An array antenna for the first frequency band may be disposed on one area of the RU board 410. Further, another array antenna for the second frequency band may be disposed on another area of the RU board 410.

In FIG. 4, two antenna modules and array antennas supporting two frequency bands are illustrated, but the embodiments of the disclosure are not limited thereto. To support dual bands, two array antennas may be disposed for each band, and the array antennas mounted on the RU board 410 may be configured to support 2-transmit 2-receive (2T2R) feature.

The RU board 410 may include components for supplying RF signals to the antennas. For example, the RU board 410 may include one or more radio frequency programmable gain amplifiers (FPGAs) 451. Further, for example, the RU board 410 may include one or more local oscillators (LOs) 453. The LOs 453 may be utilized in the RF system to provide a reference frequency for up-conversion or down-conversion. Further, for example, the RU board 410 may include one or more DC/DC converters 455. The DC/DC converters 455 may be used to convert direct current to direct current. Further, for example, the RU board 410 may include one or more connectors 460. The connectors 460 may be used to transfer electrical signals. The RU board 410 may further include various components for signal processing. For example, the RU board 410 may include one or more dividers. The dividers may be used to distribute input signals to transmit the signals via multi-path. Further, for example, the RU board 410 may include one or more low dropout regulators (LDOs). The LDOs may be used to suppress external noise and provide necessary power. Further, for example, the RU board 410 may include one or more voltage regulator modules (VRMs). The VRM may refer to a module for ensuring that a proper voltage level is maintained. Further, for example, the RU board 410 may include one or more digital front ends (DFEs). Further, for example, the RU board 410 may include one or more intermediate frequency (IF) processing units. Further, for example, the RU board 410 may include RF filters for filtering signals.

While FIG. 4 illustrates an exemplary arrangement and configuration for the RU board 410, in other examples, some of the components illustrated in FIG. 4 may be omitted and/or a greater number of such components may be mounted.

Figure 5A:
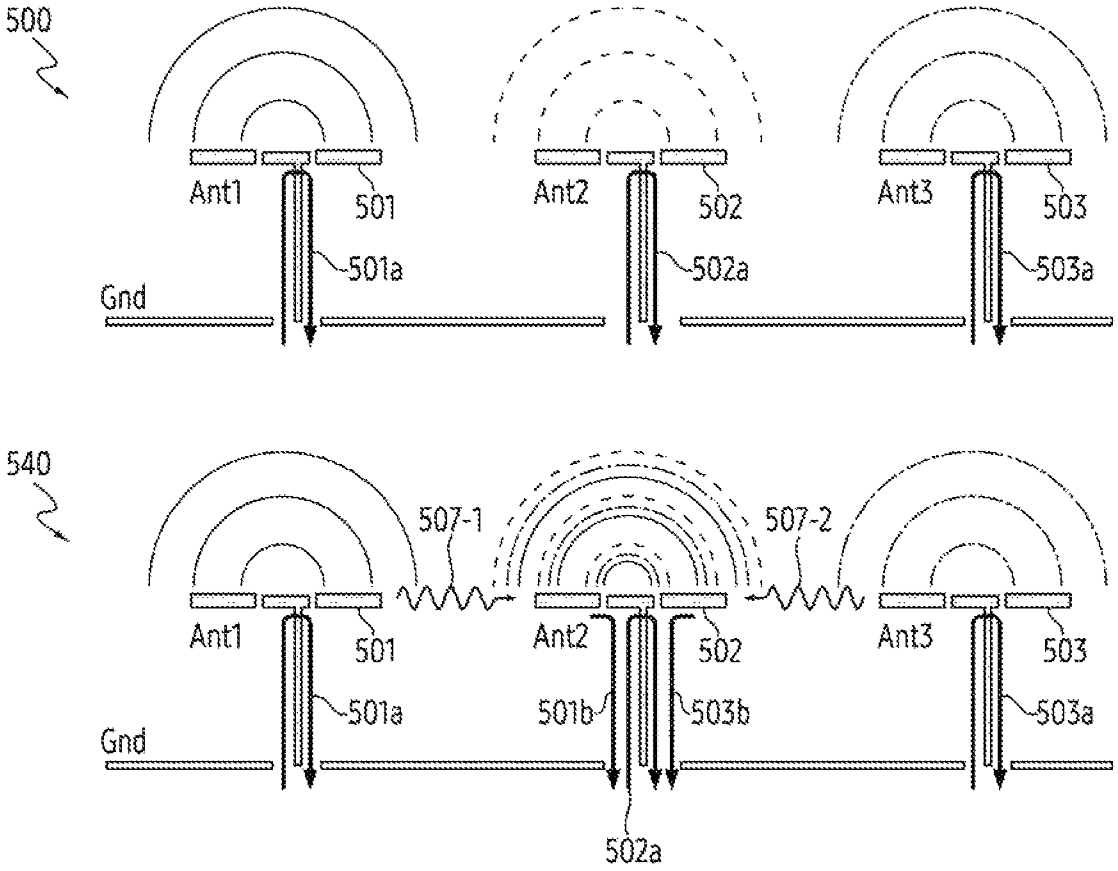
FIG. 5A illustrates an example of interference between antenna elements.

FIG. 5A illustrates an example of interference between antenna elements. For example, the antenna elements may be disposed on a second substrate (e.g., antenna substrate 420, antenna substrate 430) of the RU board 410 of FIG. 4. The antenna elements on the second substrate may include radiators for transmitting and receiving wireless signals. Hereinafter, description will be made of the operation based on the RU module 400 including the RU board 410, but the embodiments of the disclosure are not limited thereto. In addition to the RU module 400 of FIG. 4 (or the RU module 210 of FIG. 2A), the electronic device including the RU board 410 may include a base station 110 of FIG. 1, a terminal 120 of FIG. 1, an electronic device 200 of FIG. 2A, or a separate device for radiating a wireless signal.

Referring to FIG. 5A, the RU module 400 may include an array antenna. The array antenna may include a plurality of antenna elements. For example, the RU module 400 may include a first antenna element 501, a second antenna element 502, and a third antenna element 503.

A radiation environment 500 represents a situation where no interference occurs between the antenna elements of the array antenna. Referring to the radiation environment 500, when the first antenna element 501 radiates a first signal, some component 501*a* of the first signal fed to the first antenna element 501 may be reflected. Further, when the second antenna element 502 radiates a second signal, some component 502*a* of the second signal fed to the second antenna element 502 may be reflected. Furthermore, when the third antenna element 503 radiates a third signal, some component 503*a* of the third signal fed to the third antenna element 503 may be reflected.

Under the radiation environment 500 of FIG. 5A, while each of the first antenna element 501, the second antenna element 502, and the third antenna element 503 radiates a signal, the signal radiated by a particular antenna element may not affect the other antenna elements. The influence may be referred to as interference, interfering component, interference signal, or mutual coupling with respect to the other antenna elements.

Compared to the radiation environment 500, another radiation environment 540 represents a situation where interference between antenna elements has occurred. Referring to the radiation environment 540, the first antenna element 501 may radiate a first signal, the second antenna element 502 may radiate a second signal, and the third antenna element 503 may radiate a third signal. For example, while the second antenna element 502 is radiating the second signal, interference signals from other antenna elements may be received (or transmitted, introduced) into the second antenna element 502. For example, the second antenna element 502 may be configured to receive an interference signal 507-1 from the first antenna element 501. Further, the second antenna element 502 may be configured to receive an interference signal 507-2 from the third antenna element 503. In other words, when the second antenna element 502 radiates a signal, components 501*b* and/or 503*b* by other antenna elements may be introduced along with some components 502*a* of the second signal transferred to the second antenna element 502. For example, the component 501*b* by the interference signal 507-1 and the component 503*b* by interference signal 507-2 as well as some components 502*a* of the second signal transferred to the second antenna element 502 may be reflected.

While FIG. 5A only illustrates the interference signal 507-1 by the first antenna element 501 and the interference signal 507-2 by the third antenna element 503, for the second antenna element 502, for convenience of description, the embodiments of the disclosure are not limited thereto. For example, to the first antenna element 501 may be received an interference signal from the third antenna element 503.

Referring to the foregoing description, it may be ideal that no interference exists between antenna elements in the array antenna (e.g., the antenna elements 501, 502 and 503 of FIG. 5A). However, as the technology continues to evolve, in transmitting high frequency signals, a large number of antenna elements may be arranged in a limited area of array antenna, taking into account the propagation characteristics of the signal (such as, e.g., beam gain, beam pattern, etc.), and thus, interference may occur due to coupling between those antenna elements. For example, the interference may be represented by a mutual coupling coefficient between the antenna elements. For example, the mutual coupling coefficient may be represented by the following mathematical equation:

$$\Gamma = \sum_{m}\sum_{n} S_{mn}\left(\frac{V_{mn}}{V_{00}}\right) \quad \text{[Equation 1]}$$

Here, Γ indicates the mutual coupling coefficient. When the structure of a planar array antenna is configured in an A×B matrix arrangement (e.g., A rows and B columns), 'm' indicates a row index and 'n' represents a column index. Herein, '$S_{mn}$' indicates a constant representing an interference component introduced from the antenna element with an index (0, 0) to the antenna element with an index (m, n). '$V_{mn}$' indicates a voltage of a signal radiated from the antenna element with the index (m, n), and '$V_{00}$' indicates a voltage of a signal radiated from the antenna element with the index (0, 0). In the above example, the antenna element having the index (0, 0) may represent a reference antenna element to be measured.

Referring to the aforementioned mathematical equation, for a particular antenna element, a signal radiated by other antenna elements may function as interference for the particular antenna element. In case where such interference (i.e., mutual coupling) increases, the isolation characteristics between the antenna elements may deteriorate. As the isolation characteristics deteriorate, the signal radiation efficiency (or energy efficiency) and the antenna gain may decrease. Further, while a particular antenna element radiates a signal, the characteristics of the active scattering parameter may deteriorate representing the influence of interference by other antenna elements.

To address the above-described problems, proposed are an RU module 400 comprising a conductivity member (hereinafter, referred to as a decoupling conductivity member) for reducing a mutual coupling component, by using phase cancellation interference with signals between antenna elements according to embodiments of the disclosure, and an electronic device 200 comprising the RU module 400. For example, the decoupling conductivity member may be referred to as a decoupling resonator. For example, the electronic device 200 may be included in the base station 110 of FIG. 1, the terminal 120 of FIG. 1, or a separate device for radiating a wireless signal.

Figure 5B:
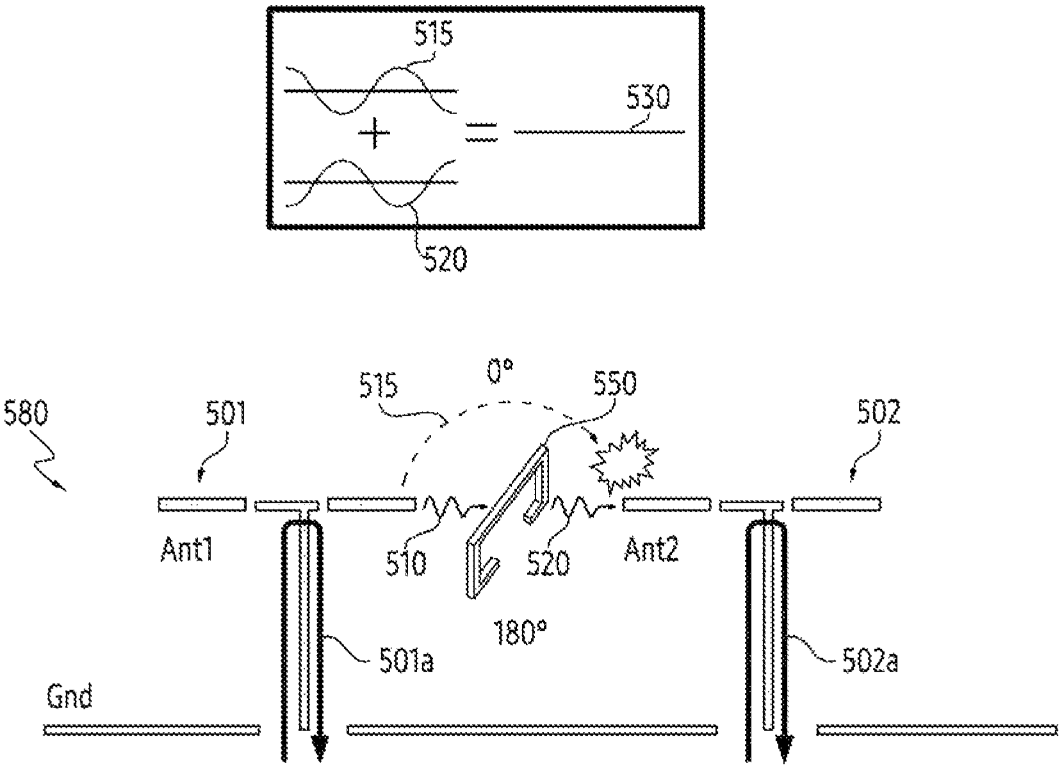
FIG. 5B illustrates an example of a method for reducing interference between antenna elements through a decoupling conductivity member.

Referring now to FIG. 5B, description will be made of the operating principle of the decoupling conductivity member for reducing mutual coupling components through cancellation interference.

FIG. 5B illustrates an example of a method for reducing interference between antenna elements through the decoupling conductivity member. The decoupling conductivity member refers to a structure for increasing isolation between the antenna elements, through cancellation interference between signals transmitted from a particular antenna element to another antenna element. The same reference numerals may be used for the same description.

Referring to FIG. 5B, a radiation environment 580 represents a radiation environment of an RU module (e.g., the RU module 400) with a decoupling conductivity member 550 disposed between a first antenna element 501 and a second antenna element 502. When the first antenna element 501 radiates a first signal, some component 501*a* of the first signal transmitted to the first antenna element 501 may be reflected. Some other component of the first signal transmitted to the first antenna element 501 may be radiated toward the second antenna element 502 as an interference signal 510. For example, the interference signal 510 may cause an interference component (e.g., the component 501*b* in an example environment 540 of FIG. 5A) with respect to the second antenna element 502.

According to an embodiment, the decoupling conductivity member 550 between the first antenna element 501 and the second antenna element 502 may change a phase of the first interference signal 510, based on resonance with respect to the first interference signal 510. For example, the decoupling conductivity member 550 may change the phase of the first interference signal 510 by about 180°. The first interference signal 510 may be changed to a second interference signal 520 via the decoupling conductivity member 550. The second interference signal 520 may indicate a signal that is changed in phase by about 180° in comparison to the first interference signal 510.

According to an embodiment, the second interference signal 520 and the third interference signal 515 may be cancelled with respect to each other. The second interference signal 520 may have a substantially opposite phase (e.g., about 180° difference) to the third interference signal 515, such that a synthesized signal 530 may be generated in which a component of the second interference signal 520 and a component of the third interference signal 515 are offset with each other. For example, the third interference signal 515 may indicate a signal radiated from the first antenna element 501 but not passing through the decoupling conductivity member 550.

Referring to the foregoing description, under the radiation environment 580, the influence from the interference signals may be less than that of the interference signals in the radiation environment 540, owing to the decoupling conductivity member 550. For example, the second antenna element 502 may be not affected by the interference signals from the first antenna element 501. The phrase 'being not affected' may imply that interference signals are received, but the influence of the interference signals introduced into the second antenna element 502 may be negligible, due to the offset effect of the resonant signal (the second interference signal 520) and the interference signal 515. In the example of FIG. 5B, the synthetization of the second interference signal 520 and the third interference signal 515 results in a fully offset synthesized signal 530, but the embodiments of the disclosure are not limited thereto. For example, the second interference signal 520 changed from the first interference signal 510 may have an amplitude of the signal changed by the decoupling conductivity member 550. Accordingly, the synthesized signal 530 that is partially offset by the synthetization of the second interference signal 520 and the third interference signal 515 may be generated. Further, for example, the second interference signal 520 changed from the first interference signal 510 may be changed to have a phase less than or greater than 180° by the decoupling conductivity member 550. As such, such a partially offset synthesized signal 530 may be generated by the synthetization of the second interference signal 520 and the third interference signal 515.

Accordingly, the RU module 400 including the decoupling conductivity member 550 according to embodiments of the disclosure and the electronic device 200 including the RU module 400 may reduce the interference between a plurality of antenna elements (e.g., the first antenna element 501 and the second antenna element 502) through the decoupling conductivity member 550, when transmitting signals via the plurality of antenna elements.

Figure 6A:
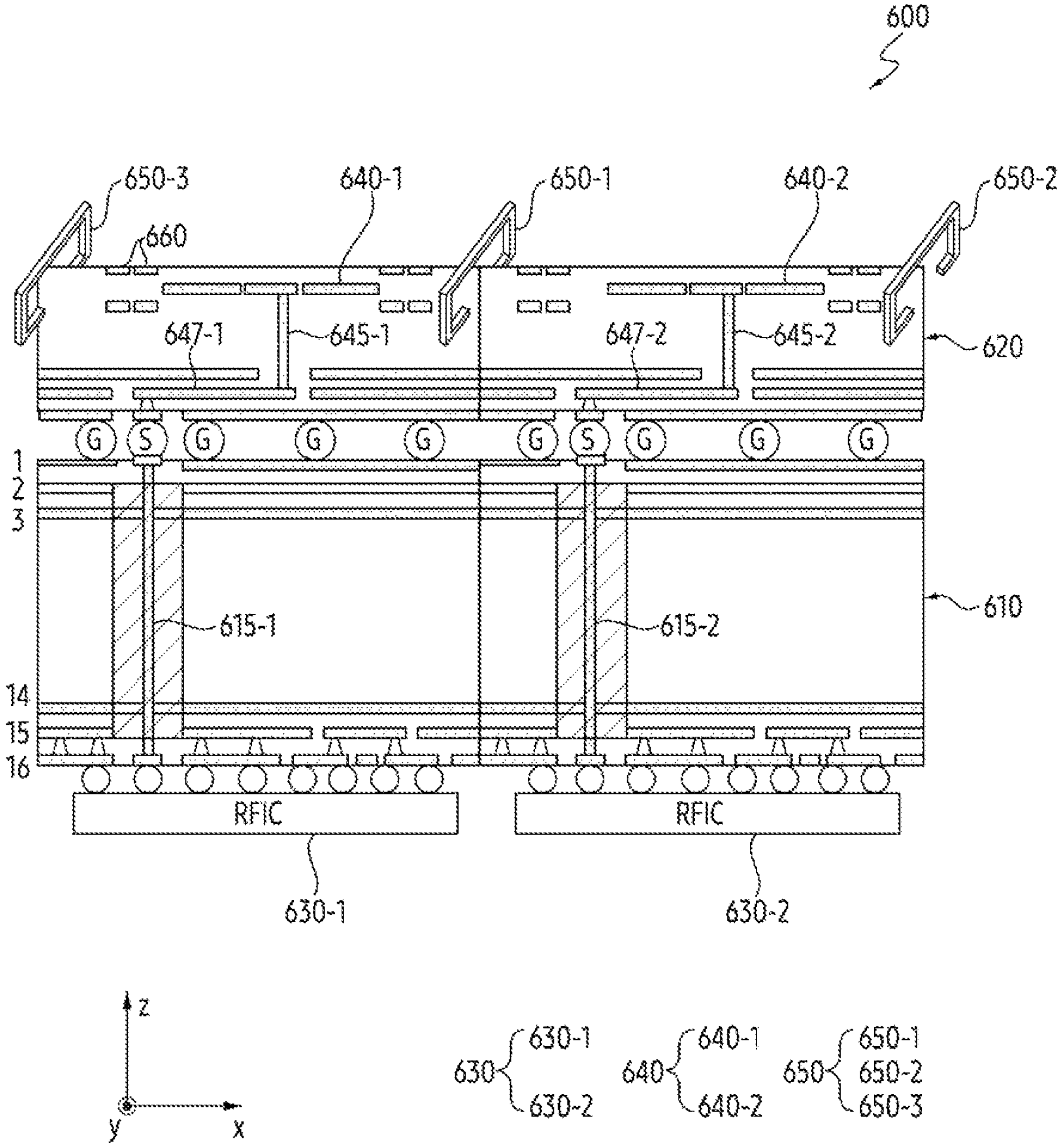
FIGS. 6A and 6B illustrate an example of an RU module including a decoupling conductivity member.
Figure 6B:
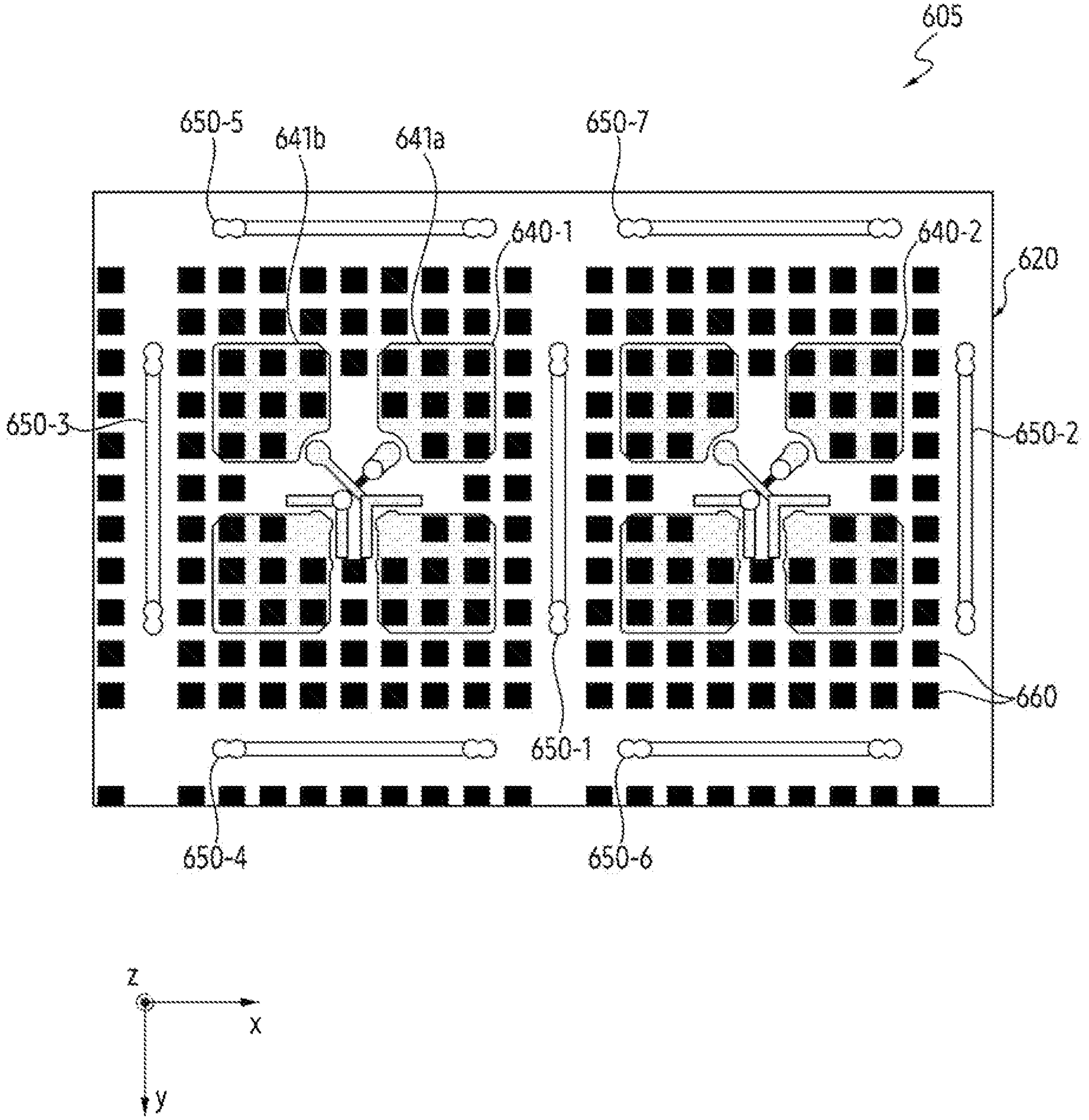

FIGS. 6A and 6B illustrate examples of an RU module including a decoupling conductivity member. The RU module 400 may include the RU module 210 of FIG. 2A. For example, the electronic device including the RU module 400 may include a base station 110, a terminal 120, an electronic device 200, or a device for radiating a wireless signal. The decoupling conductivity member may include the decoupling conductivity member 550 of FIG. 5B. The decoupling conductivity member may be referred to as a conductivity member.

Referring to FIG. 6A, an example 600 of a stacked structure of the RU module 400 is illustrated. To illustrate the stacked structure of the RU module 400, the example 600 represents an example where the RU module 400 is cut in a direction parallel to the x-z plane, viewed in the +y axis direction. In the example 600, the conductivity members 650 are shown three-dimensionally.

According to an embodiment, the RU module 400 may include a first substrate 610, a second substrate 620, and a radio frequency integrated circuit (RFIC) 630. For example, the first substrate 610 illustrates an RU board 410. For example, the second substrate 620 illustrates an antenna board 420 and/or an antenna board 430. The structure illustrated in the example 600 is only of a simplified example for convenience of explanation, and the embodiments of the disclosure are not limited thereto. For example, the example 600 illustrates an RU module 400 including one second substrate 620, but the embodiments of the disclosure are not limited thereto. For example, the RU module 400 may include a plurality of second substrates 620. For example, as shown in FIG. 4, the RU module 400 may include the antenna substrate 420 and the antenna substrate 430. Further, while an example is shown where the RU module 400 includes two RFICs 630, the embodiments of the disclosure are not limited thereto. For example, the RU module 400 may include one RFIC or three or more RFICs.

According to an embodiment, the first substrate 610 may include a plurality of layers. The plurality of layers may be divided into layer regions with different materials. According to an embodiment, the plurality of layers may include a first layer region, a second layer region, and a third layer region. For example, the first substrate 610 may be stacked in the order of the third layer region, the second layer region, and the first layer region, on the basis of +z-axis direction. For example, the first layer region and the third layer region may include a material having a lower dissipation factor ($D_f$) than a flame retardant (FR)-4. The second layer region may include the FR-4. For example, the third layer region may include at least one layer (e.g., layers #14 to #16) adjacent to a first surface of the first substrate 610 that is connected to the RFICs 630. The first layer region may include at least one layer (e.g., layers #1 to #3) adjacent to a second surface opposite to the first surface of the first substrate 610 that is connected to the second substrate 620. The layers of the first layer region and the second layer region may provide relatively higher signal transfer performance compared to the FR-4 layer.

In FIG. 6A, a plurality of layers including three layer regions are illustrated, but the embodiments of the disclosure are not limited thereto. For example, the plurality of layers may include the first layer region and the second layer region. Further, for example, the first layer region may include a material having a lower dissipation factor ($D_f$) than that of an FR-4. The second layer region may include the FR-4. Further, the number of layers each of the layer regions includes may be varied. For example, while FIG. 6A illustrates the first layer region including three layers, the first layer region may include two layers.

According to an embodiment, the first substrate 610 may include signal lines (e.g., 615-1, 615-2). For example, the first substrate 610 may include a signal line 615-1 for connecting a first RFIC 630-1 and a first antenna element 640-1. The first substrate 610 may include a signal line 615-2 for connecting a second RFIC 630-2 and a second antenna element 640-2. For example, the signal lines (615-1, 615-2) may be formed across the plurality of layers of the first substrate 610. Hereinafter, while the following description is mainly made on the basis of the signal line 615-1, the description of the signal line 615-1 may be also applied in the same manner to the signal line 615-2.

According to an embodiment, the first substrate 610 may include a coaxial plated through hole (PTH). The coaxial PTH may include a coaxial feeding line and a plated region surrounding the coaxial feeding line. For example, the coaxial feeding line may include the signal line 615-1. For example, the signal line 615-1 may be formed to extend along a direction (e.g., in z-axis direction) perpendicular to the first substrate 610. The coaxial feeding line may be formed across a plurality of layers of the first substrate 610. For example, the coaxial feeding line may be formed across a layer #1 to a layer #16 of the first substrate 610. The plated region may be formed across at least a portion of the plurality of layers along the coaxial feeding line. For example, the plated region may be formed across a layer #2 to a layer #15 of the first substrate 610. For example, the signal line 615-1 may extend in a vertical direction (e.g., in +z-axis direction) to reduce transmission loss in transmitting signals obtained from the first RFIC 630-1 to the antenna elements 640. However, embodiments of the disclosure are not limited to a particular structure of the signal lines.

According to an embodiment, the first substrate 610 may be coupled with the RFICs 630. For example, the RFICs 630 may be coupled to a first surface of the first substrate 610. For example, the first surface may indicate a surface opposite to the second surface where the first substrate 610 is coupled to the second substrate 620. For example, the first substrate 610 may be electrically coupled to the RFICs 630 via a grid array. For example, the grid array may include a ball grid array (BGA). Further, for example, the grid array may include a land grid array (LGA).

According to an embodiment, the first substrate 610 may be coupled to the second substrate 620. For example, the second substrate 620 may be coupled to the second surface of the first substrate 610. For example, the first substrate 610 may be electrically connected to the second substrate 620 via a grid array. For example, the grid array may include a BGA. Further, for example, the grid array may include an LGA.

According to an embodiment, the antenna elements may be electrically connected with the RFICs. For example, the first substrate 610 may electrically connect the RFICs 630 with the antenna elements 640 of the second substrate 620. For example, the first substrate 610 may electrically connect the antenna elements 640 and the RFICs 630 via the signal lines (615-1, 615-2) of the first substrate 610. In other words, signals generated by the RFICs 630 may be transferred to the antenna elements 640 via the signal lines (615-1, 615-2) and the feeding lines (647-1, 647-2) of the first substrate 610. For example, the signals may include RF signals. The grid array in a region where the signal lines (615-1, 615-2) is connected to the second substrate 620 may be a grid array through which the signals generated by the RFIC are transferred. The grid array may be referred to as a signal line S. Another grid array around the signal grid array may serve as a ground for shielding for the signal transfer characteristics. The other grid array may be referred to as a ground line (G). For example, the signal line may be disposed surrounded by a plurality of ground lines. In other words, the signal line may be electrically shielded. As such, the signal transfer characteristics may be improved.

According to an embodiment, the second substrate 620 may include a plurality of layers. For example, the plurality of layers may include the antenna elements 640, the conductivity members 650, the resonators 660, and the feeding lines (647-1, 647-2). For example, the antenna elements 640 may be disposed on at least one first layer. For example, the conductivity members 650 may be disposed across a plurality of second layers. For example, the resonators 660 may be disposed across at least a portion of the plurality of second layers. For example, the feeding lines (647-1, 647-2) may be disposed on a third layer that is different from the at least one first layer and the plurality of second layers, amongst the plurality of layers. In other words, the second substrate 620 may include the antenna elements 640, the conductivity members 650, the resonators 660, and the feeding lines (647-1, 647-2).

However, the embodiments of the disclosure are not limited thereto, and the feeding lines (647-1, 647-2) may be disposed on at least some layers of the plurality of layers of the first substrate 610. Specific details in this connection will be described later with reference to FIG. 13. Further, for convenience of illustration, FIG. 6A illustrates an example 600 of the RU module 400 including the resonators 660, but the embodiments of the disclosure are not limited thereto. According to an embodiment, the RU module 400 may not include the resonators 660.

According to an embodiment, the number of the plurality of layers of the second substrate 620 may be less than the number of the plurality of layers of the first substrate 610. For example, a height in the z-axis direction of the first substrate 610 may be formed to be larger than a height in the z-axis direction of the second substrate 620. According to an embodiment, the number of the plurality of layers of the second substrate 620 may be varied depending on the components included therein. For example, in case where the second substrate 620 includes the feeding lines 647, the number of the plurality of layers of the second substrate 620 may be increased compared to a case where the second substrate 620 does not include the feeding lines 647.

According to an embodiment, the RFICs 630 may generate an RF signal for radiation through the antenna elements 640. For example, the signal generated by the first RFIC 630-1 may be transmitted to the first antenna element 640-1 via the signal line 615-1 of the first substrate 610, the feeding line 647-1 of the second substrate 620, and the signal line 645-1. For example, the signal generated by the second RFIC 630-2 may be transmitted to the second antenna element 640-2 via the signal line 615-2 of the first substrate 610, the feeding line 647-2 of the second substrate 620, and the signal line 645-2. According to an embodiment, the first RFIC 630-1 connected with the first antenna element 640-1 and the second RFIC 630-2 connected with the second antenna element 640-2 may generate the same signal as each other. For example, the RU module may transmit the same signal through the plurality of antenna elements 640 to transmit the signals with beamforming. The same signal may refer to the signal including the same information or data. In this context, the first RFIC 630-1 and the second RFIC 630-2 may be referred to as one set of RFICs. As discussed above, the first RFIC 630-1 and the second RFIC 630-2 may be configured of a single RFIC. A plurality of signals generated by the single RFIC may be radiated through the first antenna element 640-1 and the second antenna element 640-2.

Referring to the above description, the example 600 illustrates the RU module 400 in which the first RFIC 630-1 of the two RFICs 630 is connected with the antenna element 640-1 and the second RFIC 630-2 thereof is connected with the antenna element 640-2. However, the embodiments of the disclosure are not limited thereto. For example, the RU module 400 may include a single RFIC connected with the antenna elements (640-1, 640-2). Alternatively, the first RFIC 630-1 may be connected with a plurality of antenna elements including the first antenna element 640-1, and the second RFIC 630-2 may be connected with a plurality of antenna elements including the second antenna element 640-2.

According to an embodiment, the antenna elements 640 may be arranged on the second substrate 620. For example, the antenna elements 640 may be arranged on the at least one first layer of the second substrate 620. For example, the antenna elements 640 may be arranged on one first layer of the second substrate 620. Alternatively, the antenna elements 640 may be arranged across a plurality of first layers of the second substrate 620.

According to an embodiment, the antenna elements 640 may be connected to the feeding lines (647-1, 647-2) via the signal lines (645-1, 645-2). For example, the first antenna element 640-1 may be connected to the feeding line 647-1 via the signal line 645-1. The second antenna element 640-2 may be connected to the feeding line 647-2 via the signal line 645-2. For example, the signal line may include a coaxial plated through hole (PTH). The signal line may be referred to as a via hole.

According to an embodiment, each antenna element of the antenna elements 640 may include a first radiator. For example, the first antenna element 640-1 may include the first radiator connected to the signal line 615-1 of the first substrate 610, the feeding line 647-1 of the second substrate 620, and the signal line 645-1 of the second substrate 620. The second antenna element 640-2 may include the first radiator connected to the signal line 615-2 of the first substrate 610, the feeding line 647-2 of the second substrate 620, and the signal line 645-2 of the second substrate 620. The first radiator may be referred to as a main radiator. For example, each antenna element including the first radiator may include a patch antenna, a dipole antenna, or a magneto-electric (ME) dipole antenna. In one embodiment, each antenna element of the antenna elements 640 may include a plurality of radiators. For example, each antenna element of the antenna elements 640 may include the first radiator electrically coupled to the signal lines (615-1, 615-2), the feeding lines (647-1, 647-2), and the signal lines (645-1, 645-2). For example, each of the antenna elements may include at least one second radiator coupled with the first radiator. The at least one second radiator may refer to a radiator for adjunctively radiating a signal radiating from the first radiator. The at least one second radiator may be referred to as a sub radiator for the first radiator. Specific details related to the first radiator and the at least one second radiator will be described later with reference to FIGS. 14 to 16.

According to an embodiment, the conductivity members 650 may be disposed between the antenna elements 640. For example, the conductivity member 650-1 may be disposed in a region between the first antenna element 640-1 and the second antenna element 640-2. For example, the region may include a position where a distance spaced apart from the first antenna element 640-1 is the same as a distance spaced apart from the second antenna element 640-2. In other words, the region may refer to an area that includes a center point between the center of the first antenna element 640-1 and the center of the second antenna element 640-2. In FIG. 6A, two antenna elements (640-1, 640-2) are illustrated for convenience of description, but the second substrate 620 may include a greater number of antenna elements 640. Thus, the conductivity member 650-2 may be disposed in a region between the second antenna element 640-2 and another antenna element, and the conductivity member 650-3 may be disposed in a region between the first antenna element 640-1 and another antenna element.

According to an embodiment, the conductivity members 650 may be disposed on the plurality of second layers of the second substrate 620. The conductivity members 650 may have various shapes. For example, in the example 600 of FIG. 6A, each of the conductivity members 650 may be formed in a folded shape. However, the embodiments of the disclosure are not limited thereto, and examples of the shapes of the conductivity members 650 are described below with reference to FIGS. 7A, 7B, 8A, and 8B.

According to an embodiment, the conductivity members 650 may be formed of a conductive material. For example, each of the conductivity members 650 formed of a conductive material (e.g., copper) may be disposed in a region between the antenna elements to resonate with respect to a signal radiated by each antenna element to generate a signal having a changed phase (or phase and amplitude). For example, when the first antenna element 640-1 radiates a signal obtained from the first RFIC 630-1, the conductivity member 650-1 may generate a signal of which phase is changed with respect to the signal. This phase-changed signal and another signal radiated from the first antenna element 640-1 and directed to the second antenna element 640-2 may be offset with each other. For example, the changed signal may be a signal of which phase is inverted by about 180° with respect to the other signal. Further, for example, the changed signal may be a signal of which amplitude and phase are changed with respect to the other signal. The changed phase may be greater than or less than about 180°. Accordingly, the interference with the second antenna element 640-2, which may be caused by the first antenna element 640-1 radiating the signal, may be reduced.

According to an embodiment, the resonators 660 may be disposed with respect to each antenna element of the antenna elements 640. For example, the resonators 660 may be disposed with respect to each antenna element across at least a portion of the plurality of second layers. As in the example 600, the resonators 660 may be disposed on a different layer from the layer on which the antenna element is disposed. However, the embodiments of the disclosure are not limited thereto, and the resonators 660 may also be disposed on the same layer as the layer on which the antenna element is disposed. The resonators 660 may increase a gain of an antenna element related thereto and expand a frequency band of a signal radiated through the related antenna element. For example, the resonators 660 may comprise a metamaterial.

Referring to FIG. 6B, an example 605 illustrates an example of arrangement of the antenna elements and the decoupling conductivity members on the second substrate 620 of the RU module 400 of FIG. 6A. The example 605 illustrates a top view of the RU module 400 of FIG. 6A, viewed in the +z-axis direction.

According to an embodiment, the second substrate 620 may include a plurality of antenna elements. For example, the second substrate 620 may include the first antenna element 640-1 and the second antenna element 640-2. The example 605 of FIG. 6B illustrates an example of the second substrate 620 including two antenna elements for convenience of description, but the embodiments of the disclosure are not limited thereto. The example 605 of FIG. 6B may be considered to include antenna elements disposed in an adjacent region with respect to the first antenna element 640-1 and the second antenna element 640-2.

According to an embodiment, the second substrate 620 may include a plurality of conductivity members 650. For example, the second substrate 620 may include a conductivity member 650-1, a conductivity member 650-3, a conductivity member 650-4, and a conductivity member 650-5 that are arranged with respect to the first antenna element 640-1. For example, the second substrate 620 may include the conductivity member 650-1, the conductivity member 650-2, the conductivity member 650-6, and the conductivity member 650-7 that are arranged with respect to the second antenna element 640-2. For example, the conductivity member 650-1 may be disposed in a region between the first antenna element 640-1 and the second antenna element 640-2. The region may include a region that is spaced apart from each of the first antenna element 640-1 and the second antenna element 640-2 by the same distance. Each of the conductivity member 650-3, the conductivity member 650-4, and the conductivity member 650-5 may be disposed in a region between the first antenna element 650-1 and the other antenna elements. Each of the conductivity member 650-2, the conductivity member 650-6, and the conductivity member 650-7 may be disposed in a region between the second antenna element 650-2 and the other antenna elements.

According to an embodiment, each of the plurality of conductivity members 650 may be formed in various shapes. The conductivity members 650 of FIG. 6B may be understood to be the same as the shape of the conductivity members 650 as illustrated in the example 600 of FIG. 6A. For example, the conductivity members 650 of the example 605 may be configured with a folded structure in a "C" shape, as shown in the example 600 of FIG. 6A. However, the embodiments of the disclosure are not limited thereto, and examples of the shapes of the conductivity members 650 are illustrated below with reference to FIGS. 7A, 7B, 8A, and 8B.

According to an embodiment, the second substrate 620 may include resonators 660. The resonators 660 may be disposed with respect to each antenna element of the plurality of antenna elements. For example, the resonators 660 may be disposed with respect to the first antenna element 640-1. For example, the resonators 660 may be disposed with respect to the second antenna element 640-2. According to an embodiment, the resonators 660 may be formed in a certain pattern on the second substrate 620. For example, the resonators 660 may be disposed in an area of the second substrate 620 different from the area where the conductivity members 650 are disposed.

According to an embodiment, the plurality of antenna elements included by the second substrate 620 may include a first radiator. For example, the first radiator may include a pair of conductivity members 641*a* and 641*b*. For example, one conductivity member 641*a* of the pair may radiate a signal having a first polarization. The other conductivity member 641*b* of the pair may radiate a signal having a second polarization. In such a case, the first polarization may exhibit a polarization component orthogonal to the second polarization. Each of the plurality of antenna elements in the example 605 is illustrated as a magneto-electric (ME) dipole antenna, but the embodiments of the disclosure are not limited thereto. For example, the antenna elements may include a patch antenna, a dipole antenna, or the like.

According to an embodiment, signals having different polarizations may be provided via a plurality of signal lines to a first radiator of each of the plurality of antenna elements included in the second substrate 620. For example, the conductivity member 641*a* included in the first radiator of the first antenna element 640-1 may be provided with a signal having the first polarization via a first signal line. For example, the conductivity member 641*b* included in the first radiator of the first antenna element 640-1 may be provided with a signal having the second polarization perpendicular to the first polarization via the second signal line. According to an embodiment, each of the first signal line and the second signal line may be provided with a signal via different feeding lines so as to carry signals having different polarizations.

According to an embodiment, the second substrate 620 may include a plurality of layers. For example, the plurality of layers may include antenna elements 640, conductivity members 650, resonators 660, and feeding lines. For example, the antenna elements 640 may be disposed on at least one first layer. For example, the conductivity members 650 may be arranged across a plurality of second layers. For example, the plurality of second layers may include a layer corresponding to a second surface opposite to the first surface of the second substrate 620. For example, the layer corresponding to the second surface may be exposed to be visible from the outside. For example, the resonators 660 may be disposed across at least a portion of the plurality of second layers. For example, the feeding lines may be disposed on a third layer that is different from the at least one first layer and the plurality of second layers, from among the plurality of layers. However, the embodiments of the disclosure are not limited thereto, and the feeding lines may be disposed on at least a portion of the plurality of layers of the first substrate. Specific details in this connection will be described below with reference to FIG. 13. For example, signal lines (e.g., the signal lines 645-1 and 645-2 of FIG. 6A) may be disposed across the plurality of layers. For example, the signal lines may be electrically connected to the feeding lines. The signal lines may represent a structure for conveying a signal obtained from the feeding lines to the antenna elements.

Figure 7A:
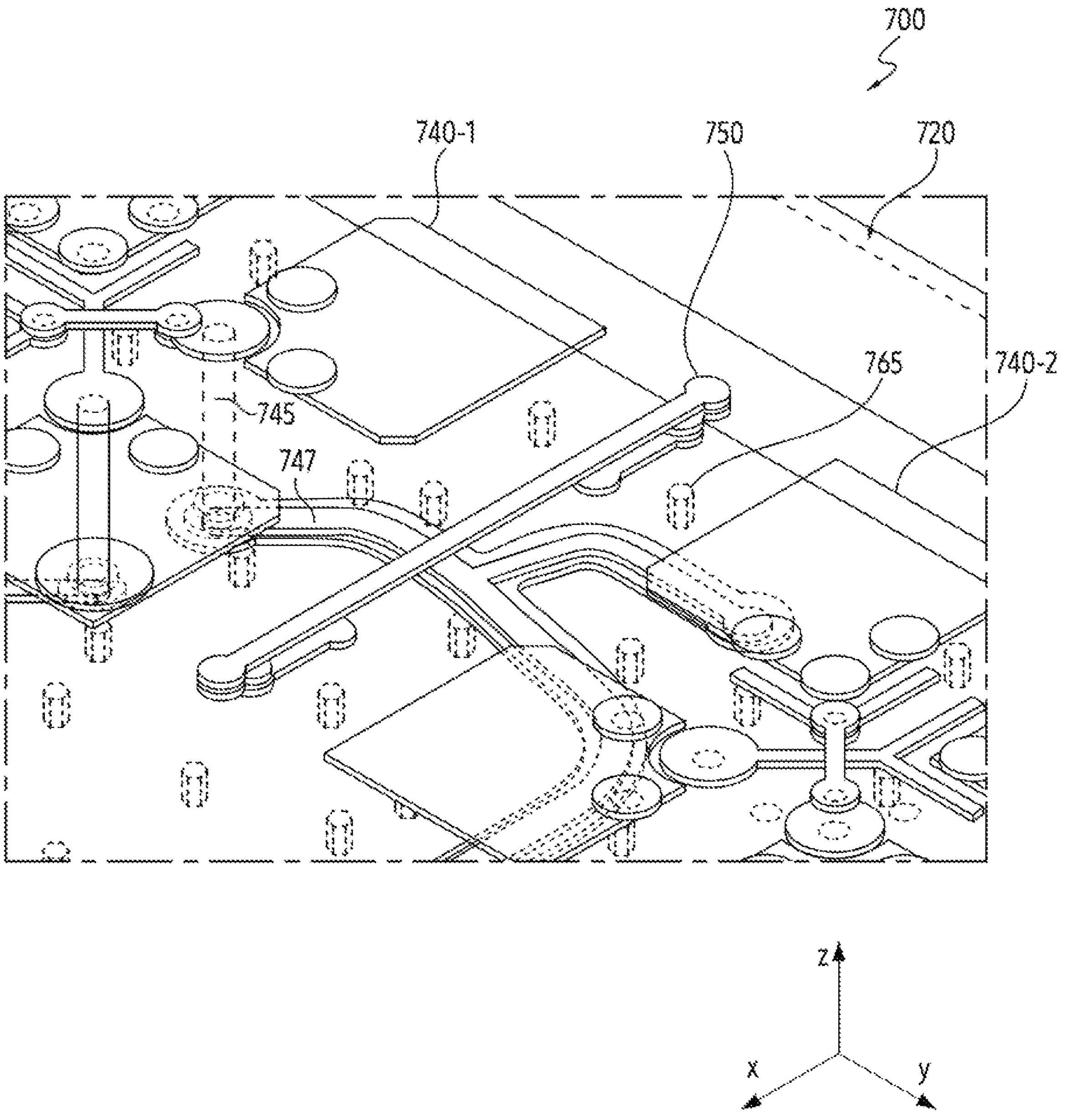
FIGS. 7A and 7B illustrate an example of a decoupling conductivity member included in a substrate.
Figure 7B:
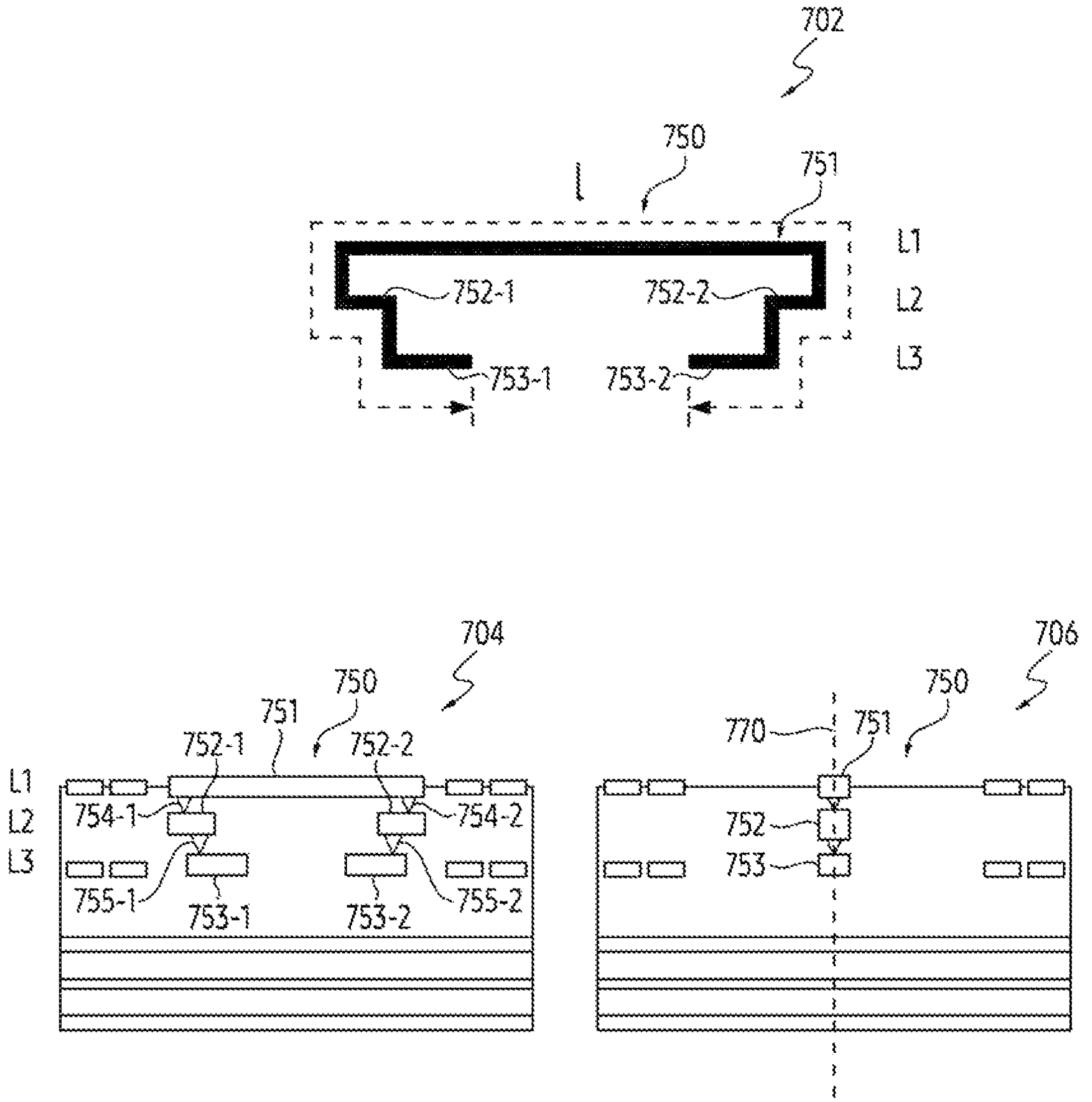

FIGS. 7A and 7B illustrate examples of a decoupling conductivity member included in a substrate. For example, the substrate may represent a second substrate (e.g., the second substrate 620 of FIGS. 6A and 6B). For example, the decoupling conductivity member may be included in a plurality of conductivity members (e.g., the conductivity members 650 of FIGS. 6A and 6B).

FIG. 7A illustrates an example 700 of a second substrate 720 viewed through in a z-axis direction relative to the x-y plane. For example, the second substrate 720 may be included in the RU module 400. The RU module 400 may be included in an electronic device 200. For example, the electronic device 200 may be included in a base station 110 of FIG. 1, a terminal 120, or an apparatus for radiating a wireless signal.

Referring to the example 700, according to an embodiment, the second substrate 720 may include a plurality of antenna elements, conductivity members, resonators, feeding lines, and signal lines. For example, the second substrate 720 may include a first antenna element 740-1 and a second antenna element 740-2. For example, the second substrate 720 may include a conductivity member 750 in a region between the first antenna element 740-1 and the second antenna element 740-2. For example, the second substrate 720 may include a resonator disposed in a region different from the region where the conductivity member 750 is arranged with respect to each of the first antenna element 740-1 and the second antenna element 740-2. For example, the second substrate 720 may include a feeding line 747 for feeding signals to the first antenna element 740-1 and the second antenna element 740-2. For example, the second substrate 720 may include vias 765 for connecting between a plurality of layers included in the second substrate 720. For example, some of the vias 765 may connect a layer in which the first antenna element 740-1 is disposed, to another layer.

According to an embodiment, the conductivity member 750 may be disposed on a layer different from the feeding line 747. For example, the conductivity member 750 may be formed on a layer different from the layer on which the feeding line 747 is formed. For example, the other layer may be a layer above the layer on which the feeding line 747 is formed.

However, the embodiments of the disclosure are not limited thereto. For example, the feeding line 747 may be included in other substrates (e.g., the first substrate 610 of FIG. 6A). For example, the second substrate 720 may include a signal line 745 for connecting to the feeding line 747 and transferring a signal to each of the first antenna element 740-1 and the second antenna element 740-2. In FIG. 7A, while it is only shown the signal line 745 connecting the first antenna element 740-1 to the feeding line 747, the embodiments of the disclosure are not limited thereto. For example, the second substrate 720 may include a signal line connecting the feeding line 747 to the second antenna element 740-2.

The example 700 illustrates a structure of a single feeding line 747 feeding a plurality of antenna elements (e.g., the first antenna element 740-1 and the second antenna element 740-2). The example 700 merely illustrates an example that both the first antenna element 740-1 and the second antenna element 740-2 radiate the same signal, and the embodiments of the disclosure are not limited thereto. For example, the signals may be fed via different feeding lines for the first antenna element 740-1 and the second antenna element 740-2. The different feeding lines may be obtained the signals from different RFICs, or may be obtained the signals from a single RFIC. Further, in case where the signals are acquired from the different RFICs, the different supply lines may acquire the same signal or different signals. In case where the different RFICs provide the same signal to the different feeding lines, the different RFICs may be referred to as one set of RFICs.

According to an embodiment, the conductivity members 750 may be disposed across the plurality of second layers of the second substrate 720. Referring to the example 700, the conductivity member 750 may be disposed across the plurality of second layers including three partial layers. A specific structure of the conductivity member 750 is described in a greater detail below with reference to FIG. 7B.

Referring to FIG. 7B, there are shown an example 702 illustrating the structure of the conductivity member 750, an example 704 illustrating a cross-sectional view of the second substrate 720 including the conductivity member 750 taken in a y-axis direction (e.g., the y-axis of FIG. 7A), and an example 706 illustrating a cross-sectional view of the second substrate 720 including the conductivity member 750 taken in an x-axis direction (e.g., the x-axis of FIG. 7A).

Referring to the example 702, according to an embodiment, the conductivity member 750 may be disposed across the plurality of second layers. For example, the conductivity member 750 may be formed across three partial layers included in the plurality of second layers. For example, the three partial layers may include a first partial layer L1, a second partial layer L2, and a third partial layer L3. For example, the conductivity member 750 may include a first portion 751 extending on the first partial layer to have a first length in a particular direction (e.g., the x-axis direction of FIG. 7A). For example, the conductivity member 750 may include two second portions 752-1 and 752-2 that are connected to both ends of the first portion 751 on the second partial layer. For example, the second portion 752-1 may be coupled to one end of the two ends of the first portion 751 through via a via. Another second portion 752-2 may be coupled to the other end of the two ends of the first portion 751 through via a via. For example, each of the second portion 752-1 and the second portion 752-2 may extend on the second partial layer so as to have a second length. However, the embodiments of the disclosure are not limited thereto, and the second portion 752-1 and the second portion 752-2 may extend on the second partial layer such that they have different lengths from each other. For example, the conductivity member 750 may include two third portions (753-1, 753-2) each connected to the second portions (752-1, 752-2) on the third partial layer. For example, the third portion 753-1 may be coupled to the second portion 752-1 through a via. The third portion 753-2 may be coupled to the second portion 752-2 through a via. For example, each of the third portion 753-1 and the third portion 753-2 may extend on the third partial layer so as to have a third length. However, the embodiments of the disclosure are not limited thereto, and the third portion 753-1 and the third portion 753-2 may extend on the third partial layer so as to have different lengths from each other. In the example 702, the third length is illustrated as being larger than the second length, but the embodiments of the disclosure are not limited thereto. For example, the second length may be larger than or equal to the third length.

According to an embodiment, a sum (1) of the first length, the second length, and the third length may be related to a wavelength of a signal radiated by the antenna element associated with the conductivity member 750. For example, the sum may be a value within a reference range based on the wavelength of the signal. For example, the reference range may be from about 0.4λ to 0.6λ, wherein λ indicates the wavelength of the signal. For example, when the signal has a center frequency of 28 GHz (gigahertz), the sum may be about 0.58λ. For example, when the signal has a center frequency of 39 GHz, the sum may be about 0.48λ. According to an embodiment, in case that the conductivity member 750 includes a via, the sum may include a length of the via. According to an embodiment, the conductivity member 750 may be formed in a folded structure to conform to the sum of the lengths identified based on the frequency band of the signal transmitted or received.

According to an embodiment, the first portion 751, the second portions (752-1, 752-2), and the third portions (753-1, 753-2) of the conductivity member 750 may include a conductive material. For example, the conductive material may include copper. For example, based on the conductive material, the conductivity member 750 may resonate with a portion of the signal radiated from the antenna element. As such, a phase cancellation in between a resonant signal and a non-resonant signal may occur. The conductivity member 750 may reduce interference between the antenna elements through such a phase cancellation.

Referring to the example 704, according to an embodiment, the conductivity member 750 may be disposed across the plurality of second layers including a layer L1 corresponding to a second surface of the second substrate 720 (e.g., a surface opposite to the first surface where the second substrate 720 is connected to the first substrate (e.g., the first substrate 610 of FIG. 6A)). For example, the first portion 751 may be disposed on the first partial layer L1. The second partial layer may represent a layer exposed to be viewable from the outside on the second side. According to an embodiment, the second portions (752-1, 752-2) may be connected to the first portion 751 through a via. For example, the second portion 752-1 may be coupled through a via 754-1 at one end of the first portion 751. For example, the second portion 752-2 may be coupled to the other end of the first portion 751 through a via 754-2. For example, the third portion 753-1 may be coupled to the second portion 752-1 through a via 755-1. For example, the third portion 753-2 may be coupled to the second portion 752-2 through a via 755-2.

Referring to the example 706, according to an embodiment, a first portion 751, a second portion 752, and a third portion 753 of the conductivity member 750 may be formed with widths corresponding to each other. However, the embodiments of the disclosure are not limited thereto, and the widths of the portions included by the conductivity member 750 may be different from one another. Further, while the example 706 illustrates an example in which the first portion 751, the second portion 752, and the third portion 753 of the conductivity member 750 are arranged in alignment with a reference line 770, the embodiments of the disclosure are not limited thereto. For example, the conductivity member 750 may be arranged symmetrically with respect to the reference line 770. For example, one end of the first portion 751, the second portion 752-1 and the third portion 753-1 may be arranged in a left-sided region with respect to the reference line 770, and the other end of the first portion 751, the second portion 752-2 and the third portion 753-2 may be arranged in a left-sided region with respect to the reference line 770.

Referring to FIGS. 7A and 7B, an example of the conductivity member 750 having a folded shape (or structure) is illustrated. For example, the conductivity member 750 may be also referred to as a folded dipole. However, the embodiments of the disclosure are not limited to the above-shaped conductivity member. An electronic device according to the embodiments of the disclosure may include conductivity members with various shapes. Various examples of shapes of these conductivity members are described in a greater detail below with reference to FIGS. 8A and 8B.

Figure 8A:
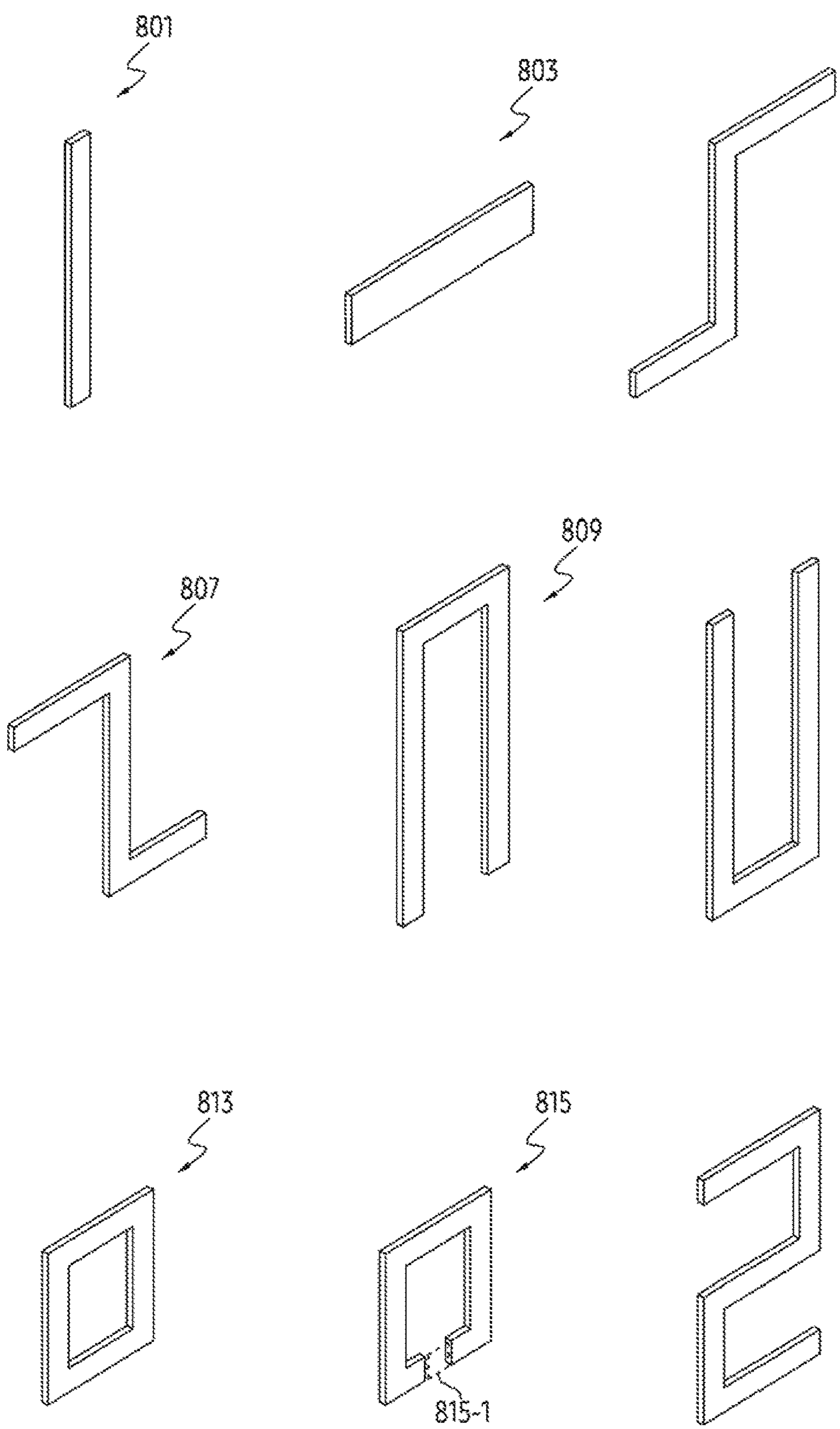
FIGS. 8A and 8B illustrate an example of a decoupling conductivity member.
Figure 8B:
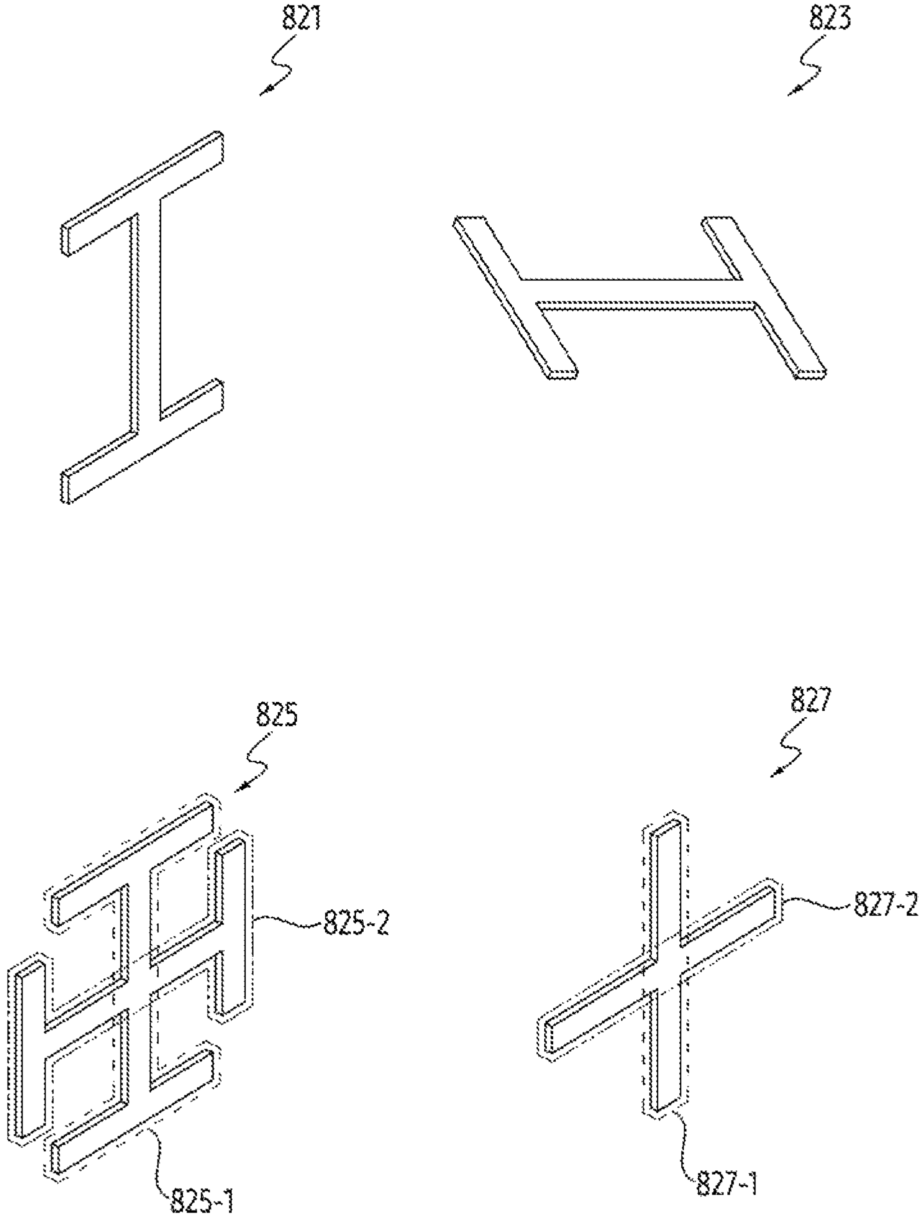

FIGS. 8A and 8B illustrate examples of decoupling conductivity members.

FIGS. 8A and 8B illustrate examples of various shapes of decoupling conductivity members (or conductivity members) (e.g., the conductivity members 650 of FIG. 6A), respectively.

Referring to an example 801, according to an embodiment, the conductivity member may include a conductivity member formed in the shape of '|'. For example, the conductivity member of the example 801 may be disposed in a direction (e.g., in the z-axis direction of FIG. 6A) perpendicular to the second substrate (e.g., the second substrate 620 of FIG. 6A) across the plurality of second layers. The plurality of second layers may include three partial layers, such as the conductivity member 750 illustrated in FIGS. 7A and 7B. Alternatively, the plurality of second layers may include two partial layers or four or more partial layers. According to an embodiment, a length in the vertical direction of the conductivity member (or a conductivity member and a via) of the example 801 may be identified based on a wavelength of a signal radiated from an antenna element related to the conductivity member. For example, the length may be a value within the reference range.

Referring to an example 803, according to an embodiment, the conductivity member may include a conductivity member formed in the shape of '-'. For example, the conductivity member of the example 803 may be disposed in the horizontal direction (e.g., a direction parallel to the x-y plane of FIG. 6A) with respect to the second substrate (e.g., the second substrate 620 of FIG. 6A) across the plurality of second layers. The plurality of second layers may include three partial layers, such as the conductivity member 750 illustrated with reference to FIGS. 7A and 7B. Alternatively, the plurality of second layers may include two partial layers or four or more partial layers. According to an embodiment, a length in the horizontal direction of the conductivity member of the example 803 may be identified based on a wavelength of a signal radiated from an antenna element associated with the conductivity member. For example, the length may be a value within the reference range.

Referring to an example 805 and an example 807, according to an embodiment, the conductivity member may include a conductivity member formed in the shape of 'ㄱ' and 'ㄴ' combined with each other. For example, the conductivity members of the examples 805 and 807 may be disposed across the plurality of second layers. The plurality of second layers may include three partial layers, such as the conductivity member 750 illustrated with reference to FIGS. 7A and 7B. Alternatively, the plurality of second layers may include four or more partial layers. According to an embodiment, a sum of lengths of the conductivity members (or the conductivity members and the vias) for a 'ㄱ' portion and a 'ㄴ' portion may be identified based on the wavelength of the signal radiated from the antenna element related to the conductivity member. For example, the sum of lengths may be a value within the reference range. While the examples 805 and 807 illustrate the conductivity members in the shape of a combination of the 'ㄱ' portion and the 'ㄴ' portion, the conductivity member may include only either one of the 'ㄱ' portion or the 'ㄴ' portion.

The conductivity members of an example 809 and an example 811 may include a conductivity member formed in a 'U' shape. For example, the conductivity member of the examples 809 and 811 may be disposed across the plurality of second layers. The plurality of second layers may include three partial layers, such as the conductivity member 750 illustrated with reference to FIGS. 7A and 7B. Alternatively, the plurality of second layers may include two partial layers or four or more partial layers. According to an embodiment, a sum of lengths of the 'U' shaped conductive portions (or the conductivity members and the via) of the conductivity member of the example 809 and the example 811 may be identified based on a wavelength of a signal radiated from the antenna element related to the conductivity member. For example, the sum of lengths may be a value within the reference range.

The conductivity member of an example 813 may include a conductivity member formed in the shape of '□'. For example, the conductivity member of the example 813 may be disposed across the plurality of second layers. For example, the conductivity member of the example 813 may form a closed-loop. The plurality of second layers may include three partial layers, such as the conductivity member 750 illustrated with reference to FIGS. 7A and 7B. Alternatively, the plurality of second layers may include four or more partial layers. According to an embodiment, a sum of lengths of the 'o'-shaped conductive portions (or the conductivity member and the via) of the conductivity member of the example 813 may be identified based on a wavelength of a signal radiated from the antenna element related to the conductivity member. For example, the sum of lengths may be a value within the reference range.

The conductivity member of an example 815 may include a conductivity member formed in a shape partially truncated from the shape of 'o'. For example, the conductivity member of the example 815 may be formed in a shape in which a portion 815-1 of a particular partial layer is disconnected. For example, the conductivity member of the example 815 may be disposed across a plurality of second layers. The plurality of second layers may include three partial layers, such as the conductivity member 750 illustrated with reference to FIGS. 7A and 7B. Alternatively, the plurality of second layers may include four or more partial layers. According to an embodiment, a sum of lengths of the conductive portions of the conductivity member (or the conductivity member and the via) of the example 815 may be identified based on a wavelength of a signal radiated from the antenna element related to the conductivity member. For example, the sum may be a value within the reference range.

The conductivity member of an example 817 may include a conductivity member formed in the shape of 'ㄹ'. For example, the conductivity member of the example 817 may be disposed across the plurality of second layers. The plurality of second layers may include three partial layers, such as the conductivity member 750 illustrated in FIGS. 7A and 7B. Alternatively, the plurality of second layers may include four or more partial layers. According to an embodiment, a sum of lengths of the conductive portions of the conductivity member (or the conductivity member and the via) of the example 817 may be identified based on a wavelength of a signal radiated from the antenna element related to the conductivity member. For example, the sum may be a value within the reference range.

Referring to an example 821 and an example 823 of FIG. 8*b*, according to an embodiment, the conductivity member may include a conductivity member formed in the shape of 'I'. For example, the conductivity member of the examples 821 and 823 may be disposed across the plurality of second layers. The plurality of second layers may include three partial layers, such as the conductivity member 750 illustrated in FIGS. 7A and 7B. Alternatively, the plurality of second layers may include four or more partial layers. According to an embodiment, a sum of lengths of the conductive portions in the horizontal direction and the conductive portions (or the conductivity member and the via) in the vertical direction of the conductivity member of the examples 821 and 823 may be identified based on a wavelength of a signal radiated from the antenna element related to the conductivity member. For example, the sum of the lengths may be a value within the reference range. Depending on the structural characteristics of the conductivity member of the example 821, the conductivity member of the example 821 may resonate with a signal having a first polarization (e.g., a vertical polarization) (or a component of the first polarization of the signal). In contrast thereto, the conductivity member of the example 823 may resonate with a signal of a second polarization (or a component of the second polarization of the signal).

Referring to an example 825, according to an embodiment, the conductivity member may include a conductivity member having a shape in which the shape of the example 821 is combined with the shape of the example 823. For example, the conductivity member of the example 825 may be disposed across the plurality of second layers. The plurality of second layers may include three partial layers, such as the conductivity member 750 illustrated in FIGS. 7A and 7B. Alternatively, the plurality of second layers may include four or more partial layers. According to an embodiment, a sum of lengths of the conductive portions in the horizontal direction and the conductive portions (or the conductivity member and the via) in the vertical direction of the conductivity member of the example 825 may be identified based on a wavelength of a signal radiated from the antenna element related to the conductivity member and the polarization component of the signal. For example, the sum of lengths may be a value within the reference range. For example, the sum of lengths may represent a sum of the lengths of the conductive portion corresponding to a portion 825-1, when the polarization component of the signal is the first polarization (e.g., the vertical polarization). For example, the sum of the lengths may represent a sum of the lengths of the conductive portion corresponding to a portion 825-2, when the polarization component of the signal is the second polarization (e.g., the horizontal polarization).

Referring to an example 827, according to an embodiment, the conductivity member may include a conductivity member having a shape in which the shape of the example 801 is combined with the shape of the example 803. For example, the conductivity member of the example 827 may be disposed across the plurality of second layers. The plurality of second layers may include three partial layers, such as the conductivity member 750 illustrated in FIGS. 7A and 7B. Alternatively, the plurality of second layers may include four or more partial layers. According to an embodiment, a length of the conductive portion in the horizontal direction or the conductive portion (or the conductivity member and the via) in the vertical direction of the conductivity member of the example 827 may be identified based on a wavelength of a signal radiated from the antenna element related to the conductivity member and a polarization component of the signal. For example, the length may be a value within the reference range. For example, the length may represent a length of a portion 827-1, when the polarization component of the signal is the first polarization (e.g., the vertical polarization). For example, the sum of the lengths may indicate a length of a portion 827-2, when the polarization component of the signal is the second polarization (e.g., the horizontal polarization).

The structures of FIGS. 8A and 8B are only of some examples and the conductivity members of the electronic device according to the embodiments of the disclosure are not limited to those of FIGS. 8A and 8B. In addition to the examples of FIGS. 8A and 8B, the embodiments of the disclosure may include the conductivity members with structures that are modified (e.g., rotated, partially truncated, partially added, etc.) from the examples of FIGS. 8A and 8B, or the conductivity members with structures that are obviously derivable from the disclosure.

FIGS. 9A to 9D illustrate examples of the structures and graphs for representing the performance of RU modules including decoupling conductivity members.

Figure 9A:
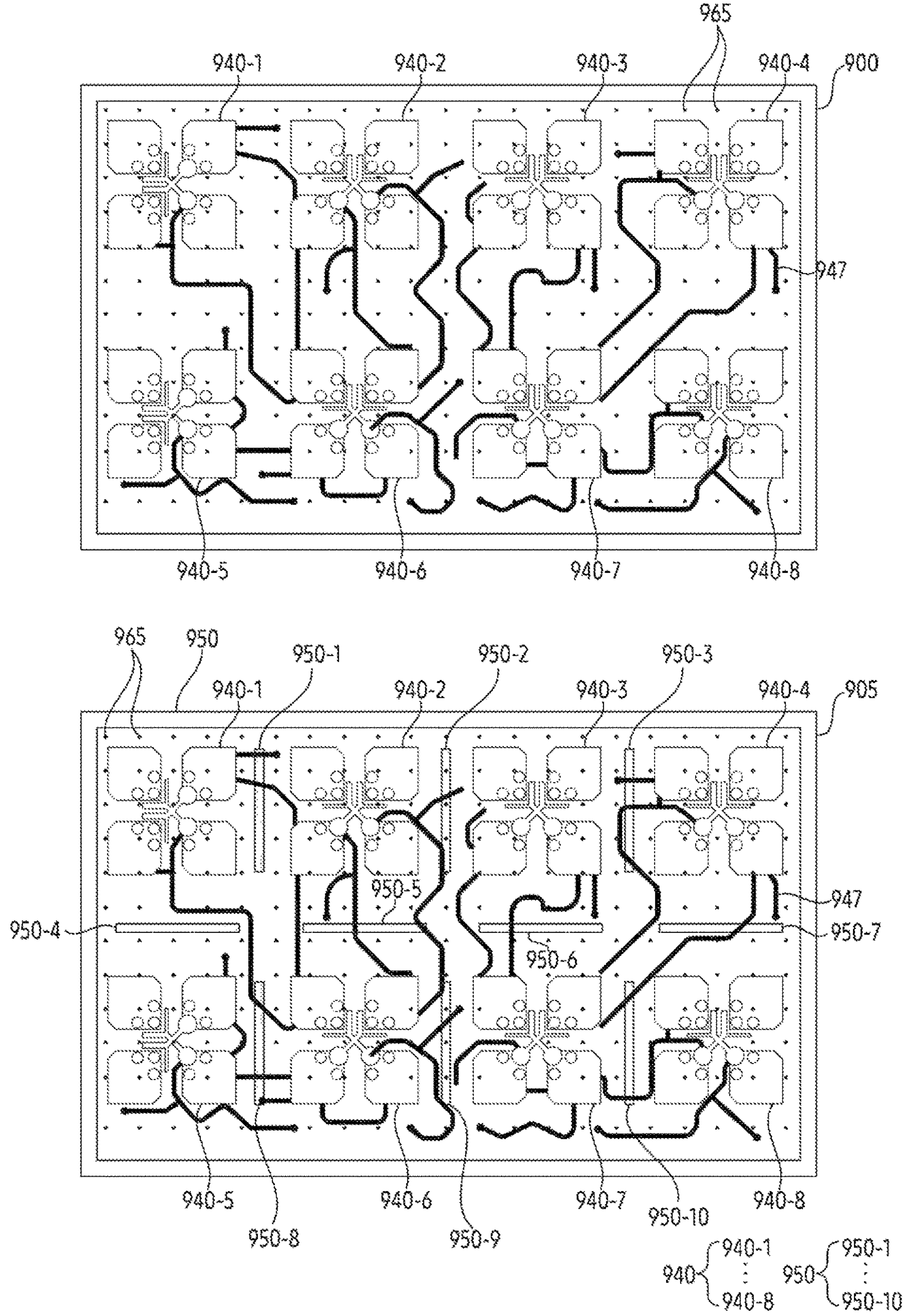
FIGS. 9A to 9D each illustrate examples of structures and graphs for representing performance of an RU module including decoupling conductivity members.

FIG. 9A illustrates an example of second substrates (900, 905) included in an RU module 400. The second substrate 900 in FIG. 9A may represent a second substrate that does not include the decoupling conductivity member (or the conductivity member) according to the embodiments of the disclosure. In contrast, the second substrate 905 may represent a second substrate (e.g., the second substrate 620 of FIGS. 6A and 6B) that includes the decoupling conductivity member (or conductivity members) according to embodiments of the disclosure. For example, the decoupling conductivity member may be included in a plurality of conductivity members (e.g., the conductivity member 650 of FIGS. 6A and 6B).

Referring to FIG. 9A, the second substrate 900 may include a plurality of antenna elements 940, feeding lines 947, vias 965, and resonators. For example, the plurality of antenna elements 940 may include a first antenna element 940-1 to an eighth antenna element 940-8. For example, the feeding line 947 may feed a signal to the plurality of antenna elements 940. In one embodiment, the second substrate 900 may include a signal line between each antenna element of the plurality of antenna elements 940 and the feeding line 947. For example, the second substrate 900 may include vias 965 for connecting between a plurality of layers included in the second substrate 900. For example, some of the vias 965 may connect a layer in which the plurality of antenna elements 940 are arranged, to another layer. For example, the resonator may be disposed with respect to each antenna element of the plurality of antenna elements 940. For example, the resonator may be disposed in an area adjacent to the antenna element.

The second substrate 905 of FIG. 9A may further include conductivity members 950 compared to the second substrate 900. For example, the plurality of conductivity members may include a first conductivity member 950-1 to a tenth conductivity member 950-10. For example, the first conductivity member 950-1 may be disposed in a region between the first antenna element 940-1 and the second antenna element 940-2. The second conductivity member 950-2 may be disposed in a region between the second antenna element 940-2 and the third antenna element 940-3. The third conductivity member 950-3 may be disposed in a region between the third antenna element 940-3 and the fourth antenna element 940-4. The fourth conductivity member 950-4 may be disposed in a region between the first antenna element 940-1 and the fifth antenna element 940-5. The fifth conductivity member 950-5 may be disposed in a region between the second antenna element 940-2 and the sixth antenna element 940-6. The sixth conductivity member 950-6 may be disposed in a region between the third antenna element 940-3 and the seventh antenna element 940-7. The seventh conductivity member 950-7 may be disposed in a region between the fourth antenna element 940-4 and the eighth antenna element 940-8. The eighth conductivity member 950-8 may be disposed in a region between the fifth antenna element 940-5 and the sixth antenna element 940-6. The ninth conductivity member 950-9 may be disposed in a region between the sixth antenna element 940-6 and the seventh antenna element 940-7. The tenth conductivity member 950-10 may be disposed in a region between the seventh antenna element 940-7 and the eighth antenna element 940-8. However, the embodiments of the disclosure are not limited thereto. For example, the second substrate 905 may further include other antenna elements in addition to the plurality of antenna elements 940. The other antenna elements may be continuously arranged either in a horizontal direction or in a vertical direction with the plurality of antenna elements 940. For example, the second substrate 905 may include a conductivity member disposed in a region between the first antenna element 940-1 of the plurality of antenna elements 940 and one antenna element of the other antenna elements, continuously arranged either in the horizontal direction or in the vertical direction.

Figure 9B:
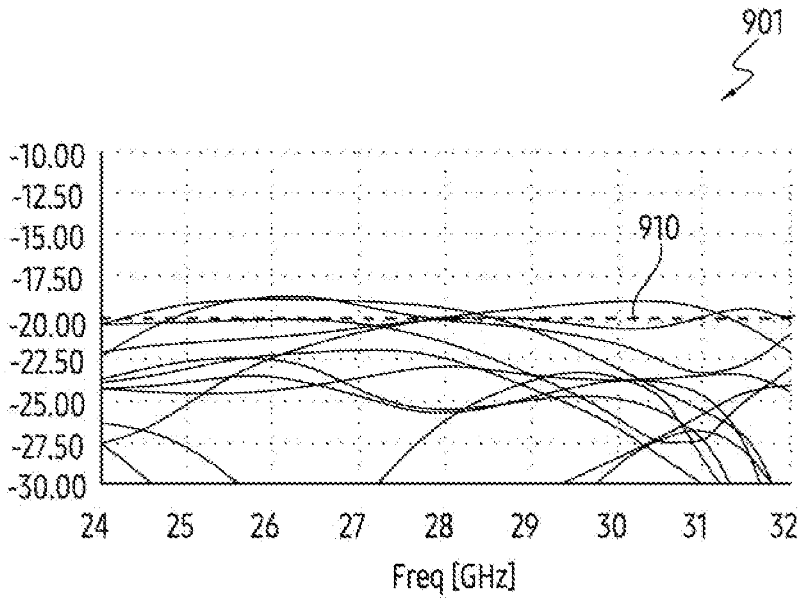
Figure 9B:
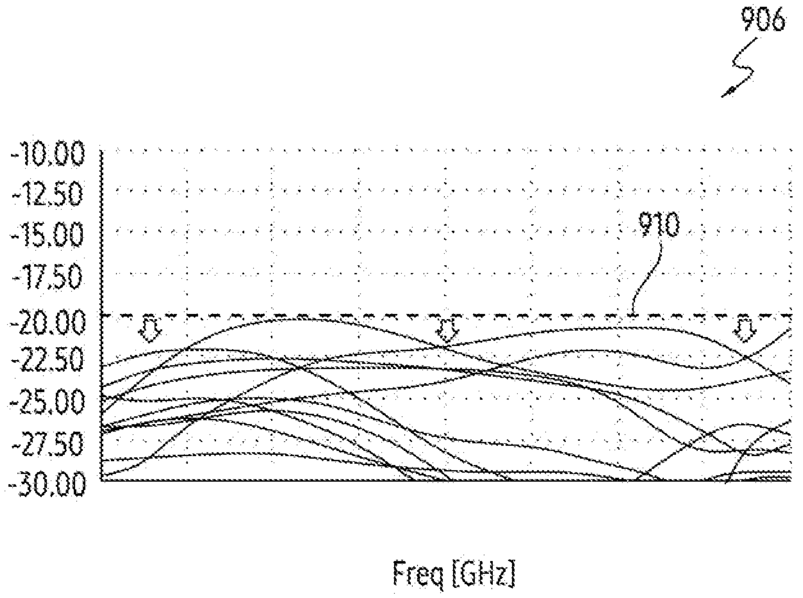

Referring to FIG. 9B, it is shown a graph 901 indicating a degree of isolation between the plurality of antenna elements 940 in the second substrate 900, and a graph 906 indicating a degree of isolation between the plurality of antenna elements 940 in the second substrate 905. For example, each of a plurality of lines shown in the graph 901 and the graph 906 may represent a gain as a function of frequency of a signal radiated by a plurality of antenna elements 940. In the graph 901 and the graph 906, the horizontal axis represents the frequency (in gigahertz (GHz)) of the signal radiated by each antenna element of the plurality of antenna elements 940, and the vertical axis represents the gain (in decibels (dB)).

Referring to the graph 901 and the graph 906, the graph 901 may include lines having values greater than a baseline line 910. In contrast, the graph 906 may only include lines having values less than the baseline 910. For example, the lines in the graph 906 may have lower values, on average, by about 3 dB, compared to the lines in the graph 901. For example, the baseline line 910 may represent a reference value for indicating a degree of isolation between antenna elements. The reference value may be about −20 dB. Having a value as low as about 3 dB may indicate that the degree of isolation between the plurality of antenna elements 940 of the second substrate 905 is about twice as high as the degree of isolation of the second substrate 900.

Referring to the foregoing description, the internal influence that a particular antenna element of the plurality of antenna elements 940 of the second substrate 905 may have on other antenna elements of the plurality of antenna elements 940, while radiating a signal, may be relatively less than that of the structure of the second substrate 900. In other words, the structure of the second substrate 905 may be more isolated than the structure of the second substrate 900.

Figure 9C:
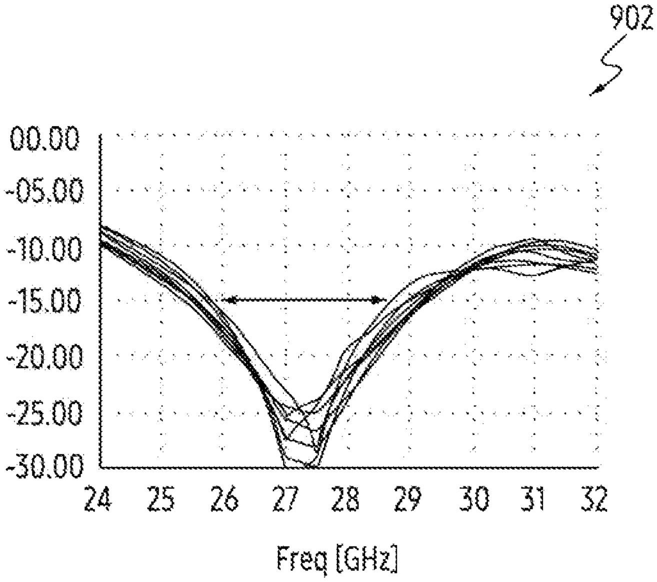
Figure 9C:
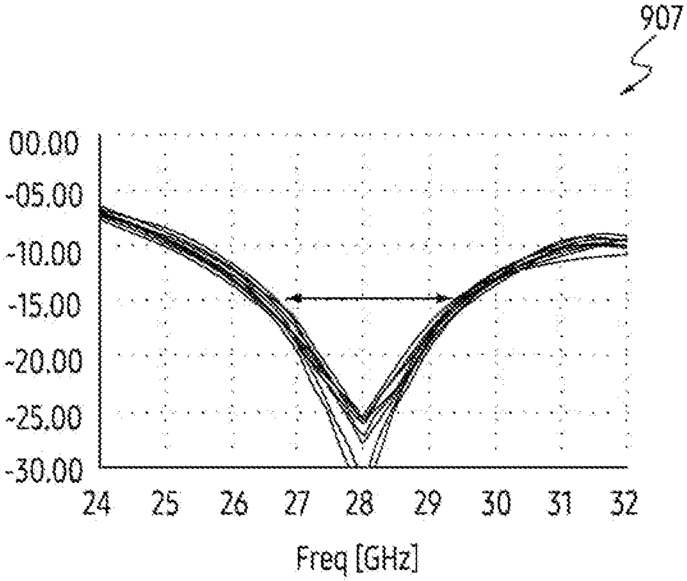

Referring to FIG. 9C, there are shown a graph 902 representing a passive S (scattering)-parameter of each of a plurality of antenna elements 940 in the second substrate 900, and a graph 907 representing a passive S-parameter of each of a plurality of antenna elements 940 in the second substrate 905. The passive S-parameter may represent a reflected component of a signal (e.g., energy, power, or voltage of the signal) relative to an input component for the signal radiated through a particular antenna element. The passive S-parameter may represent a metric that does not take into account the influence of antenna elements other than the particular antenna element of the plurality of antenna elements 940.

For example, a plurality of lines depicted in the graph 902 and the graph 907 may represent the gain as a function of frequency of the signal radiated by the plurality of antenna elements 940. In the graph 902 and the graph 907, the horizontal axis represents the frequency (in GHz) of the signal radiated by each antenna element of the plurality of antenna elements 940, and the vertical axis represents the gain (in decibels [dB]).

Referring to the graph 902 and the graph 907, the graph 902 indicates that, based on a gain of about −15 dB, the bandwidth of the signals radiated by the plurality of antenna elements 940 of the second substrate 900 may be about 2.5 GHz. Similarly, referring to the graph 904, based on the gain of about −15 dB, the bandwidth of the signals radiated by the plurality of antenna elements 940 of the second substrate 905 may be about 2.5 GHz. In other words, the characteristics of a reflected signal when a particular antenna element of the second substrate 905 is radiating a signal may be substantially similar to the characteristics of the reflected signal when a particular antenna element of the second substrate 900 is radiating a signal.

Referring to the foregoing description, even though a plurality of conductivity members 950 are added to the second substrate 900 as in the second substrate 905, the characteristics of the signal radiated by each antenna element may be maintained.

Figure 9D:
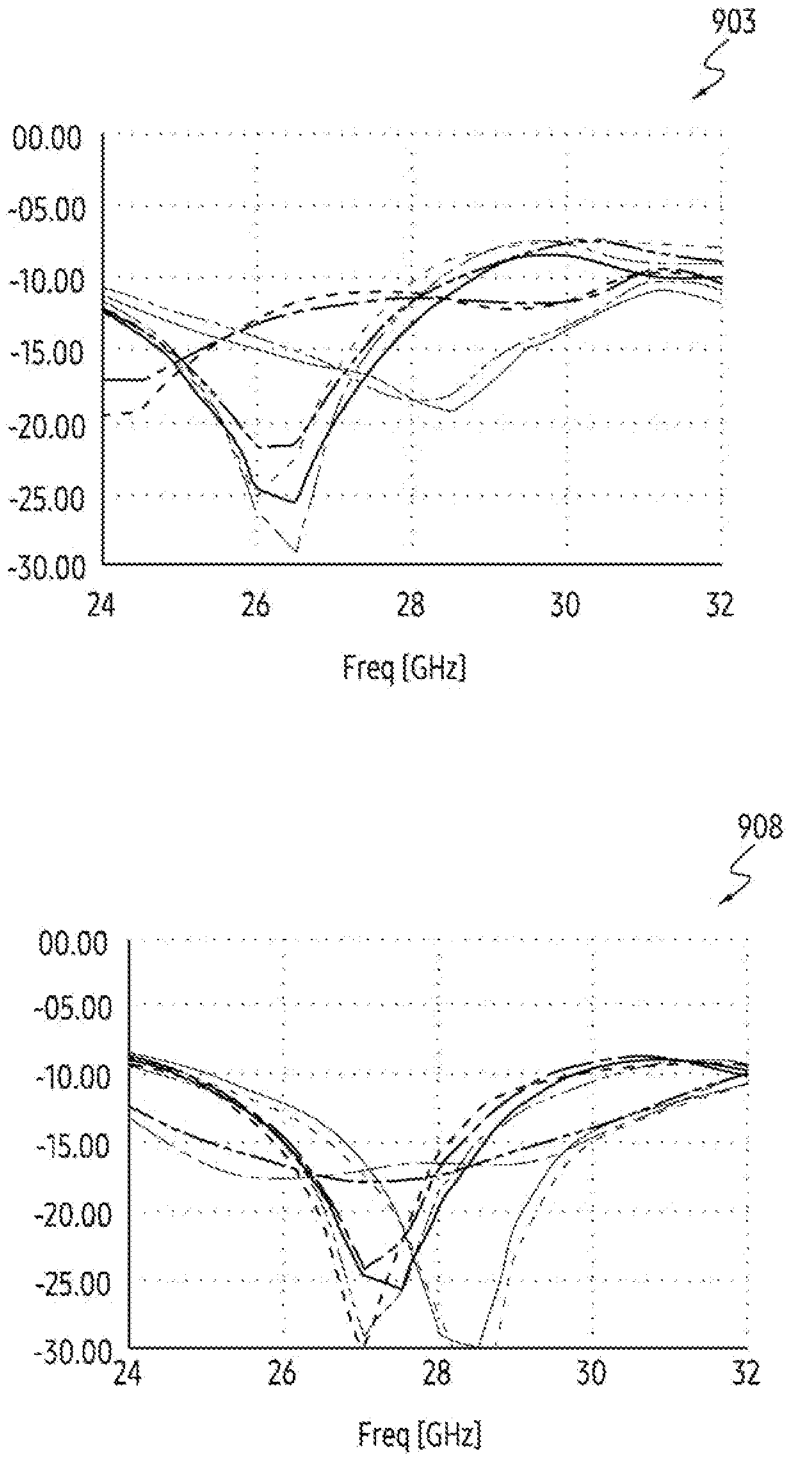

Referring to FIG. 9D, there are shown a graph 903 representing an active S-parameter of each of the plurality of antenna elements 940 in the second substrate 900 and a graph 908 representing an active S-parameter of each of the plurality of antenna elements 940 in the second substrate 905. The active S-parameter may represent a reflected component of a signal (e.g., energy, power, or voltage of the signal) relative to an input component of the signal radiated through a particular antenna element, and an interference component of a signal transmitted from antenna elements different from the particular antenna element. The active S-parameter may represent a metric that takes into account the influence of antenna elements other than the particular antenna element of the plurality of antenna elements 940.

For example, a plurality of lines shown in the graph 903 and the graph 908 may represent a gain as a function of frequency of the signal radiated by the plurality of antenna elements 940. In the graph 903 and the graph 908, the horizontal axis represents the frequency (in GHz) of the signal radiated by each antenna element of the plurality of antenna elements 940, and the vertical axis represents the gain (in decibels [dB]).

Referring to the graph 903, it may be seen that the characteristics of the signal is changed compared to the graph 902. For example, the graph 903 may indicate a decrease in the gain of the radiated signal (i.e., a decrease in the absolute value of the gain) compared to the graph 902. Further, referring to the graph 903, it may be seen that the values of the center frequency of the signal of each of the antenna elements do not converge onto a specific frequency (e.g., about 27.5 GHz) as in graph 902, and may be formed in a spread form.

In contrast, referring to the graph 908, it may be seen that the characteristics of the signal are comparatively maintained in the graph 908 compared to the graph 907. For example, the graph 908 shows that the gain of the radiated signal is maintained compared to the graph 907. Furthermore, the graph 908 shows that the values of the center frequency of the signal of each of the antenna elements are formed in a relatively dense form around a particular frequency in the graph 902 (e.g., about 28 GHz). In other words, in case where the plurality of antenna elements 940 of the second substrate 900 each radiate a signal, the influence of other antenna elements for a particular antenna element may be relatively large. In contrast, in case where the plurality of antenna elements 940 of the second substrate 905 each radiate a signal, the influence of other antenna elements for that particular antenna element may be relatively small.

Referring to the foregoing discussion, adding a plurality of conductivity members 950 to the second substrate 900 as in the second substrate 905, may reduce the influence in between the plurality of antenna elements 940. As such, the electronic device including a decoupling conductivity member according to an embodiment of the disclosure may reduce interference between antenna elements and maintain radiation performance of wireless signals.

Figure 10:
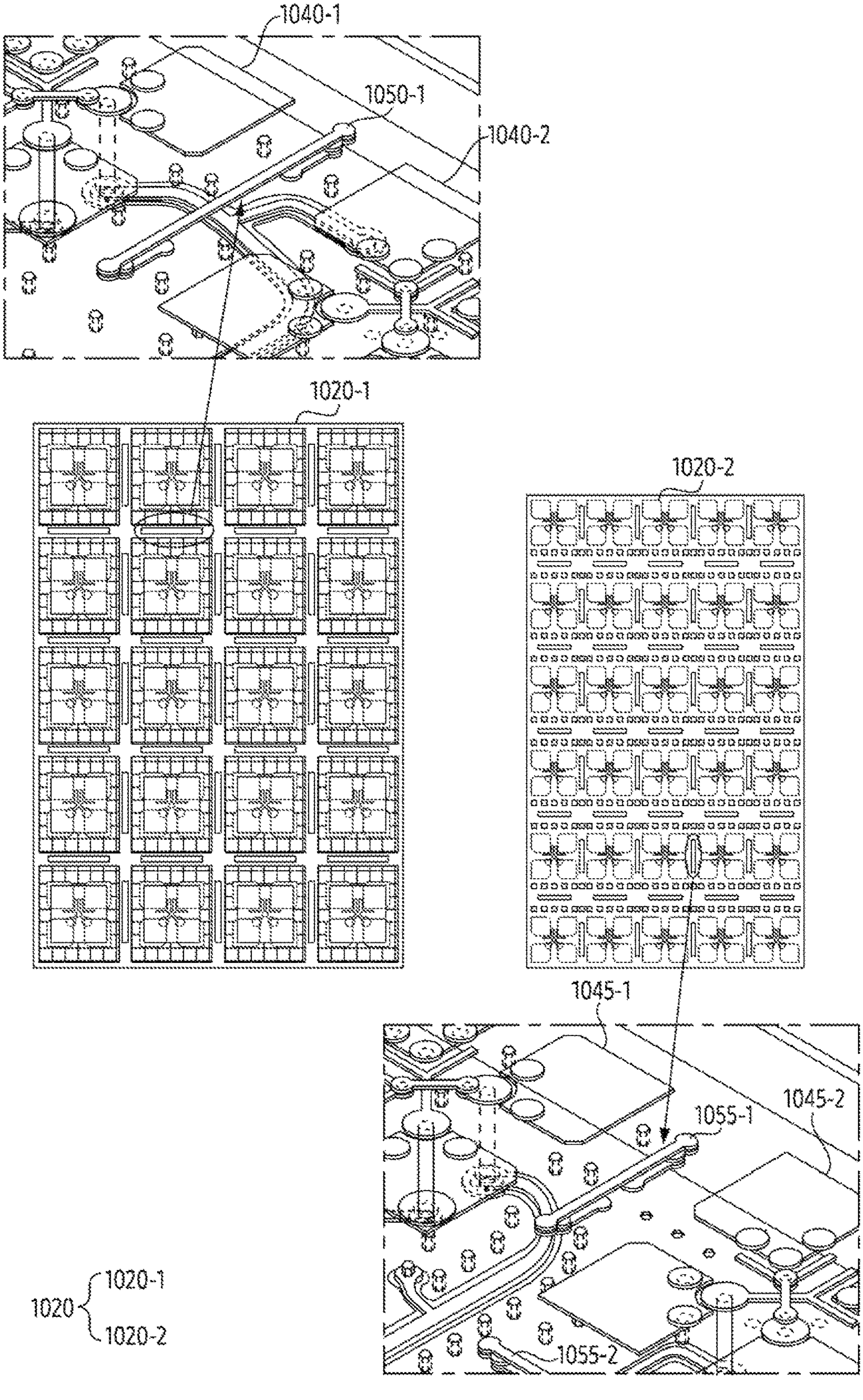
FIG. 10 illustrates examples of antenna substrates including decoupling conductivity members.

FIG. 10 illustrates examples of antenna substrates including decoupling conductivity members. For example, the antenna substrates may include the second substrate 620 of FIG. 6A. The antenna substrates may be included in the RU module 400 of FIG. 4. For example, the RU module 400 may be included in a base station 110 of FIG. 1, a terminal 120 of FIG. 1, an electronic device 200 of FIG. 2A, or any other device for radiating a wireless signal. For example, the decoupling conductivity member may be included in a plurality of conductivity members (e.g., the conductivity members 650 of FIGS. 6A and 6B).

FIG. 10 illustrates a plurality of second substrates 1020 included in the electronic device 200. For example, a second substrate 1020-1 may represent an antenna substrate (e.g., the antenna substrate 420 of FIG. 4) for a first frequency band (e.g., about 28 GHz band). For example, a second substrate 1020-2 may represent an antenna substrate (e.g., the antenna substrate 430 of FIG. 4) for a second frequency band (e.g., about 39 GHz band).

Referring to FIG. 10, the second substrate 1020-1 may include a plurality of antenna elements, a plurality of conductivity members, and a resonator. For example, the second substrate 1020-1 may include a first antenna element 1040-1 and a second antenna element 1040-2. For example, the second substrate 1020-1 may include a conductivity member 1050-1 between the first antenna element 1040-1 and the second antenna element 1040-2. Further, the second substrate 1020-2 may include a plurality of antenna elements, a plurality of conductivity members, and a resonator. For example, the second substrate 1020-2 may include a first antenna element 1045-1 and a second antenna element 1045-2. For example, the second substrate 1020-2 may include a conductivity member 1055-1 between the first antenna element 1045-1 and the second antenna element 1045-2. For example, the second substrate 1020-2 may include a conductivity member 1055-2 between the second antenna element 1045-2 and another antenna element.

Referring to FIG. 10, a plurality of second substrates 1020 included in an electronic device may include components of different sizes, different shapes, or different structures. For example, an antenna element on the second substrate 1020-1 may be a larger antenna element than an antenna element on the second substrate 1020-2. This is because the frequency band supported by the second substrate 1020-1 is a lower frequency band than the frequency band supported by the second substrate 1020-2. For example, the antenna element of the second substrate 1020-1 may be configured with a dipole antenna, and the antenna element of the second substrate 1020-2 may be configured with an ME dipole antenna. However, the embodiments of the disclosure are not limited thereto, and the antenna element of the second substrate 1020-1 may be configured with an antenna of the same structure as the antenna element of the second substrate 1020-2. For example, the conductivity member of the second substrate 1020-1 may be a conductivity member that is smaller in size than the conductivity member of the second substrate 1020-2. For example, the size of the conductivity member may include a length or a sum of lengths of the conductive portions that the conductivity member includes. For example, the shape of the conductivity member of the second substrate 1020-1 may be different from the shape of the conductivity member of the second substrate 1020-2. However, the embodiments of the disclosure are not limited thereto, and the shape of the conductivity member of the second substrate 1020-1 may be the same as the shape of the conductivity member of the second substrate 1020-2.

FIG. 10 illustrates an example where the second substrates 1020 include a feeding line for feeding a signal to an antenna element, but the embodiments of the disclosure are not limited thereto. For example, the first substrate (e.g., the first substrate 610 or the RU board 410 of FIG. 6A), other than the second substrates 1020, may include a feeding line.

FIGS. 11 to 18 illustrate examples of an RU module including at least one decoupling conductivity member. More specifically, FIGS. 11 to 18 illustrate examples of a stacked state of the RU module including the decoupling conductivity member.

Figure 11:
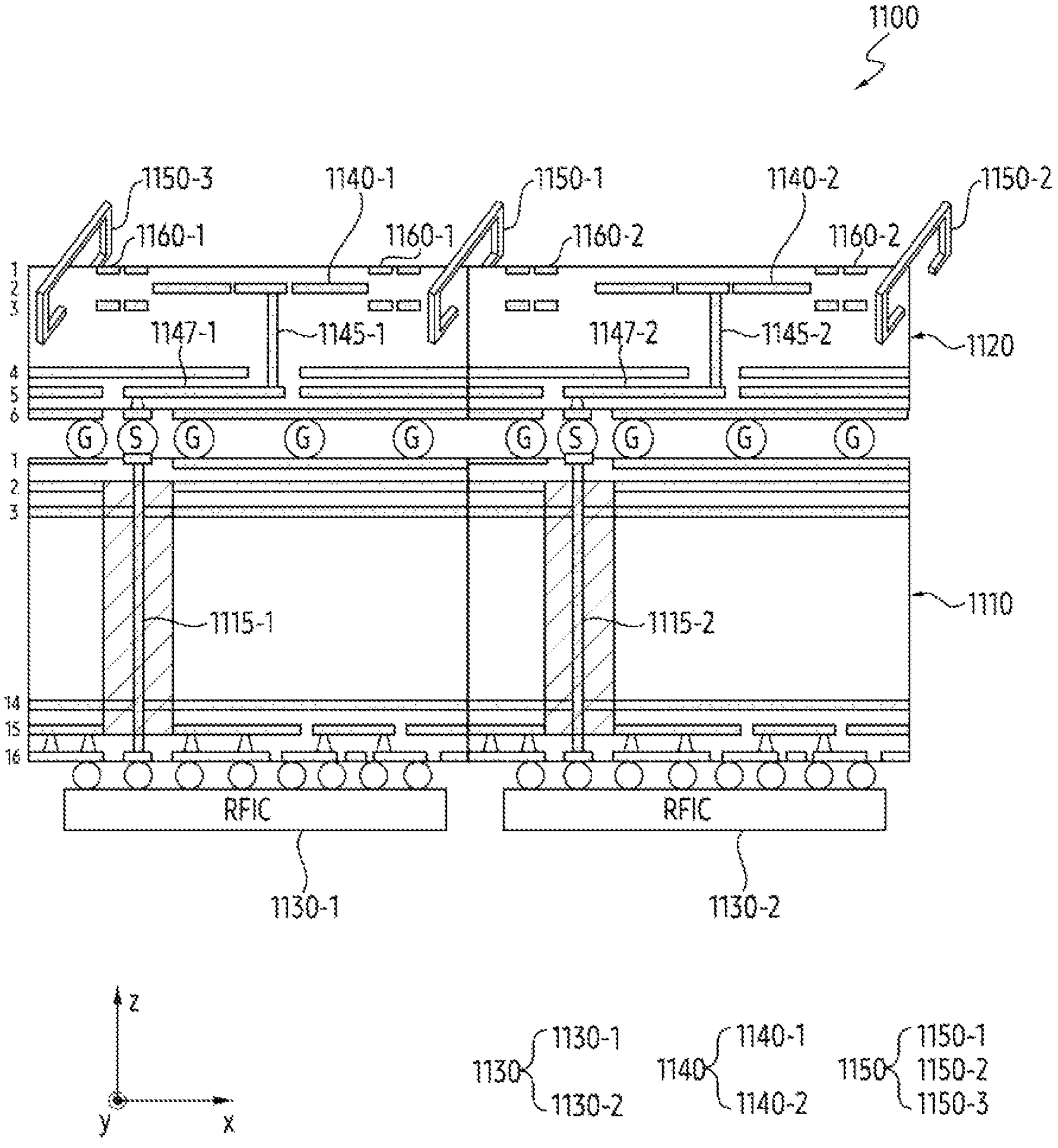
FIGS. 11 to 18 each illustrate examples of an RU module including decoupling conductivity members.

FIG. 11 illustrates an example 1100 of an RU module 400 including a decoupling conductivity member. For example, the RU module 400 may be included in an electronic device 200. For example, the electronic device 200 may include a base station 110 of FIG. 1, a terminal 120 of FIG. 1, or an apparatus for radiating a wireless signal.

The example 1100 may show an example where the RU module 400 is cut in a direction parallel to the x-z plane, viewed from the +y axis direction, in order to illustrate the stacked structure of the RU module. However, to represent the structure of conductivity members 1150 more specifically, the conductivity members 1150 are shown three-dimensionally.

According to an embodiment, the RU module 400 may include a first substrate 1110, a second substrate 1120, and radio frequency integrated circuits (RFICs) 1130. The structure illustrated in this example 1100 is only of a simplified example for convenience of explanation, and the embodiments of the disclosure are not limited thereto. For example, while the example 1100 illustrates an RU module 400 including one second substrate 1120, the embodiments of the disclosure are not limited thereto. For example, the RU module 400 may include a plurality of second substrates 1120. For example, the RU module 400 may include a plurality of second substrates 1120, like the antenna substrate 420 and the antenna substrate 430 of the RU module 400 as shown in FIG. 4. Further, while an example is shown where the RU module 400 includes two RFICs 1130, the embodiments of the disclosure are not limited thereto. For example, the RU module 400 may include one RFIC or three or more RFICs.

According to an embodiment, the first substrate 1110 may include a plurality of layers. The plurality of layers may be divided into layer regions comprising different materials. According to an embodiment, the plurality of layers may include a first layer region, a second layer region, and a third layer region. For example, the first substrate 1110 may be stacked in the order of the third layer region, the second layer region, and the first layer region, on the basis of the +z-axis direction. For example, the first layer region and the third layer region may include a material having a lower dissipation factor ($D_f$) than an FR (flame retardant)-4. The second layer region may include the FR-4. For example, the third layer region may include at least one layer (e.g., layer #14 to layer #16) adjacent to a first surface of the first substrate 1110 that is connected to the RFICs 1130. The first layer region may include at least one layer (e.g., layer #1 to layer #3) adjacent to a second surface opposite the first surface of the first substrate 1110 that is connected to the second substrate 1120. The layers of the first layer region and the second layer region may provide a relatively higher signal transfer performance, compared to the FR-4 layer.

In FIG. 11, a plurality of layers including three layer regions are illustrated, but the embodiments of the disclosure are not limited thereto. For example, the plurality of layers may include a first layer region and a second layer region. Further, for example, the first layer region may include a material having a lower dissipation factor ($D_f$) than the FR-4. The second layer region may comprise the FR-4. Further, the number of layers that each of the above layer regions includes may be varied. For example, FIG. 11 shows the first layer region having three layers, but the first layer region may have two layers.

According to an embodiment, the first substrate 1110 may include signal lines (1115-1, 1115-2). For example, the first substrate 1110 may include a signal line 1115-1 for connecting the first RFIC 1130-1 and the first antenna element 1140-1. The first substrate 1110 may include a signal line 1115-2 for connecting the second RFIC 1130-2 and the second antenna element 1140-2. For example, the signal lines (1115-1, 1115-2) may be formed across a plurality of layers of the first substrate 1110. Hereinafter, description is made on the basis of the signal line 1115-1, the description of the signal line 1115-1 may be also applied in the same manner to the signal line 1115-2.

According to an embodiment, the first substrate 1110 may include a coaxial plated through hole (PTH). The coaxial PTH may include a coaxial feeding line and a plated region surrounding the coaxial feeding line. For example, the coaxial feeding line may include the signal line 1115-1. For example, the signal line 1115-1 may be formed extending in a perpendicular direction (e.g., z-axis direction) with respect to the first substrate 1110. The coaxial feeding lines may be formed across a plurality of layers of the first substrate 1110. For example, the coaxial feeding line may be formed across the layer #1 to the layer #16 of first substrate 1110. The plated region may be formed across at least a portion of the plurality of layers, along the coaxial feeding line. For example, the plated region may be formed across the layer #2 to the layer #15 of first substrate 1110. For example, the signal lines 1115-1 may extend in a vertical direction (e.g., the +z-axis direction) to reduce transmission loss in transmitting signals obtained from the first RFIC 1130-1 to the antenna elements 1140. However, the embodiments of the disclosure are not limited to the particular structure of the signal line.

According to an embodiment, the first substrate 1110 may be coupled with the RFICs 1130. For example, the RFICs 1130 may be coupled to a first surface of the first substrate 1110. For example, the first surface may represent a surface opposite to the second surface where the first substrate 1110 is coupled to the second substrate 1120. For example, the first substrate 1110 may be electrically coupled to the RFICs 1130, via a grid array with the RFICs 1130. For example, the grid array may include a ball grid array (BGA). Further, example, the grid array may include a land grid array (LGA).

According to an embodiment, the first substrate 1110 may be coupled to the second substrate 1120. For example, the second substrate 1120 may be coupled to a second surface of the first substrate 1110. For example, the first substrate 1110 may be electrically connected to the second substrate 1120 via a grid array. For example, the grid array may include a BGA. Further, for example, the grid array may include an LGA.

According to an embodiment, the antenna elements may be electrically connected to the RFICs. For example, the first substrate 1110 may electrically connect the RFICs 1130 with the antenna elements 1140 of the second substrate 1120. For example, the first substrate 1110 may electrically connect the antenna elements 1140 and the RFICs 1130 via signal lines (1115-1, 1115-2) of the first substrate 1110. In other words, signals generated by the RFICs 1130 may be transferred to the antenna elements 1140 via the signal lines (1115-1, 1115-2) and the feeding lines (1147-1, 1147-2) of the first substrate 1110. For example, the signals may include RF signals. The grid array in a region where the signal lines (1115-1, 1115-2) are connected to the second substrate 1120 may be a grid array through which the signals generated by the RFIC are transferred. The grid array may be referred to as a signal line S. Another grid array around the signal line may act as a ground for shielding for the signal transfer characteristics. The other grid array may be referred to as a ground line (G). For example, the signal line may be arranged surrounded by a plurality of ground lines. In other words, the signal line may be electrically shielded. Accordingly, the signal transfer characteristics can be improved.

According to an embodiment, the second substrate 1120 may include a plurality of layers. For example, the plurality of layers may include the antenna elements 1140, the conductivity members 1150, the resonators 1160, and the feeding lines (1147-1, 1147-2). For example, the antenna elements 1140 may be disposed on at least one first layer (e.g., layer #2). For example, conductivity members 1150 may be disposed across a plurality of second layers (e.g., layers #1 to #3). For example, the resonators 1160 may be disposed across at least some layers (e.g., layers #1 and #3) of the plurality of second layers. For example, the feeding lines (1147-1, 1147-2) may be disposed on the third layer (e.g., layer #5) different from the at least one first layer and the plurality of second layers, amongst the plurality of layers. In other words, the second substrate 1120 may include the antenna elements 1140, the conductivity members 1150, the resonators 1160, and the feeding lines (1147-1, 1147-2).

FIG. 11 illustrates an example 1100 of the RU module 400 including the resonators 1160 for convenience of description, but the embodiments of the disclosure are not limited thereto. According to an embodiment, the RU module 400 may not include the resonators 1160.

According to an embodiment, the number of the plurality of layers of the second substrate 1120 may be less than the number of the plurality of layers of the first substrate 1110. For example, a height in the z-axis direction of the first substrate 1110 may be formed larger than a height in the z-axis direction of the second substrate 1120. According to an embodiment, the number of the plurality of layers of the second substrate 1120 may be varied depending upon the components included therein. For example, in case where the second substrate 1120 includes the feeding lines 1147, the number of the plurality of layers of the second substrate 1120 may be increased compared to a case where the second substrate 1120 does not include the feeding lines 1147.

According to an embodiment, the RFICs 1130 may generate an RF signal for radiating through the antenna elements 1140. For example, the signal generated by the first RFIC 1130-1 may be transferred to the first antenna element 1140-1 via the signal line 1115-1 of the first substrate 1110, the feeding line 1147-1 of the second substrate 1120, and the signal line 1145-1. For example, a signal generated by the second RFIC 1130-2 may be transferred to the second antenna element 1140-2 via the signal line 1115-2 of the first substrate 1110, the feeding line 1147-2 of the second substrate 1120, and the signal line 1145-2. According to an embodiment, the first RFIC 1130-1 connected with the first antenna element 1140-1 and the second RFIC 1130-2 connected with the second antenna element 1140-2 may generate the same signal as each other. For example, the RU module 400 may transmit the same signal through the plurality of antenna elements 1140 to transmit the signal with beamforming. The same signal may represent a signal including the same information or data. In this circumstance, the first RFIC 1130-1 and the second RFIC 1130-2 may be referred to as one set of RFICs. As described above, the first RFIC 1130-1 and the second RFIC 1130-2 may be configured of one RFIC. A plurality of signals generated by the one RFIC may be radiated via the first antenna element 1140-1 and the second antenna element 1140-2.

Referring to the above description, the example 1100 illustrates the RU module 400 in which the first RFIC 1130-1 of two RFICs 1130 is connected with the antenna element 1140-1 and the second RFIC 1130-2 is connected with the antenna element 1140-2. However, the embodiments of the disclosure are not limited thereto. For example, the RU module 400 may be configured to include a single RFIC connected with the antenna elements (1140-1, 1140-2). Alternatively, the first RFIC 1130-1 may be connected with a plurality of antenna elements including the first antenna element 1140-1, and the second RFIC 1130-2 may be connected with a plurality of antenna elements including the second antenna element 1140-2.

According to an embodiment, the antenna elements 1140 may be disposed on the second substrate 1120. For example, the antenna elements 1140 may be disposed on the at least one first layer of the second substrate 1120. For example, the antenna elements 1140 may be disposed on one first layer of the second substrate 1120. Alternatively, the antenna elements 1140 may be disposed across a plurality of first layers of the second substrate 1120.

According to an embodiment, the antenna elements 1140 may be connected to the feeding lines (1147-1, 1147-2) via the signal lines (1145-1, 1145-2). For example, the first antenna element 1140-1 may be connected to the feeding line 1147-1 via the signal line 1145-1. The second antenna element 1140-2 may be connected to the feeding line 1147-2 via the signal line 1145-2. For example, the signal line may include a coaxial plated through hole (PTH). The signal line may be referred to as a via hole.

According to an embodiment, each antenna element of the antenna elements 1140 may include a radiator. For example, each antenna element of the antenna elements 1140 may include a first radiator connected to the signal lines (1115-1, 1115-2), the feeding lines (1147-1, 1147-2), and the signal lines (1145-1, 1145-2). The first radiator may be referred to as a main radiator. For example, each antenna element including the first radiator may include a patch antenna, a dipole antenna, or a magneto-electric (ME) dipole antenna.

According to an embodiment, the conductivity members 1150 may be disposed between the antenna elements 1140. For example, the conductivity member 1150-1 may be disposed in a region between the first antenna element 1140-1 and the second antenna element 1140-2. For example, the region may include a position where a distance spaced apart from the first antenna element 1140-1 and a distance spaced apart from the second antenna element 1140-2 are the same as each other. In other words, the region may represent an area that includes a center point between the center of the first antenna element 1140-1 and the center of the second antenna element 1140-2. In FIG. 11, two antenna elements (1140-1, 1140-2) are illustrated for convenience of description, but the second substrate 1120 may include a greater number of antenna elements 1140. Thus, the conductivity member 1150-2 may be disposed in a region between the second antenna element 1140-2 and another antenna element, and the conductivity member 1150-3 may be disposed in a region between the first antenna element 1140-1 and another antenna element.

According to an embodiment, the conductivity members 1150 may be disposed on the plurality of second layers of the second substrate 1120. The conductivity members 1150 may have various shapes. In one embodiment, in the example 1100 of FIG. 11, each of the conductivity members 1150 may be formed in a folded shape. However, embodiments of the disclosure are not limited thereto, and the embodiments of the disclosure may include various shapes of conductivity members as illustrated above with reference to FIGS. 7A to 8B.

According to an embodiment, the conductivity members 1150 may be formed of a conductive material. For example, each of the conductivity members 1150 formed of a conductive material (e.g., copper) may be disposed in a region between the antenna elements to resonate with respect to a signal radiated by each antenna element to generate a signal having a changed phase (or phase and amplitude). For example, when the first antenna element 1140-1 radiates a signal obtained from the first RFIC 1130-1, the conductivity member 1150-1 may generate a signal of which phase is changed with respect to the signal. The changed signal and other signal, which is radiated from the first antenna element 1140-1 and directed to the second antenna element 1140-2, may be offset with each other. For example, the changed signal may be a signal of which phase is inverted by about 180° with respect to the other signal. Further, for example, the changed signal may be a signal of which amplitude and phase are changed with respect to the other signal. The changed phase may be greater than or less than about 180°. Accordingly, interference with the second antenna element 1140-2, which may be caused by the first antenna element 1140-1 radiating a signal, may be reduced.

According to an embodiment, the resonators 1160 may be disposed with respect to each antenna element of the antenna elements 1140. For example, the first resonators 1160-1 may be disposed with respect to the first antenna element 1140-1 across at least a portion of the plurality of second layers. The second resonators 1160-2 may be disposed with respect to the second antenna element 1140-2 across at least a portion of the plurality of second layers. As in the example 1100, the resonators 1160 may be disposed on a layer different from the layer on which the antenna elements are arranged. However, the embodiments of the disclosure are not limited thereto, and the resonators 1160 may be disposed on the same layer as the layer on which the antenna elements are arranged. The resonators 1160 may increase a gain of an antenna element related thereto and expand a frequency band of a signal radiated through the related antenna element. For example, the resonators 1160 may comprise a metamaterial.

Figure 12:
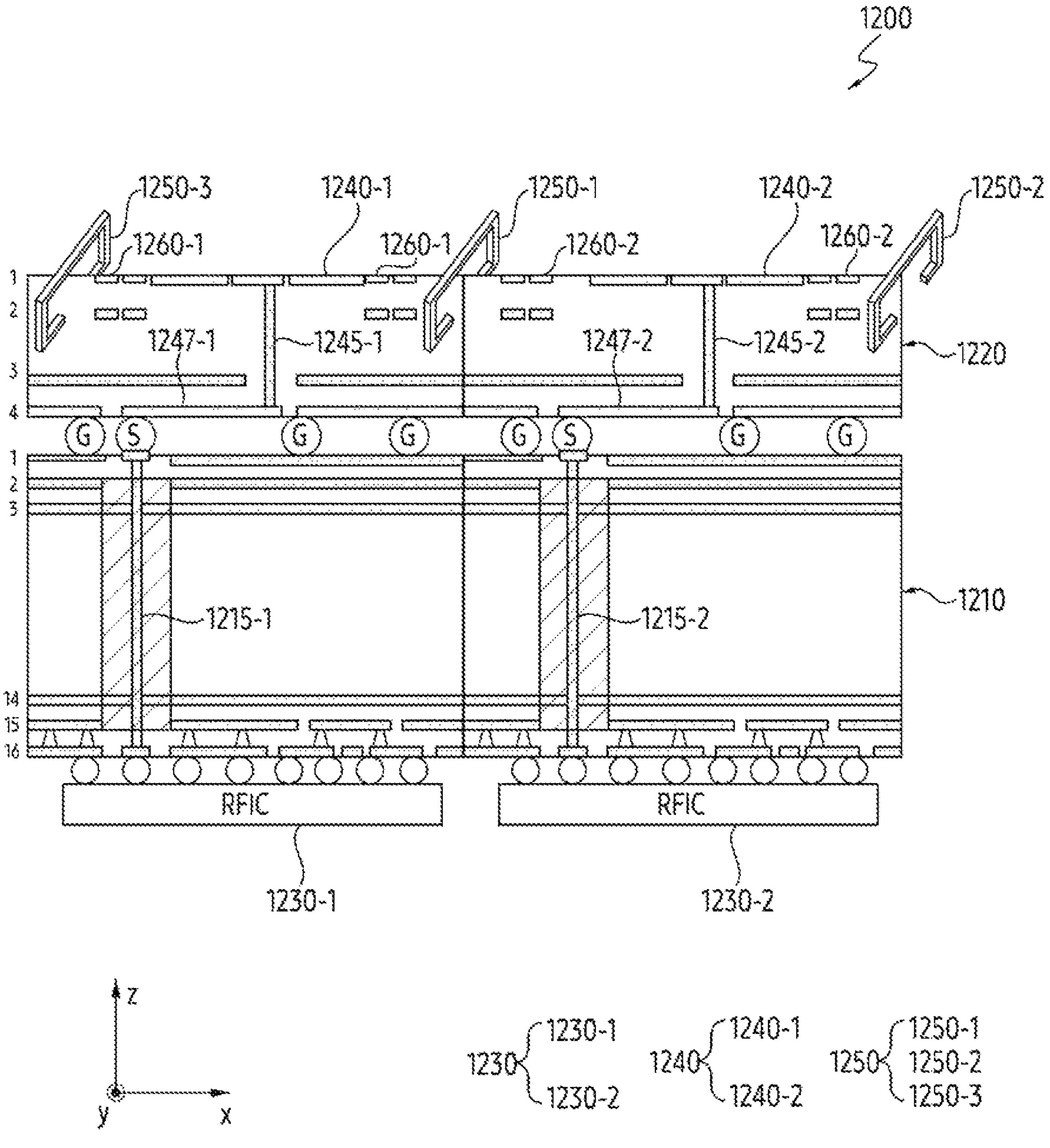

FIG. 12 shows an example 1200 of an RU module 400 including a decoupling conductivity member. For example, the RU module 400 may be included in an electronic device 200. For example, the electronic device 200 may include a base station 110 of FIG. 1, a terminal 120 of FIG. 1, or an apparatus for radiating a wireless signal.

The example 1200 shows an example of cutting the RU module 400 in a direction parallel to the x-z plane, viewed in the +y-axis direction, in order to show the stacked structure of the RU module 400. However, in order to represent the structure of the conductivity members 1250 more specifically, the conductivity members 1250 are shown three-dimensionally.

According to an embodiment, the RU module 400 may include a first substrate 1210, a second substrate 1220, and radio frequency integrated circuits (RFICs) 1230. The structure shown in the example 1200 is only of a simplified example for convenience of description, and the embodiments of the disclosure are not limited thereto. For example, in the example 1200, the RU module 400 including one second substrate 1220 is illustrated as an example, but the embodiments of the disclosure are not limited thereto. For example, the RU module 400 may include a plurality of second substrates 1220. For example, like the antenna substrate 420 and the antenna substrate 430 of the RU module 400 of FIG. 4, the RU module 400 may include a plurality of second substrates 1220. Further, for example, an example in which the RU module 400 includes two RFICs 1230 is illustrated, but the embodiments of the disclosure are not limited thereto. For example, the RU module 400 may include one RFIC or three or more RFICs.

According to an embodiment, the first substrate 1210 may include a plurality of layers. The plurality of layers may be divided into some layer regions made of different materials. According to an embodiment, the plurality of layers may include a first layer region, a second layer region, and a third layer region. For example, the first substrate 1210 may be stacked in the order of the third layer region, the second layer region, and the first layer region with respect to the +z-axis direction. For example, the first layer region and the third layer region may be formed of a material having a low dissipation factor ($D_f$) compared to a flame retardant (FR)-4. The second layer region may include the FR-4. For example, the third layer region may include at least one layer (e.g., layer #14 to layer #16) adjacent to a first surface of the first substrate 1210 connected to the RFICs 1230. The first layer region may include at least one layer (e.g., layer #1 to layer #3) adjacent to a second surface opposite to the first surface of the first substrate 1210 connected to the second substrate 1220. Layers of the first layer region and the second layer region may provide relatively higher signal transfer performance compared to the FR-4 layer.

In FIG. 12, a plurality of layers including three layer regions are shown, but the embodiments of the disclosure are not limited thereto. For example, the plurality of layers may include a first layer region and a second layer region. Further, for example, the first layer region may be made of a material having a dissipation factor ($D_f$) lower than that of the FR-4. The second layer region may include the FR-4. Further, the number of layers included in each of the layer regions may be altered. For example, FIG. 12 illustrates the first layer region including three layers, but the first layer region may include two layers.

According to an embodiment, the first substrate 1210 may include signal lines (1215-1, 1215-2). For example, the first substrate 1210 may include a signal line 1215-1 for connecting the first RFIC 1230-1 and the first antenna element 1240-1. The first substrate 1210 may include a signal line 1215-2 for connecting the second RFIC 1230-2 and the second antenna element 1240-2. For example, the signal lines (1215-1, 1215-2) may be formed across the plurality of layers of the first substrate 1210. Hereinafter, description is made on the basis of the signal line 1215-1, but the description of this signal line 1215-1 may be also applied to the signal line 1215-2 in the same manner.

According to an embodiment, the first substrate 1210 may include a coaxial plated through hole (PTH). The coaxial PTH may include a coaxial feeding line and a plated region surrounding the coaxial feeding line. For example, the coaxial feeding line may include a signal line 1215-1. For example, the signal line 1215-1 may be formed to extend in a vertical direction (e.g., the z-axis direction) with respect to the first substrate 1210. The coaxial feeding line may be formed across a plurality of layers of the first substrate 1210. For example, the coaxial feeding line may be formed across the layer #1 to the layer #16 of the first substrate 1210. The plated region may be formed across at least a portion of the plurality of layers along the coaxial feeding line. For example, the plated region may be formed across the layer

#2 to the layer #15 of the first substrate 1210. For example, the signal line 1215-1 may extend in a vertical direction (e.g., the +z-axis direction) to reduce loss in transferring the signal obtained from the first RFIC 1230-1 to the antenna elements 1240. However, the embodiments of the disclosure are not limited to the particular structure of the signal line.

According to an embodiment, the first substrate 1210 may be coupled to the RFICs 1230. For example, the RFICs 1230 may be coupled to a first surface of the first substrate 1210. For example, the first surface may refer to a surface opposite to a second surface on which the first substrate 1210 is coupled to the second substrate 1220. For example, the first substrate 1210 may be electrically coupled to the RFICs 1230 through a grid array with the RFICs 1230. For example, the grid array may include a ball grid array (BGA). Further, for example, the grid array may include an LGA.

According to an embodiment, the first substrate 1210 may be coupled to the second substrate 1220. For example, the second substrate 1220 may be coupled to the second surface of the first substrate 1210. For example, the first substrate 1210 may be electrically connected to the second substrate 1220 through a grid array. For example, the grid array may include a BGA. Further, for example, the grid array may include an LGA.

According to an embodiment, the antenna elements may be electrically connected to the RFIC. For example, the first substrate 1210 may electrically connect the antenna elements 1240 and the RFICs 1230 of the second substrate 1220. For example, the first substrate 1210 may electrically connect the antenna elements 1240 and the RFICs 1230 through signal lines (1215-1, 1215-2) of the first substrate 1210. In other words, signals generated from the RFICs 1230 may be transferred to the antenna elements 1240 through the signal lines (1215-1, 1215-2) of the first substrate 1210 and the feeding lines (1247-1, 1247-2). For example, the signals may include an RF signal. The grid array in a region in which the signal lines (1215-1, 1215-2) are connected to the second substrate 1220 may be a grid array through which a signal generated by the RFIC is transferred. The grid array may be referred to as a signal line S. Another grid array around the signal line may act as aground for shielding for the signal transfer characteristics. The other grid array may be referred to as a ground line G. For example, the signal line may be disposed surrounded by a plurality of ground lines. In other words, the signal line may be electrically shielded. Therefore, the signal transfer characteristics may be improved.

According to an embodiment, the second substrate 1220 may include a plurality of layers. For example, the plurality of layers may include the antenna elements 1240, the conductivity members 1250, the resonators 1260, and the feeding lines (1247-1, 1247-2). For example, the antenna elements 1240 may be disposed on at least one first layer (e.g., layer #2). For example, the conductivity members 1250 may be arranged across a plurality of second layers (e.g., layer #1 to layer #2). For example, the resonators 1260 may be arranged across at least some layers (e.g., layer #1 to layer #2) of the plurality of second layers. For example, the feeding lines (1247-1, 1247-2) may be disposed on a third layer (e.g., layer #4) different from the at least one first layer and the plurality of second layers, amongst the plurality of layers. In other words, the second substrate 1220 may include the antenna elements 1240, the conductivity members 1250, the resonators 1260, and the feeding lines (1247-1, 1247-2).

According to an embodiment, the feeding lines (1247-1, 1247-2) may be connected to the signal lines (1215-1, 1215-2) of the first substrate 1210 via a grid array. For example, the feeding line 1247-1 may be connected to the signal line 1215-1 via a signal grid array. For example, the feeding line 1247-2 may be connected to the signal line 1215-2 via a signal grid array. The feeding lines (1247-1, 1247-2) of FIG. 12 and the feeding lines (1147-1, 1147-2) of FIG. 11 may be directly connected to the signal grid array and not connected to the signal grid array through a via. Accordingly, the number of layers of the second substrate 1220 of FIG. 12 may be less than the number of layers of the second substrate 1120 of FIG. 11.

While FIG. 12 illustrates the example 1200 of the RU module 400 including the resonators 1260 for convenience of description, the embodiments of the disclosure are not limited thereto. According to an embodiment, the RU module 400 may not include the resonators 1260.

According to an embodiment, the number of the plurality of layers of the second substrate 1220 may be less than the number of the plurality of layers of the first substrate 1210. For example, the height of the first substrate 1210 in the z-axis direction may be larger than the height of the second substrate 1220 in the z-axis direction. According to an embodiment, the number of the plurality of layers of the second substrate 1220 may be subject to a change depending upon the components included therein. For example, in case where the second substrate 1220 includes the feeding lines 1247, the number of the plurality of layers of the second substrate 1220 may be increased compared to a case where the second substrate 1220 does not include the feeding lines 1247.

According to an embodiment, the RFICs 1230 may generate an RF signal for radiating through the antenna elements 1240. For example, the signal generated by the first RFIC 1230-1 may be transmitted to the first antenna element 1240-1 via the signal line 1215-1 of the first substrate 1210, the feeding line 1247-1 of the second substrate 1220, and the signal line 1245-1. For example, the signal generated by the second RFIC 1230-2 may be transmitted to the second antenna element 1240-2 via the signal line 1215-2 of the first substrate 1210, the feeding line 1247-2 of the second substrate 1220, and the signal line 1245-2. According to an embodiment, the first RFIC 1230-1 connected to the first antenna element 1240-1 and the second RFIC 1230-2 connected to the second antenna element 1240-2 may generate the same signal. For example, in order to transmit a signal with beamforming, the RU module 400 may transmit the same signal through a plurality of antenna elements 1240. The same signal may represent a signal including the same information or data. In this context, the first RFIC 1230-1 and the second RFIC 1230-2 may be referred to as one set of RFICs. As described above, the first RFIC 1230-1 and the second RFIC 1230-2 may be configured of one RFIC. A plurality of signals generated by the one RFIC may be radiated through the first antenna element 1240-1 and the second antenna element 1240-2.

Referring to the foregoing description, the example 1200 illustrates the RU module 400 in which the first RFIC 1230-1 of two RFICs 1230 is connected to the antenna element 1240-1 and the second RFIC 1230-2 of two RFICs 1230 is connected to the antenna element 1240-2. However, the embodiments of the disclosure are not limited thereto. For example, the RU module 400 may be configured such that one RFIC is connected to the antenna elements (1240-1, 1240-2). Alternatively, the first RFIC 1230-1 may be connected to a plurality of antenna elements including the first antenna element 1240-1, and the second RFIC 1230-2 may be connected to a plurality of antenna elements including the second antenna element 1240-2.

According to an embodiment, the antenna elements 1240 may be disposed on the second substrate 1220. For example, the antenna elements 1240 may be disposed on the at least one first layer of the second substrate 1220. For example, the antenna elements 1240 may be disposed on one first layer of the second substrate 1220. Alternatively, the antenna elements 1240 may be arranged across a plurality of first layers of the second substrate 1220.

According to an embodiment, the antenna elements 1240 may be connected to the feeding lines (1247-1, 1247-2) through the signal lines (1245-1, 1245-2). For example, the first antenna element 1240-1 may be connected to the feeding line 1247-1 through the signal line 1245-1. The second antenna element 1240-2 may be connected to the feeding line 1247-2 through the signal line 1245-2. For example, the signal line may include a coaxial plated through hole (PTH). The signal line may be referred to as a via hole.

According to an embodiment, each antenna element of the antenna elements 1240 may include a radiator. For example, each antenna element of the antenna elements 1240 may include a first radiator connected to the signal lines (1215-1, 1215-2), the feeding lines (1247-1, 1247-2), and the signal lines (1245-1, 1245-2). The first radiator may be referred to as a main radiator. For example, each antenna element including the first radiator may include a patch antenna, a dipole antenna, or a magneto-electric (ME) dipole antenna.

According to an embodiment, the conductivity members 1250 may be disposed between the antenna elements 1240. For example, the conductivity member 1250-1 may be disposed in a region between the first antenna element 1240-1 and the second antenna element 1240-2. For example, the region may include a position in which a distance spaced apart from the first antenna element 1240-1 and a distance spaced apart from the second antenna element 1240-2 are the same as each other. In other words, the region may represent an area including a center point between the center of the first antenna element 1240-1 and the center of the second antenna element 1240-2. In FIG. 12, two antenna elements 1240-1 and 1240-2 are illustrated for convenience of description, but the second substrate 1220 may include a greater number of antenna elements 1240. Thus, the conductivity member 1250-2 may be disposed in a region between the second antenna element 1240-2 and another antenna element, and the conductivity member 1250-3 may be disposed in a region between the first antenna element 1240-1 and another antenna element.

According to an embodiment, the conductivity members 1250 may be disposed on the plurality of second layers of the second substrate 1220. The conductivity members 1250 may have various shapes. For example, in the example 1200 of FIG. 12, each of the conductivity members 1250 may be formed in a folded shape. However, the embodiments of the disclosure are not limited thereto, and the embodiments of the disclosure may include the various shapes of conductivity members of FIGS. 7A to 8B as described above.

According to an embodiment, the conductivity members 1250 may be formed of a conductive material. For example, each of the conductivity members 1250 made of a conductive material (e.g., copper) may be disposed in a region between the antenna elements to resonate with respect to a signal radiated by each antenna element to generate a signal having a changed phase (or phase and amplitude). For example, when the first antenna element 1240-1 radiates a signal obtained from the first RFIC 1230-1, the conductivity member 1250-1 may generate a signal of which phase is changed with respect to the signal. The changed signal and other signal radiated from the first antenna element 1240-1 and directed to the second antenna element 1240-2 may be offset with each other. For example, the changed signal may be a signal of which phase is inverted by about 180° with respect to the other signal. Further, for example, the changed signal may be a signal of which amplitude and phase are changed with respect to the other signal. The changed phase may be greater than or less than about 180°. Therefore, interference with the second antenna element 1240-2, which may be caused by the first antenna element 1240-1 radiating the signal, may be reduced.

According to an embodiment, the resonators 1260 may be disposed with respect to each antenna element of the antenna elements 1240. For example, the first resonators 1260-1 may be disposed with respect to the first antenna element 1240-1 across at least a portion of the plurality of second layers. The second resonators 1260-2 may be disposed with respect to the second antenna element 1240-2 across at least a portion of the plurality of second layers. As in the example 1200, the resonators 1260 may be disposed on a layer different from the layer on which the antenna element is disposed. However, the embodiments of the disclosure are not limited thereto, and the resonators 1260 may be disposed on the same layer as the layer on which the antenna elements are disposed. The resonators 1260 may increase a gain of an antenna element related thereto and expand a frequency band of a signal radiated through the related antenna element. For example, the resonators 1260 may comprise a metamaterial.

Figure 13:
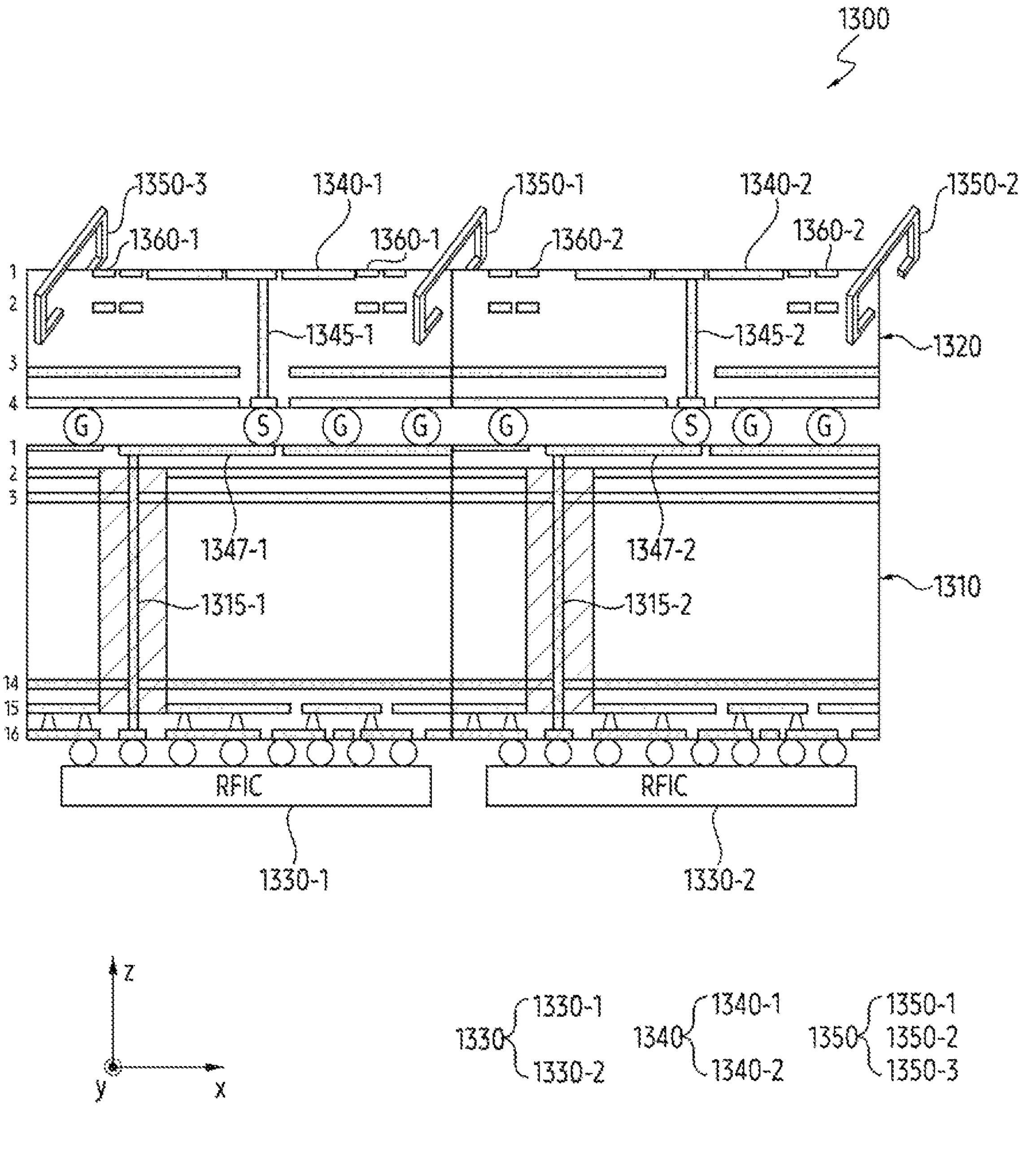

FIG. 13 illustrates an example 1300 of an RU module 400 including a decoupling conductivity member. For example, the RU module 400 may be included in an electronic device 200. For example, the electronic device 200 may include a base station 110 of FIG. 1, a terminal 120 of FIG. 1, or an apparatus for radiating a wireless signal.

The example 1300 may show an example of cutting the RU module 400 in the direction parallel to the x-z plane, viewed in the +y-axis direction, in order to illustrate the stacked structure of the RU module 400. However, in order to represent the structure of the conductivity members 1350 more specifically, the conductivity members 1350 are shown three-dimensionally.

According to an embodiment, the RU module 400 may include a first substrate 1310, a second substrate 1320, and radio frequency integrated circuits (RFICs) 1330. The structure shown in the example 1300 is only of a simplified example for convenience of description, and the embodiments of the disclosure are not limited thereto. For example, in the example 1300, the RU module 400 including one second substrate 1320 is illustrated as an example, but the embodiments of the disclosure are not limited thereto. For example, the RU module 400 may include a plurality of second substrates 1320. For example, like the antenna substrate 420 and the antenna substrate 430 of the RU module 400 of FIG. 4, the RU module 400 may include a plurality of second substrates 1320. Further, for example, while it is shown an example of the RU module 400 including two RFICs 1330, the embodiments of the disclosure are not limited thereto. For example, the RU module 400 may include one RFIC or three or more RFICs.

According to an embodiment, the first substrate 1310 may include a plurality of layers. The plurality of layers may be divided into some layer regions made of different materials. According to an embodiment, the plurality of layers may include a first layer region, a second layer region, and a third layer region. For example, the first substrate 1310 may be stacked in the order of the third layer region, the second layer region, and the first layer region, with respect to the +z-axis direction. For example, the first layer region and the third layer region may be formed of a material having a dissipation factor ($D_f$) lower than an FR-4. The second layer region may include the FR-4. For example, the third layer region may include at least one layer (e.g., layers #14 to #16) adjacent to a first surface of the first substrate 1310 connected to the RFICs 1330. The first layer region may include at least one layer (e.g., layers #1 to #3) adjacent to a second surface opposite to the first surface of the first substrate 1310 connected to the second substrate 1320. Layers of the first layer region and the second layer region may provide relatively higher signal transfer performance compared to the FR-4 layer.

In FIG. 13 are shown a plurality of layers including three layer regions, but the embodiments of the disclosure are not limited thereto. For example, the plurality of layers may include a first layer region and a second layer region. Further, for example, the first layer region may be formed of a material having a dissipation factor ($D_f$) lower than that of FR-4. The second layer region may include the FR-4. Further, the number of layers included in each of the layer regions may be subject to a change. For example, FIG. 13 illustrates the first layer region including three layers, but the first layer region may include two layers.

According to an embodiment, the plurality of layers of the first substrate 1310 may include feeding lines (1347-1, 1347-2). For example, the feeding lines (1347-1, 1347-2) may be disposed on a third layer (e.g., layer #1) corresponding to the second surface of the plurality of layers of the first substrate 1310. Unlike other examples 1100 and 1200, the example 1300 of FIG. 13 may include the feeding line in the first substrate 1310. In FIG. 13, the third layer is shown as a layer corresponding to the second surface, but the embodiments of the disclosure are not limited thereto. The third layer may be a layer (e.g., layer #2) under the layer corresponding to the second surface. According to an embodiment, the feeding lines (1347-1, 1347-2) of the first substrate 1310 may be connected to the signal lines (1315-1, 1315-2). For example, the feeding line 1347-1 may be connected to the signal line 1315-1. For example, the feeding line 1347-2 may be connected to the signal line 1315-2.

According to an embodiment, the first substrate 1310 may include the signal lines (1315-1, 1315-2). For example, the first substrate 1310 may include a signal line 1315-1 for connecting the first RFIC 1330-1 and the first antenna element 1340-1. The first substrate 1310 may include a signal line 1315-2 for connecting the second RFIC 1330-2 and the second antenna element 1340-2. For example, the signal lines may be formed across the plurality of layers of the first substrate 1310.

According to an embodiment, the first substrate 1310 may include a coaxial plated through hole (PTH). The coaxial PTH may include a coaxial feeding line and a plated region surrounding the coaxial feeding line. For example, the coaxial feeding line may include the signal line 1315-1. For example, the signal line 1315-1 may be formed to extend in a vertical direction (e.g., the z-axis direction) with respect to the first substrate 1310. The coaxial feeding line may be formed across a plurality of layers of the first substrate 1310. For example, the coaxial feeding line may be formed across the layer #1 to the layer #16 of the first substrate 1310. The plated region may be formed across at least a portion of the plurality of layers along the coaxial feeding line. For example, the plated region may be formed across the layer #2 to the layer #15 of the first substrate 1310. For example, the signal line 1315-1 may extend in the vertical direction (e.g., the +z-axis direction) to reduce loss in transferring the signal obtained from the first RFIC 1330-1 to the antenna elements 1340. However, the embodiments of the disclosure are not limited to the particular structure of the signal line.

According to an embodiment, the first substrate 1310 may be coupled to the RFICs 1330. For example, the RFICs 1330 may be coupled to the first surface of the first substrate 1310. For example, the first surface may represent a surface opposite to the second surface on which the first substrate 1310 is coupled to the second substrate 1320. For example, the first substrate 1310 may be electrically coupled to the RFICs 1330 through a grid array with the RFICs 1330. For example, the grid array may include a BGA. Further, for example, the grid array may include an LGA.

According to an embodiment, the first substrate 1310 may be coupled to the second substrate 1320. For example, the second substrate 1320 may be coupled to the second surface of the first substrate 1310. For example, the first substrate 1310 may be electrically connected to the second substrate 1320 through a grid array. For example, the grid array may include a BGA. Further, for example, the grid array may include an LGA.

According to an embodiment, the antenna elements may be electrically connected to the RFIC. For example, the first substrate 1310 may electrically connect the antenna elements 1340 and the RFICs 1330 of the second substrate 1320. For example, the first substrate 1310 may electrically connect the antenna elements 1340 and the RFICs 1330 through the signal lines (1315-1, 1315-2) of the first substrate 1310. In other words, the signals generated from the RFICs 1330 may be transferred to the antenna elements 1340 through the signal lines (1315-1, 1315-2) and the feeding lines (1347-1, 1347-2) of the first substrate 1310. For example, the signals may include an RF signal. The grid array in a region in which the signal lines (1315-1, 1315-2) are connected to the second substrate 1320 may be a grid array through which a signal generated by the RFIC is transferred. The grid array may be referred to as a signal line S. Another grid array around the signal line may serve as a ground for shielding for the signal transfer characteristics. The other grid array may be referred to as a ground line G. For example, the signal line may be disposed to be surrounded by a plurality of ground lines. In other words, the signal line may be electrically shielded. Accordingly, the signal transfer characteristics may be further improved.

According to an embodiment, the second substrate 1320 may include a plurality of layers. For example, the plurality of layers may include antenna elements 1340, conductivity members 1350, and resonators 1360. For example, the antenna elements 1340 may be disposed on at least one first layer (e.g., layer #2). For example, the conductivity members 1350 may be arranged across a plurality of second layers (e.g., layers #1 to #2). For example, the resonators 1360 may be arranged across at least a portion (e.g., layers #1 to #2) of the plurality of second layers. In other words, the second substrate 1320 may include the antenna elements 1340, the conductivity members 1350, and the resonators 1360.

According to an embodiment, the feeding lines (1347-1, 1347-2) may be connected to the signal lines (1345-1, 1345-2) of the second substrate 1320 through a grid array. For example, the feeding line 1347-1 may be connected to the signal line 1345-1 through a signal grid array. For example, the feeding line 1347-2 may be connected to the signal line 1345-2 through a signal grid array.

FIG. 13 illustrates an example 1300 of the RU module 400 including the resonators 1360 for convenience of description, but the embodiments of the disclosure are not limited thereto. According to an embodiment, the RU module 400 may not include the resonators 1360.

According to an embodiment, the number of the plurality of layers of the second substrate 1320 may be less than the number of the plurality of layers of the first substrate 1310. For example, the height of the first substrate 1310 in the z-axis direction may be formed to be larger than the height of the second substrate 1320 in the z-axis direction. According to an embodiment, the number of the plurality of layers of the second substrate 1320 may be variably changed depending upon the components included therein. For example, in case where the second substrate 1320 includes the feeding lines 1347, the number of the plurality of layers of the second substrate 1320 may be increased compared to a case where the second substrate 1320 does not include the feeding lines 1347.

According to an embodiment, the RFICs 1330 may generate an RF signal for radiating through the antenna elements 1340. For example, the signal generated by the first RFIC 1330-1 may be transmitted to the first antenna element 1340-1 through the signal line 1315-1 of the first substrate 1310, the feeding line 1347-1, and the signal line 1345-1 of the second substrate 1320. For example, the signal generated by the second RFIC 1330-2 may be transmitted to the second antenna element 1340-2 through the signal line 1315-2 of the first substrate 1310, the feeding line 1347-2, and the signal line 1345-2 of the second substrate 1320. According to an embodiment, the first RFIC 1330-1 connected to the first antenna element 1340-1 and the second RFIC 1330-2 connected to the second antenna element 1340-2 may generate the same signal as each other. For example, in order to transmit a signal with beamforming, the RU module 400 may transmit the same signal via a plurality of antenna elements 1340. The same signal may represent a signal including the same information or data. In this connection, the first RFIC 1330-1 and the second RFIC 1330-2 may be referred to as one set of RFICs. As described above, the first RFIC 1330-1 and the second RFIC 1330-2 may be configured of one RFIC. A plurality of signals generated by the one RFIC may be radiated through the first antenna element 1340-1 and the second antenna element 1340-2.

Referring to the foregoing description, the example 1300 illustrates the RU module 400 in which the first RFIC 1330-1 of the two RFICs 1330 is connected to the antenna element 1340-1 and the second RFIC 1330-2 thereof is connected to the antenna element 1340-2. However, the embodiments of the disclosure are not limited thereto. For example, the RU module 400 may be configured such that one RFIC is connected to the antenna elements (1340-1, 1340-2). Alternatively, the first RFIC 1330-1 may be connected to a plurality of antenna elements including the first antenna element 1340-1, and the second RFIC 1330-2 may be connected to a plurality of antenna elements including the second antenna element 1340-2.

According to an embodiment, the antenna elements 1340 may be disposed on the second substrate 1320. For example, the antenna elements 1340 may be disposed on the at least one first layer of the second substrate 1320. For example, the antenna elements 1340 may be disposed on one first layer of the second substrate 1320. Alternatively, the antenna elements 1340 may be arranged across a plurality of first layers of the second substrate 1320.

According to an embodiment, the antenna elements 1340 may be connected to the feeding lines (1347-1, 1347-2) through the signal lines (1345-1, 1345-2). For example, the first antenna element 1340-1 may be connected to the feeding line 1347-1 through the signal line 1345-1. The second antenna element 1340-2 may be connected to the feeding line 1347-2 through the signal line 1345-2. For example, the signal line may include a coaxial plated through hole (PTH). The signal line may be referred to as a via hole.

According to an embodiment, each antenna element of the antenna elements 1340 may include a radiator. For example, each antenna element of the antenna elements 1340 may include a first radiator connected to the signal lines (1315-1, 1315-2), the feeding lines (1347-1, 1347-2), and the signal lines (1345-1, 1345-2). The first radiator may be referred to as a main radiator. For example, each antenna element including the first radiator may include a patch antenna, a dipole antenna, or a magneto-electric (ME) dipole antenna.

According to an embodiment, the conductivity members 1350 may be disposed between the antenna elements 1340. For example, the conductivity member 1350-1 may be disposed in a region between the first antenna element 1340-1 and the second antenna element 1340-2. For example, the region may include an area in which a distance spaced apart from the first antenna element 1340-1 and a distance spaced apart from the second antenna element 1340-2 are the same. In other words, the region may represent an area including a center point between the center of the first antenna element 1340-1 and the center of the second antenna element 1340-2. In FIG. 13, only two antenna elements (1340-1, 1340-2) are illustrated for convenience of description, but the second substrate 1320 may include a larger number of antenna elements 1340. Accordingly, the conductivity member 1350-2 may be arranged in a region between the second antenna element 1340-2 and another antenna element, and the conductivity member 1350-3 may be arranged in a region between the first antenna element 1340-1 and another antenna element.

According to an embodiment, the conductivity members 1350 may be disposed on the plurality of second layers of the second substrate 1320. The conductivity members 1350 may have various shapes. For example, in the example 1300 of FIG. 13, each of the conductivity members 1350 may be formed in a folded shape. However, the embodiments of the disclosure are not limited thereto, and the embodiments of the disclosure may include various shapes of conductivity members as illustrated above with reference to FIGS. 7A to 8B.

According to an embodiment, the conductivity members 1350 may be formed of a conductive material. For example, each of the conductivity members 1350 made of a conductive material (e.g., copper) may be disposed in a region between the antenna elements to resonate with respect to a signal radiated by each antenna element to generate a signal having a changed phase (or phase and amplitude). For example, when the first antenna element 1340-1 radiates a signal obtained from the first RFIC 1330-1, the conductivity member 1350-1 may generate a signal of which phase is changed with respect to the signal. The changed signal and other signals, radiated from the first antenna element 1340-1 and directed to the second antenna element 1340-2, may be offset with each other. For example, the changed signal may be a signal of which phase is inverted by about 180° with respect to the other signal. Further, for example, the changed signal may be a signal of which amplitude and phase are changed with respect to the other signal. The changed phase may be greater than or less than about 180°. Accordingly, interference with the second antenna element 1340-2, which may be caused by the first antenna element 1340-1 radiating the signal, may be reduced.

According to an embodiment, the resonators 1360 may be disposed with respect to each antenna element of the antenna elements 1340. For example, the first resonators 1360-1 may be disposed with respect to the first antenna element 1340-1 across at least a portion of the plurality of second layers. The second resonators 1360-2 may be disposed with respect to the second antenna element 1340-2 across the at least a portion of the plurality of second layers. As in the example 1300, the resonators 1360 may be disposed on a layer different from the layer on which the antenna element is disposed. However, the embodiments of the disclosure are not limited thereto, and the resonators 1360 may be disposed on the same layer as the layer on which the antenna element is disposed. The resonators 1360 may increase a gain of an antenna element related thereto and expand a frequency band of a signal radiated through the related antenna element. For example, the resonators 1360 may comprise a metamaterial.

Figure 14:
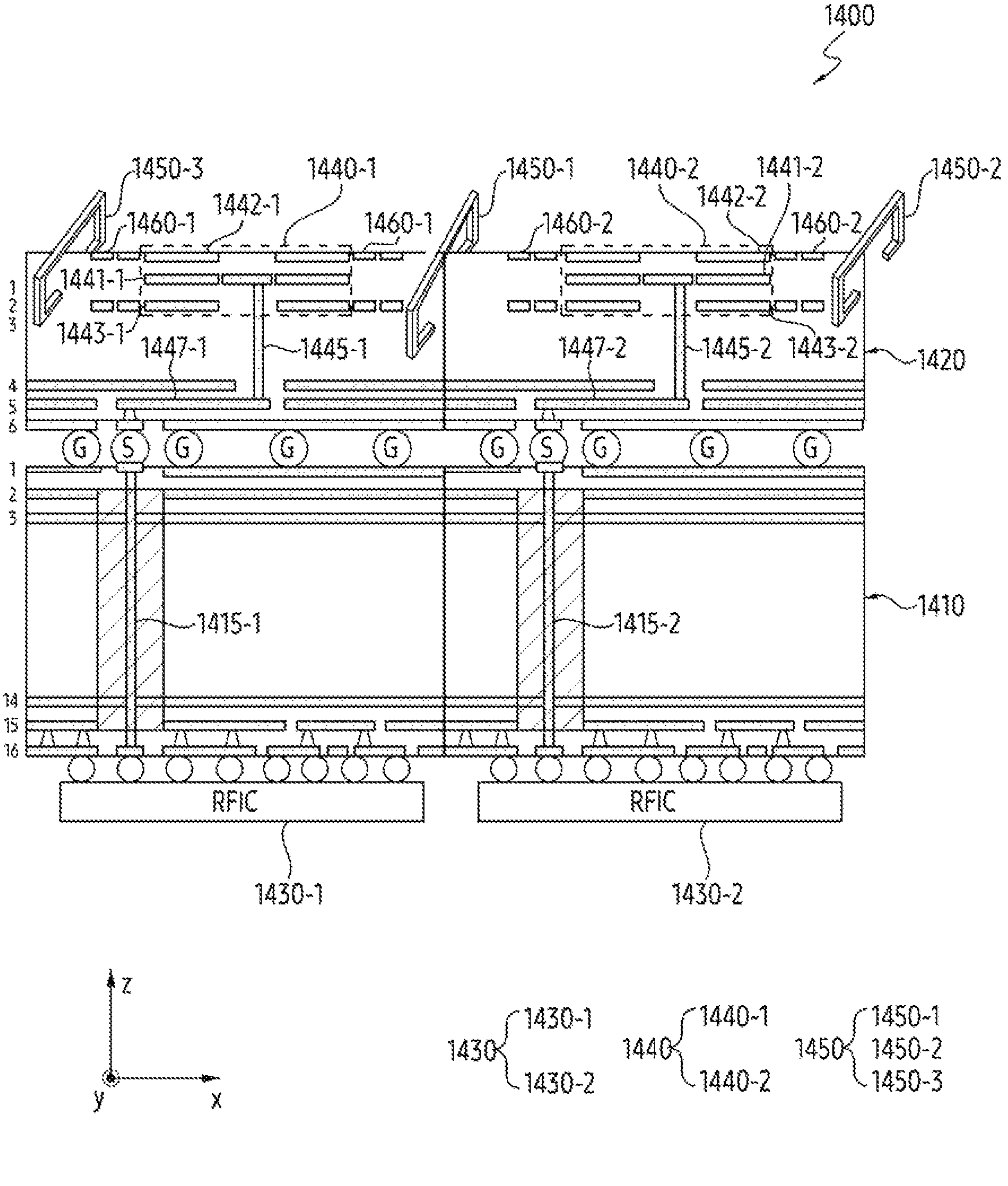

FIG. 14 shows an example 1400 of an RU module 400 including a decoupling conductivity member. For example, the RU module 400 may be included in an electronic device 200. For example, the electronic device 200 may include a base station 110 of FIG. 1, a terminal 120 of FIG. 1, or an apparatus for radiating a wireless signal.

The example 1400 may represent an example of cutting the RU module 400 in a direction parallel to the x-z plane, viewed in the +y-axis direction, in order to illustrate the stacked structure of the RU module 400. However, in order to represent the structure of the conductivity members 1450 more specifically, the conductivity members 1450 are shown three-dimensionally.

According to an embodiment, the RU module 400 may include a first substrate 1410, a second substrate 1420, and radio frequency integrated circuits (RFICs) 1430. The structure shown in the example 1400 is merely of a simplified example for convenience of description, and the embodiments of the disclosure are not limited thereto. For example, in the example 1400, the RU module 400 including one second substrate 1420 is illustrated as an example, but the embodiments of the disclosure are not limited thereto. For example, the RU module 400 may include a plurality of second substrates 1420. For example, like the antenna substrate 420 and the antenna substrate 430 of the RU module 400 of FIG. 4, the RU module 400 may include a plurality of second substrates 1420. Further, for example, it is illustrated an example in which the RU module 400 includes two RFICs 1430, but the embodiments of the disclosure are not limited thereto. For example, the RU module 400 may include one RFIC or three or more RFICs.

According to an embodiment, the first substrate 1410 may include a plurality of layers. The plurality of layers may be divided into some layer regions made of different materials. According to an embodiment, the plurality of layers may include a first layer region, a second layer region, and a third layer region. For example, the first substrate 1410 may be stacked in the order of the third layer region, the second layer region, and the first layer region with respect to the +z-axis direction. For example, the first layer region and the third layer region may be formed of a material having a dissipation factor ($D_f$) lower than that of an FR-4. The second layer region may include the FR-4. For example, the third layer region may include at least one layer (e.g., layers #14 to #16) adjacent to a first surface of the first substrate 1410 connected to the RFICs 1430. The first layer region may include at least one layer (e.g., layers #1 to #3) adjacent to a second surface opposite to the first surface of the first substrate 1410 connected to the second substrate 1420. Layers of the first layer region and the second layer region may provide relatively higher signal transfer performance compared to the FR-4 layer.

In FIG. 14, a plurality of layers including three layer regions are illustrated, but the embodiments of the disclosure are not limited thereto. For example, the plurality of layers may include a first layer region and a second layer region. Further, for example, the first layer region may be made of a material having a dissipation factor ($D_f$) lower than that of the FR-4. The second layer region may include the FR-4. Further, the number of layers included in each of the layer regions may be changed. For example, FIG. 14 illustrates the first layer region including three layers, but the first layer region may include two layers.

According to an embodiment, the first substrate 1410 may include signal lines (1415-1, 1415-2). For example, the first substrate 1410 may include the signal line 1415-1 for connecting the first RFIC 1430-1 and the first antenna element 1440-1. The first substrate 1410 may include the signal line 1415-2 for connecting the second RFIC 1430-2 with the second antenna element 1440-2. For example, the signal line may be formed across the plurality of layers of the first substrate 1410.

According to an embodiment, the first substrate 1410 may include a coaxial plated through hole (PTH). The coaxial PTH may include a coaxial feeding line and a plated region surrounding the coaxial feeding line. For example, the coaxial feeding line may include the signal line 1415-1. For example, the signal line 1415-1 may be formed to extend in a vertical direction (e.g., the z-axis direction) with respect to the first substrate 1410. The coaxial feeding line may be formed across a plurality of layers of the first substrate 1410. For example, the coaxial feeding line may be formed across the layer #1 to the layer #16 of the first substrate 1410. The plated region may be formed across at least a portion of the plurality of layers along the coaxial feeding line. For example, the plated region may be formed across the layer #2 to the layer #15 of the first substrate 1410. For example, the signal line 1415-1 may extend in the vertical direction (e.g., the +z-axis direction) to reduce loss in transferring the signal obtained from the first RFIC 1430-1 to the antenna elements 1440. However, the embodiments of the disclosure are not limited to the particular structure of the signal line.

According to an embodiment, the first substrate 1410 may be coupled to the RFICs 1430. For example, the RFICs 1430 may be coupled to the first surface of the first substrate 1410. For example, the first surface may represent a surface opposite to the second surface on which the first substrate 1410 is coupled to the second substrate 1420. For example, the first substrate 1410 may be electrically coupled to the RFICs 1430 through a grid array with the RFICs 1430. For example, the grid array may include a BGA. Further, for example, the grid array may include an LGA.

According to an embodiment, the first substrate 1410 may be coupled to the second substrate 1420. For example, the second substrate 1420 may be coupled to the second surface of the first substrate 1410. For example, the first substrate 1410 may be electrically connected to the second substrate 1420 through a grid array. For example, the grid array may include a BGA. Further, for example, the grid array may include an LGA.

According to an embodiment, the antenna elements may be electrically connected to the RFIC. For example, the first substrate 1410 may electrically connect the antenna elements 1440 of the second substrate 1420 with the RFICs 1430. For example, the first substrate 1410 may electrically connect the antenna elements 1440 and the RFICs 1430 through the signal lines (1415-1, 1415-2) of the first substrate 1410. In other words, the signals generated from the RFICs 1430 may be transferred to the antenna elements 1440 through the signal lines (1415-1, 1415-2) of the first substrate 1410 and the feeding lines (1447-1, 1447-2). For example, the signals may include an RF signal. The grid array in a region in which the signal lines (1415-1, 1415-2) are connected to the second substrate 1420 may be a grid array through which a signal generated by the RFIC is transferred. The grid array may be referred to as a signal line S. Another grid array around the signal line may act as aground for shielding for the signal transfer characteristics. The other grid array may be referred to as a ground line G. For example, the signal line may be disposed to be surrounded by a plurality of ground lines. In other words, the signal line may be electrically shielded. Accordingly, the signal transfer characteristics may be improved.

According to an embodiment, the second substrate 1420 may include a plurality of layers. For example, the plurality of layers may include antenna elements 1440, conductivity members 1450, resonators 1460, and feeding lines (1447-1, 1447-2). For example, the antenna elements 1440 may be disposed on a plurality of first layers (e.g., layers #1 to #3). For example, the conductivity members 1450 may be arranged across a plurality of second layers (e.g., layers #1 to #3). For example, the resonators 1460 may be disposed across at least a portion (e.g., layers #1 and #3) of the plurality of second layers. For example, the feeding lines (1447-1, 1447-2) may be disposed on the a layer (e.g., layer #5) different from the at least one first layer and the plurality of second layers, amongst the plurality of layers. In other words, the second substrate 1420 may include the antenna elements 1440, the conductivity members 1450, the resonators 1460, and the feeding lines (1447-1, 1447-2).

FIG. 14 illustrates an example 1400 of the RU module 400 including the resonators 1460 for convenience of description, but the embodiments of the disclosure are not limited thereto. According to an embodiment, the RU module 400 may not include the resonators 1460.

According to an embodiment, the number of the plurality of layers of the second substrate 1420 may be less than the number of the plurality of layers of the first substrate 1410. For example, the height of the first substrate 1410 in the z-axis direction may be formed to be greater than the height of the second substrate 1420 in the z-axis direction. According to an embodiment, the number of the plurality of layers of the second substrate 1420 may be variably changed depending upon the components included therein. For example, in case that the second substrate 1420 includes the feeding lines 1447, the number of the plurality of layers of the second substrate 1420 may be increased compared to a case that the second substrate 1420 does not include the feeding lines 1447.

According to an embodiment, the RFICs 1430 may generate an RF signal for radiating through the antenna elements 1440. For example, the signal generated by the first RFIC 1430-1 may be transferred to the first antenna element 1440-1 through the signal line 1415-1 of the first substrate 1410, the feeding line 1447-1 of the second substrate 1420, and a signal line 1445-1. For example, the signal generated by the second RFIC 1430-2 may be transferred to the second antenna element 1440-2 through the signal line 1415-2 of the first substrate 1410, the feeding line 1447-2 of the second substrate 1420, and the signal line 1445-2. According to an embodiment, the first RFIC 1430-1 connected to the first antenna element 1440-1 and the second RFIC 1430-2 connected to the second antenna element 1440-2 may generate the same signal as each other. For example, in order to transmit a signal with beamforming, the RU module 400 may transmit the same signal through a plurality of antenna elements 1440. The same signal may represent a signal including the same information or data. In such a case, the first RFIC 1430-1 and the second RFIC 1430-2 may be referred to as one set of RFICs. As described above, the first RFIC 1430-1 and the second RFIC 1430-2 may be configured of one RFIC. A plurality of signals generated by the one RFIC may be radiated through the first antenna element 1440-1 and the second antenna element 1440-2.

Referring to the foregoing description, the example 1400 illustrates the RU module 400 in which the first RFIC 1430-1 is connected to the antenna element 1440-1 and the second RFIC 1430-2 is connected to the antenna element 1440-2. However, the embodiments of the disclosure are not limited thereto. For example, the RU module 400 may be configured such that one RFIC is connected to the antenna elements 1440-1 and 1440-2. Alternatively, the first RFIC 1430-1 may be connected to a plurality of antenna elements including the first antenna element 1440-1, and the second RFIC 1430-2 may be connected to a plurality of antenna elements including the second antenna element 1440-2.

According to an embodiment, the antenna elements 1440 may be disposed on the second substrate 1420. For example, the antenna elements 1440 may be disposed on the plurality of first layers of the second substrate 1420. For example, the antenna elements 1440 may be disposed on one first layer of the second substrate 1420.

According to an embodiment, the antenna elements 1440 may be connected to the feeding lines (1447-1, 1447-2) through the signal lines (1445-1, 1445-2). For example, the first antenna element 1440-1 may be connected to the feeding line 1447-1 through the signal line 1445-1. The second antenna element 1440-2 may be connected to the feeding line 1447-2 through the signal line 1445-2. For example, the signal line may include a coaxial plated through hole (PTH). The signal line may be referred to as a via hole.

According to an embodiment, each antenna element of the antenna elements 1440 may include a plurality of radiators. For example, the first antenna element 1440-1 of the antenna elements 1440 may include a first radiator 1441-1 electrically connected to the signal lines 1415-1, the feeding lines 1447-1, and the signal lines 1445-1. The first antenna element 1440-1 may include at least one second radiator coupled with the first radiator 1441-1. For example, the first antenna element 1440-1 may include second radiators (1442-1, 1443-1) coupled with the first radiator 1441-1. The first radiator 1441-1 may be disposed on the layer #2. The second radiator 1442-1 may be disposed on the layer #1. The second radiator 1443-1 may be disposed on the layer #3. For example, the second antenna element 1440-2 of the antenna elements 1440 may include a first radiator 1441-2 electrically connected to the signal lines 1415-2, the feeding lines 1447-2, and the signal lines 1445-2. The second antenna element 1440-2 may include at least one second radiator coupled with the first radiator 1441-2. For example, the second antenna element 1440-2 may include second radiators (1442-2, 1443-2) coupled with the first radiator 1441-2. The first radiator 1441-2 may be disposed on the layer #2. The second radiator 1442-2 may be disposed on the layer #1. The second radiator 1443-2 may be disposed on the layer #3. The plurality of second radiators may represent a radiator for adjunctively radiating a signal radiated from the first radiator. The first radiator may be referred to as a main radiator. The at least one second radiator may be referred to as a sub radiator for the first radiator. For example, the antenna elements 1440 may include a patch antenna, a dipole antenna, or a magneto-electric (ME) dipole antenna.

According to an embodiment, the conductivity members 1450 may be disposed between the antenna elements 1440. For example, the conductivity member 1450-1 may be disposed in a region between the first antenna element 1440-1 and the second antenna element 1440-2. For example, the region may include a position in which a distance spaced apart from the first antenna element 1440-1 and a distance spaced apart from the second antenna element 1440-2 are the same as each other. In other words, the region may represent an area including a center point between the center of the first antenna element 1440-1 and the center of the second antenna element 1440-2. In FIG. 14, only two antenna elements 1440-1 and 1440-2 are illustrated for convenience of description, but the second substrate 1420 may include a greater number of antenna elements 1440. Accordingly, the conductivity member 1450-2 may be disposed in a region between the second antenna element 1440-2 and another antenna element, and the conductivity member 1450-3 may be disposed in a region between the first antenna element 1440-1 and another antenna element.

According to an embodiment, the conductivity members 1450 may be disposed on the plurality of second layers of the second substrate 1420. The conductivity members 1450 may have various shapes. For example, in the example 1400 of FIG. 14, each of the conductivity members 1450 may be formed in a folded shape. However, the embodiments of the disclosure are not limited thereto, and the embodiments of the disclosure may include various shapes of conductivity members as illustrated above with reference to FIGS. 7A to 8B.

According to an embodiment, the conductivity members 1450 may be formed of a conductive material. For example, each of the conductivity members 1450 formed of a conductive material (e.g., copper) may be disposed in a region between the antenna elements to resonate with respect to a signal radiated by each antenna element to generate a signal having a changed phase (or phase and amplitude). For example, when the first antenna element 1440-1 radiates a signal obtained from the first RFIC 1430-1, the conductivity member 1450-1 may generate a signal of which phase is changed with respect to the signal. The changed signal and other signals radiated from the first antenna element 1440-1 and directed to the second antenna element 1440-2 may be offset with each other. For example, the changed signal may be a signal of which phase is inverted by about 180° with respect to the other signal. Further, for example, the changed signal may be a signal of which amplitude and phase are changed with respect to the other signal. The changed phase may be greater than or less than about 180°. Accordingly, interference with the second antenna element 1440-2, which may be caused by the first antenna element 1440-1 radiating a signal, may be reduced.

According to an embodiment, the resonators 1460 may be disposed with respect to each antenna element of the antenna elements 1440. For example, the first resonators 1460-1 may be disposed with respect to the first antenna element 1440-1 across at least a portion of the plurality of second layers. For example, the second resonators 1460-2 may be disposed with respect to the second antenna element 1440-2 across at least a portion of the plurality of second layers. As in the example 1400, the resonators 1460 may be disposed on a layer different from the layer on which the antenna element is disposed. However, the embodiments of the disclosure are not limited thereto, and the resonators 1460 may be also disposed on the same layer as the layer on which the antenna elements are disposed. The resonators 1460 may increase a gain of an antenna element related thereto and expand a frequency band of a signal radiated through the related antenna element. For example, the resonators 1460 may comprise a metamaterial.

Figure 15:
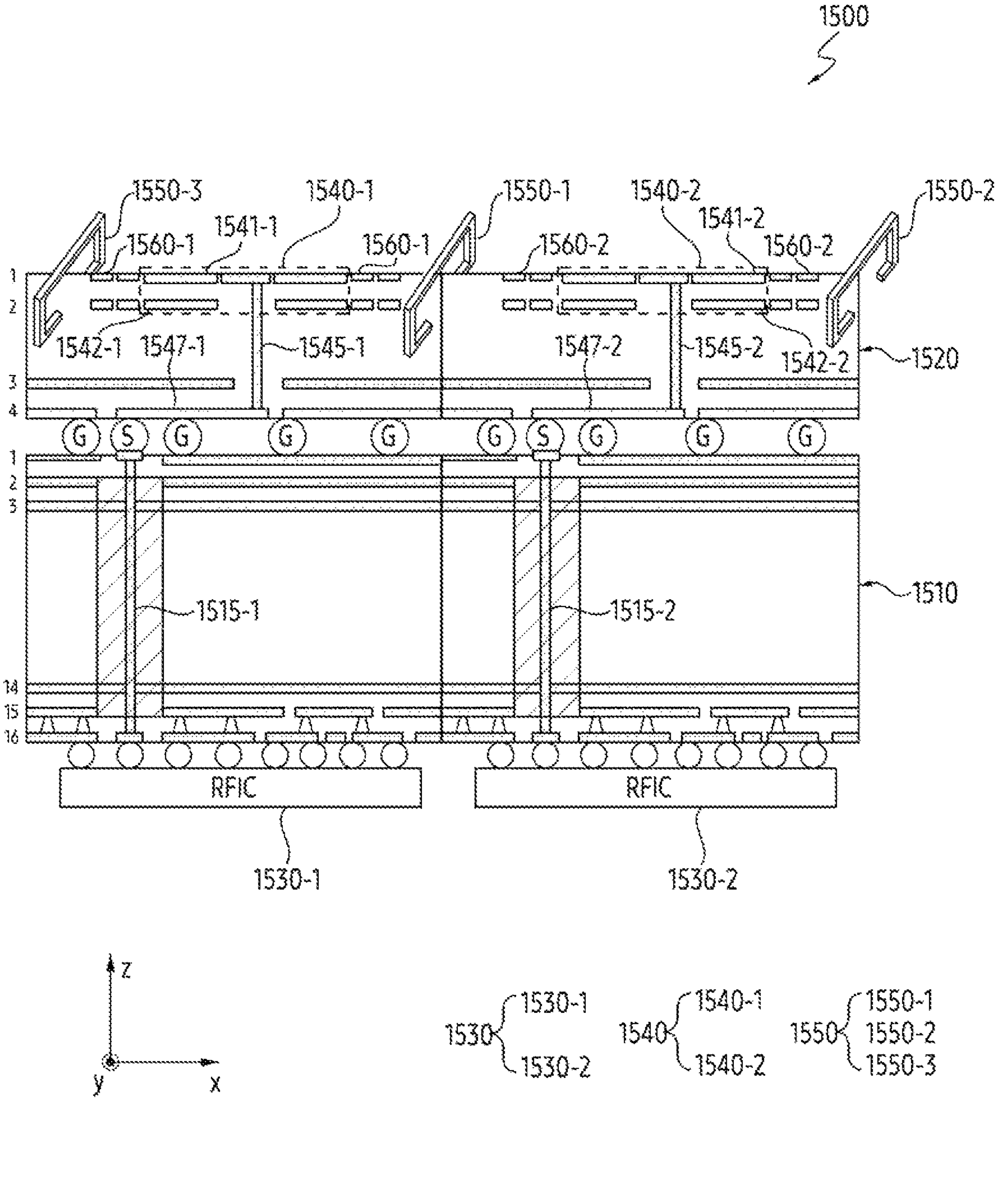

FIG. 15 illustrates an example 1500 of an RU module 400 including a decoupling conductivity member. For example, the RU module 400 may be included in an electronic device. For example, the electronic device 200 may include a base station 110 of FIG. 1, a terminal 120 of FIG. 1, or an apparatus for radiating a wireless signal.

The example 1500 illustrates an example of cutting the RU module 400 in a direction parallel to the x-z plane, viewed in the +y-axis direction, in order to show the stacked structure of the RU module 400. However, in order to represent the structure of the conductivity members 1550 more specifically, the conductivity members 1550 are illustrated three-dimensionally.

According to an embodiment, the RU module 400 may include a first substrate 1510, a second substrate 1520, and radio frequency integrated circuits (RFICs) 1530. The structure shown in the example 1500 is merely of a simplified example for convenience of description, and the embodiments of the disclosure are not limited thereto. For example, in the example 1500, the RU module 400 including one second substrate 1520 is illustrated as an example, but the embodiments of the disclosure are not limited thereto. For example, the RU module 400 may include a plurality of second substrates 1520. For example, as in the antenna substrate 420 and the antenna substrate 430 of the RU module 400 of FIG. 4, the RU module 400 may include a plurality of second substrates 1520. Further, for example, it is shown an example in which the RU module 400 includes two RFICs 1530, but the embodiments of the disclosure are not limited thereto. For example, the RU module 400 may include one RFIC or three or more RFICs.

According to an embodiment, the first substrate 1510 may include a plurality of layers. The plurality of layers may be divided into some layer regions made of different materials. According to an embodiment, the plurality of layers may include a first layer region, a second layer region, and a third layer region. For example, the first substrate 1510 may be stacked in the order of the third layer region, the second layer region, and the first layer region with respect to the +z-axis direction. For example, the first layer region and the third layer region may be formed of a material having a dissipation factor ($D_f$) lower than an FR-4. The second layer region may include the FR-4. For example, the third layer region may include at least one layer (e.g., layers #14 to #16) adjacent to the first surface of the first substrate 1510 connected to the RFICs 1530. The first layer region may include at least one layer (e.g., layers #1 to #3) adjacent to the second surface opposite to the first surface of the first substrate 1510 connected to the second substrate 1520. Layers of the first layer region and the second layer region may provide relatively higher signal transfer performance compared to the FR-4 layer.

In FIG. 15, it is shown a plurality of layers including three layer regions, but the embodiments of the disclosure are not limited thereto. For example, the plurality of layers may include a first layer region and a second layer region. Further, for example, the first layer region may be formed of a material having a relatively lower dissipation factor ($D_f$)

compared to a FR-4. The second layer region may include the FR-4. Further, the number of layers included in each of the layer regions may be changed. For example, while FIG. 15 illustrates the first layer region including three layers, the first layer region may include two layers.

According to an embodiment, the first substrate 1510 may include signal lines (1515-1, 1515-2). For example, the first substrate 1510 may include a signal line 1515-1 for connecting the first RFIC 1530-1 and the first antenna element 1540-1. The first substrate 1510 may include a signal line 1515-2 for connecting the second RFIC 1530-2 and the second antenna element 1540-2. For example, the signal line may be formed across the plurality of layers of the first substrate 1510.

According to an embodiment, the first substrate 1510 may include a coaxial plated through hole (PTH). The coaxial PTH may include a coaxial feeding line and a plated region surrounding the coaxial feeding line. For example, the coaxial feeding line may include the signal line 1515-1. For example, the signal line 1515-1 may be formed to extend in a vertical direction (e.g., the z-axis direction) with respect to the first substrate 1510. The coaxial feeding line may be formed across a plurality of layers of the first substrate 1510. For example, the coaxial feeding line may be formed across the layer #1 to the layer #16 of the first substrate 1510. The plated region may be formed across at least a portion of the plurality of layers along the coaxial feeding line. For example, the plated region may be formed across layers #2 to 15 of the first substrate 1510. For example, the signal line 1515-1 may extend in a vertical direction (e.g., the +z-axis direction) to reduce loss in transferring the signal obtained from the first RFIC 1530-1 to the antenna elements 1540. However, the embodiments of the disclosure are not limited to the particular structure of the signal line.

According to an embodiment, the first substrate 1510 may be coupled to the RFICs 1530. For example, the RFICs 1530 may be coupled to the first surface of the first substrate 1510. For example, the first surface may represent a surface opposite to the second surface on which the first substrate 1510 is coupled to the second substrate 1520. For example, the first substrate 1510 may be electrically coupled to the RFICs 1530 through a grid array with the RFICs 1530. For example, the grid array may include a BGA. Further, for example, the grid array may include an LGA.

According to an embodiment, the first substrate 1510 may be coupled to the second substrate 1520. For example, the second substrate 1520 may be coupled to the second surface of the first substrate 1510. For example, the first substrate 1510 may be electrically connected to the second substrate 1520 through a grid array. For example, the grid array may include a BGA. Further, for example, the grid array may include an LGA.

According to an embodiment, the antenna elements may be electrically connected to the RFIC. For example, the first substrate 1510 may electrically connect the antenna elements 1540 of the second substrate 1520 with the RFICs 1530. For example, the first substrate 1510 may electrically connect the antenna elements 1540 and the RFICs 1530 through the signal lines (1515-1, 1515-2) of the first substrate 1510. In other words, the signals generated from the RFICs 1530 may be transferred to the antenna elements 1540 through the signal lines (1515-1, 1515-2) of the first substrate 1510 and the feeding lines (1547-1, 1547-2). For example, the signals may include an RF signal. The grid array in a region where the signal lines (1515-1, 1515-2) are connected to the second substrate 1520 may be a grid array through which the signal generated by the RFIC is transferred. The grid array may be referred to as a signal line S. Another grid array around the signal line may act as a ground for shielding for the signal transfer characteristics. The other grid array may be referred to as a ground line G. For example, the signal line may be arranged to be surrounded by a plurality of ground lines. In other words, the signal line may be electrically shielded. Accordingly, the signal transfer characteristics may be improved.

According to an embodiment, the second substrate 1520 may include a plurality of layers. For example, the plurality of layers may include the antenna elements 1540, the conductivity members 1550, the resonators 1560, and the feeding lines (1547-1, 1547-2). For example, the antenna elements 1540 may be disposed on a plurality of first layers (e.g., layers #1 to #2). For example, the conductivity members 1550 may be arranged across a plurality of second layers (e.g., layers #1 to #2). For example, the resonators 1560 may be disposed across at least a portion (e.g., layers #1 to #2) of the plurality of second layers. For example, the feeding lines (1547-1, 1547-2) may be disposed on a third layer (e.g., layer #4) different from the at least one first layer and the plurality of second layers, among the plurality of layers. In other words, the second substrate 1520 may include the antenna elements 1540, the conductivity members 1550, the resonators 1560, and the feeding lines (1547-1, 1547-2).

According to an embodiment, the feeding lines (1547-1, 1547-2) may be connected to the signal lines (1515-1, 1515-2) of the first substrate 1510 through a grid array. For example, the feeding line 1547-1 may be connected to the signal line 1515-1 through a signal grid array. For example, the feeding line 1547-2 may be connected to the signal line 1515-2 through a signal grid array. The feeding lines (1547-1, 1547-2) of FIG. 15 may be directly connected to the signal grid array, other than the power lines (1447-1, 1447-2) of FIG. 14 being connected to the signal grid array through a via. Accordingly, the number of a plurality of layers of the second substrate 1520 of FIG. 15 may be less than the number of a plurality of layers of the second substrate 1420 of FIG. 14.

Although FIG. 15 illustrates an example 1500 of the RU module 400 including the resonators 1560 for convenience of description, the embodiments of the disclosure are not limited thereto. According to an embodiment, the RU module 400 may not include the resonators 1560.

According to an embodiment, the number of the plurality of layers of the second substrate 1520 may be less than the number of the plurality of layers of the first substrate 1510. For example, the height of the first substrate 1510 in the z-axis direction may be greater than the height of the second substrate 1520 in the z-axis direction. According to an embodiment, the number of the plurality of layers of the second substrate 1520 may be changed depending upon the components included therein. For example, in case where the second substrate 1520 includes the feeding lines 1547, the number of the plurality of layers of the second substrate 1520 may be increased compared to a case where the second substrate 1520 does not include the feeding lines 1547.

According to an embodiment, the RFICs 1530 may generate an RF signal for radiating through the antenna elements 1540. For example, the signal generated by the first RFIC 1530-1 may be transferred to the first antenna element 1540-1 through the signal line 1515-1 of the first substrate 1510, the feeding line 1547-1 of the second substrate 1520, and the signal line 1545-1. For example, the signal generated by the second RFIC 1530-2 may be transferred to the second antenna element 1540-2 through the signal line 1515-2 of the first substrate 1510, the feeding line 1547-2 of the second substrate 1520, and the signal line 1545-2. According to an embodiment, the first RFIC 1530-1 connected to the first antenna element 1540-1 and the second RFIC 1530-2 connected to the second antenna element 1540-2 may generate the same signal as each other. For example, in order to transmit a signal with beamforming, the RU module 400 may transmit the same signal through a plurality of antenna elements 1540. The same signal may represent a signal including the same information or data. In this connection, the first RFIC 1530-1 and the second RFIC 1530-2 may be referred to as one set of RFICs. As described above, the first RFIC 1530-1 and the second RFIC 1530-2 may be configured of one RFIC. A plurality of signals generated by the one RFIC may be radiated through the first antenna element 1540-1 and the second antenna element 1540-2.

Referring to the foregoing description, the example 1500 illustrates the RU module 400 in which the first RFIC 1530-1 of the two RFICs 1530 is connected to the antenna element 1540-1 and the second RFIC 1530-2 thereof is connected to the antenna element 1540-2. However, the embodiments of the disclosure are not limited thereto. For example, the RU module 400 may be configured such that one RFIC is connected to the antenna elements (1540-1, 1540-2). Alternatively, the first RFIC 1530-1 may be connected to a plurality of antenna elements including the first antenna element 1540-1, and the second RFIC 1530-2 may be connected to a plurality of antenna elements including the second antenna element 1540-2.

According to an embodiment, the antenna elements 1540 may be disposed on the second substrate 1520. For example, the antenna elements 1540 may be disposed on the plurality of first layers of the second substrate 1520. For example, the antenna elements 1540 may be disposed on one first layer of the second substrate 1520.

According to an embodiment, the antenna elements 1540 may be connected to the feeding lines (1547-1, 1547-2) via the signal lines (1545-1, 1545-2). For example, the first antenna element 1540-1 may be connected to the feeding line 1547-1 via the signal line 1545-1. The second antenna element 1540-2 may be connected to the feeding line 1547-2 via the signal line 1545-2. For example, the signal line may include a coaxial plated through hole (PTH). The signal line may be referred to as a via hole.

According to an embodiment, each antenna element of the antenna elements 1540 may include a plurality of radiators. For example, the first antenna element 1540-1 of the antenna elements 1540 may include a first radiator 1541-1 electrically connected to the signal lines 1515-1, the feeding lines 1547-1, and the signal lines 1545-1. The first antenna element 1540-1 may include at least one second radiator coupled with the first radiator 1541-1. For example, the first antenna element 1540-1 may include a second radiator 1542-1 coupled with the first radiator 1541-1. The first radiator 1541-1 may be disposed on the layer #1. The second radiator 1542-1 may be disposed on the layer #2. For example, the second antenna element 1540-2 of the antenna elements 1540 may include a first radiator 1541-2 electrically connected to the signal lines 1515-2, the feeding lines 1547-2, and the signal lines 1545-2. The second antenna element 1540-2 may include at least one second radiator coupled with the first radiator 1541-2. For example, the second antenna element 1540-2 may include a second radiator 1542-2 coupled with the first radiator 1541-2. The first radiator 1541-2 may be disposed on the layer #1. The second radiator 1542-2 may be disposed on the layer #2. The second radiator may represent a radiator for adjunctively radiating a signal radiated from the first radiator. The first radiator may be referred to as a main radiator. The at least one second radiator may be referred to as a sub radiator for the first radiator. For example, the antenna elements 1540 may include a patch antenna, a dipole antenna, or a magneto-electric (ME) dipole antenna.

According to an embodiment, the conductivity members 1550 may be disposed between the antenna elements 1540. For example, the conductivity member 1550-1 may be disposed in a region between the first antenna element 1540-1 and the second antenna element 1540-2. For example, the region may include a position in which a distance spaced apart from the first antenna element 1540-1 and a distance spaced apart from the second antenna element 1540-2 are the same as each other. In other words, the region may represent an area including a center point between the center of the first antenna element 1540-1 and the center of the second antenna element 1540-2. In FIG. 15, the second substrate 1520 is illustrated to have only two antenna elements (1540-1, 1540-2) for convenience of description, but the second substrate 1520 may include a greater number of antenna elements 1540. Accordingly, the conductivity member 1550-2 may be disposed in a region between the second antenna element 1540-2 and another antenna element, and the conductivity member 1550-3 may be disposed in a region between the first antenna element 1540-1 and another antenna element.

According to an embodiment, the conductivity members 1550 may be disposed on the plurality of second layers of the second substrate 1520. The conductivity members 1550 may have various shapes. For example, in the example 1500 of FIG. 15, each of the conductivity members 1550 may be formed in a folded shape. However, the embodiments of the disclosure are not limited thereto, and the embodiments of the disclosure may include various shapes of conductivity members as described above with reference to FIGS. 7A to 8B.

According to an embodiment, the conductivity members 1550 may be formed of a conductive material. For example, each of the conductivity members 1550 formed of a conductive material (e.g., copper) may be disposed in a region between the antenna elements to resonate with respect to a signal radiated by each antenna element to generate a signal having a changed phase (or phase and amplitude). For example, when the first antenna element 1540-1 radiates a signal obtained from the first RFIC 1530-1, the conductivity member 1550-1 may generate a signal of which phase is changed with respect to the signal. The changed signal and other signal radiated from the first antenna element 1540-1 and directed to the second antenna element 1540-2 may be offset with each other. For example, the changed signal may be a signal of which phase is inverted by about 180° with respect to the other signal. Further, for example, the changed signal may be a signal of which amplitude and phase are changed with respect to the other signal. The changed phase may be greater than or less than about 180°. Accordingly, interference with the second antenna element 1540-2, which may be caused by the first antenna element 1540-1 radiating a signal, may be reduced.

According to an embodiment, the resonators 1560 may be disposed with respect to each antenna element of the antenna elements 1540. For example, the first resonators 1560-1 may be disposed with respect to the first antenna element 1540-1 across the at least a portion of the plurality of second layers. The second resonators 1560-2 may be disposed with respect to the second antenna element 1540-2 across the at least a portion of the plurality of second layers. As in the example 1500, the resonators 1560 may be disposed on a layer different from the layer on which the antenna element is disposed. However, the embodiments of the disclosure are not limited thereto, and the resonators 1560 may be disposed on the same layer as the layer on which the antenna elements are disposed. The resonators 1560 may increase a gain of an antenna element related thereto and expand a frequency band of a signal radiated through the related antenna element. For example, the resonators 1560 may comprise a metamaterial.

Figure 16:
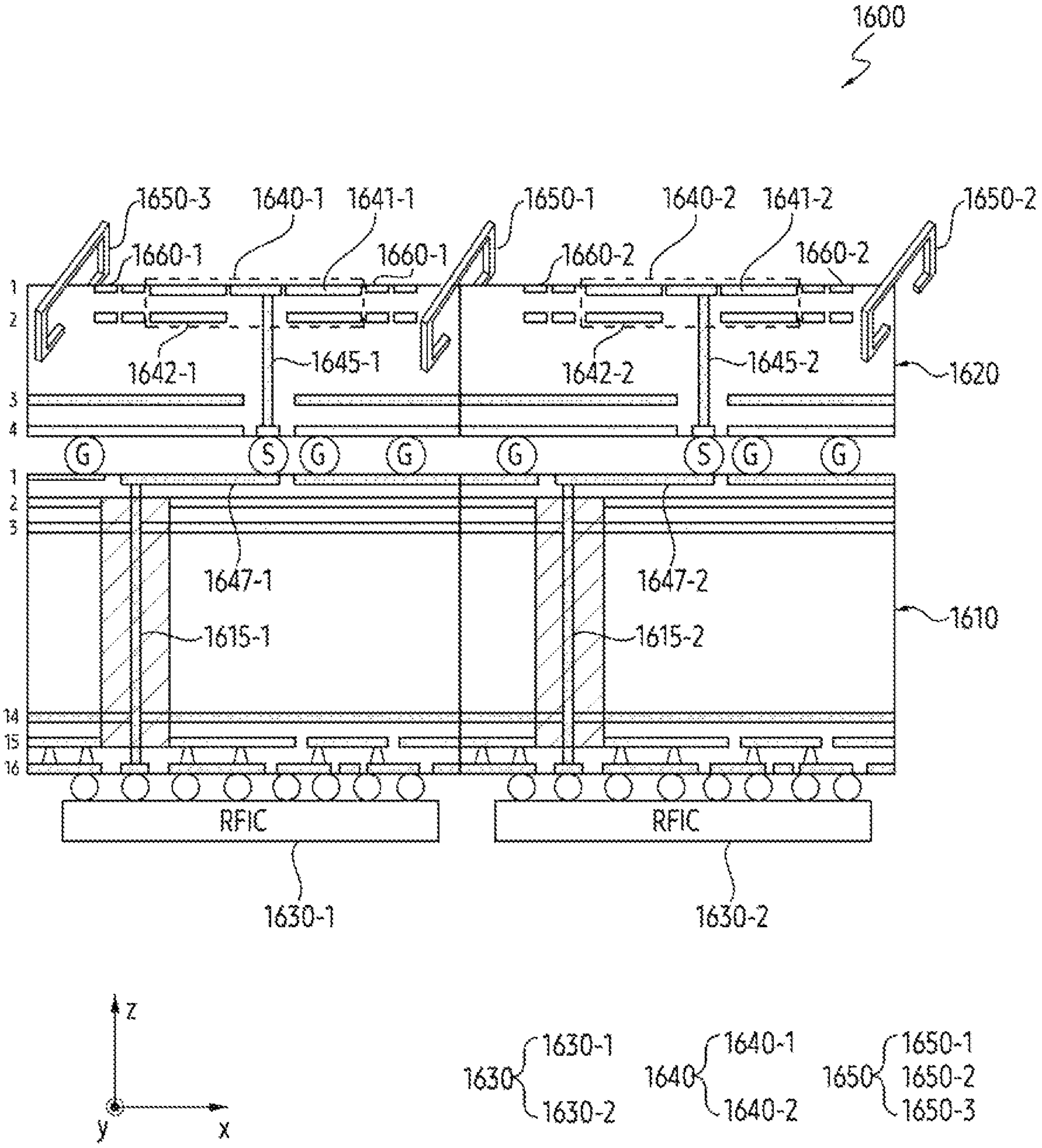

FIG. 16 shows an example 1600 of an RU module 400 including a decoupling conductivity member. For example, the RU module 400 may represent an RU module 400 (e.g., an RU module (400, 210) of FIG. 2A) included in an electronic device. For example, the electronic device may include a base station 110 of FIG. 1, a terminal 120 of FIG. 1, or an apparatus for radiating a wireless signal.

The example 1600 illustrates an example of cutting the RU module 400 in a direction parallel to the x-z plane, viewed in the +y-axis direction, in order to show the stacked structure of the RU module 400. However, in order to represent the structure of the conductivity members 1650 more specifically, the conductivity members 1650 are shown three-dimensionally.

According to an embodiment, the RU module 400 may include a first substrate 1610, a second substrate 1620, and radio frequency integrated circuits (RFICs) 1630. The structure shown in the example 1600 is merely of a simplified example for convenience of description, and the embodiments of the disclosure are not limited thereto. For example, the example 1600 illustrates that the RU module 400 includes one second substrate 1620 as an example, but the embodiments of the disclosure are not limited thereto. For example, the RU module 400 may include a plurality of second substrates 1620. For example, as in the antenna substrate 420 and the antenna substrate 430 of the RU module 400 of FIG. 4, the RU module 400 may include a plurality of second substrates 1620. Further, while there is shown an example that the RU module 400 includes two RFICs 1630, the embodiments of the disclosure are not limited thereto. For example, the RU module 400 may include one RFIC or three or more RFICs.

According to an embodiment, the first substrate 1610 may include a plurality of layers. The plurality of layers may be divided into some layer regions made of different materials. According to an embodiment, the plurality of layers may include a first layer region, a second layer region, and a third layer region. For example, the first substrate 1610 may be stacked in the order of the third layer region, the second layer region, and the first layer region on the basis of the +z-axis direction. For example, the first layer region and the third layer region may be formed of a material having a lower dissipation factor ($D_f$) than an FR-4. The second layer region may include the FR-4. For example, the third layer region may include at least one layer (e.g., layers #14 to #16) adjacent to a first surface of the first substrate 1610 connected to the RFICs 1630. The first layer region may include at least one layer (e.g., layers #1 to #3) adjacent to a second surface opposite to the first surface of the first substrate 1610 connected to the second substrate 1620. Layers of the first layer region and the second layer region may provide relatively higher signal transfer performance compared to the FR-4 layer.

In FIG. 16 are shown the plurality of layers including three layer regions, but the embodiments of the disclosure are not limited thereto. For example, the plurality of layers may include a first layer region and a second layer region. Further, for example, the first layer region may be formed of a material having a dissipation factor ($D_f$) lower than an FR-4. The second layer region may include the FR-4. Further, the number of layers included in each of the layer regions may be changed. For example, while FIG. 16 illustrates the first layer region including three layers, the first layer region may include two layers.

According to an embodiment, the plurality of layers of the first substrate 1610 may include feeding lines (1647-1, 1647-2). For example, among the plurality of layers of the first substrate 1610, the feeding lines (1647-1, 1647-2) may be disposed on a third layer (e.g., layer #1) corresponding to the second surface. Unlike the other examples 1100 and 1200 described above, the example 1600 of FIG. 16 may include the feeding lines in the first substrate 1610. In FIG. 16, the third layer is illustrated as a layer corresponding to the second surface, but the embodiments of the disclosure are not limited thereto. The third layer may be a layer (e.g., layer #2) underneath the layer corresponding to the second surface. According to an embodiment, the feeding lines (1647-1, 1647-2) of the first substrate 1610 may be connected to the signal lines (1615-1, 1615-2), respectively. For example, the feeding line 1647-1 may be connected to the signal line 1615-1. For example, the feeding line 1647-2 may be connected to the signal line 1615-2.

According to an embodiment, the first substrate 1610 may include the signal lines (1615-1, 1615-2). For example, the first substrate 1610 may include the signal line 1615-1 for connecting the first RFIC 1630-1 and the first antenna element 1640-1. The first substrate 1610 may include the signal line 1615-2 for connecting the second RFIC 1630-2 and the second antenna element 1640-2. For example, the signal lines may be formed across the plurality of layers of the first substrate 1610.

According to an embodiment, the first substrate 1610 may include a coaxial plated through hole (PTH). The coaxial PTH may include a coaxial feeding line and a plated region surrounding the coaxial feeding line. For example, the coaxial feeding line may include the signal line 1615-1. For example, the signal line 1615-1 may be formed to extend in a vertical direction (e.g., the z-axis direction) with respect to the first substrate 1610. The coaxial feeding line may be formed across a plurality of layers of the first substrate 1610. For example, the coaxial feeding line may be formed across the layers #1 to 16 of the first substrate 1610. The plated region may be formed across at least a portion of the plurality of layers along the coaxial feeding line. For example, the plated region may be formed across the layers #2 to 16 of the first substrate 1610. For example, the signal line 1615-1 may extend in a vertical direction (e.g., the +z-axis direction) to reduce loss in transferring the signal obtained from the first RFIC 1630-1 to the antenna elements 1640. However, the embodiments of the disclosure are not limited to the particular structure of the signal line.

According to an embodiment, the first substrate 1610 may be coupled to the RFICs 1630. For example, the RFICs 1630 may be coupled to the first surface of the first substrate 1610. For example, the first surface may represent a surface opposite to the second surface on which the first substrate 1610 is coupled to the second substrate 1620. For example, the first substrate 1610 may be electrically coupled to the RFICs 1630 through a grid array with the RFICs 1630. For example, the grid array may include a BGA. Further, for example, the grid array may include an LGA.

According to an embodiment, the first substrate 1610 may be coupled to the second substrate 1620. For example, the second substrate 1620 may be coupled to the second surface of the first substrate 1610. For example, the first substrate 1610 may be electrically connected to the second substrate 1620 through a grid array. For example, the grid array may include a BGA. Further, for example, the grid array may include an LGA.

According to an embodiment, the antenna elements may be electrically connected to the RFICs. For example, the first substrate 1610 may electrically connect the antenna elements 1640 of the second substrate 1620 with the RFICs 1630. For example, the first substrate 1610 may electrically connect the antenna elements 1640 and the RFICs 1630 through signal lines (1615-1, 1615-2) of the first substrate 1610. In other words, signals generated from the RFICs 1630 may be transferred to the antenna elements 1640 through the signal lines (1615-1, 1615-2) and the feeding lines (1647-1, 1647-2) of the first substrate 1610. For example, the signals may include an RF signal. The grid array in a region in which the signal lines (1615-1, 1615-2) are connected to the second substrate 1620 may be a grid array through which the signal generated by the RFIC is transferred. The grid array may be referred to as a signal line S. Another grid array around the signal line may act as aground for shielding for the signal transfer characteristics. The other grid array may be referred to as a ground line G. For example, the signal line may be disposed to be surrounded by a plurality of ground lines. In other words, the signal line may be electrically shielded. Accordingly, the signal transfer characteristics may be improved.

According to an embodiment, the second substrate 1620 may include a plurality of layers. For example, the plurality of layers may include the antenna elements 1640, the conductivity members 1650, and the resonators 1660. For example, the antenna elements 1640 may be disposed on a plurality of first layers (e.g., layers #1 to #2). For example, the conductivity members 1650 may be arranged across a plurality of second layers (e.g., layers #1 to #2). For example, the resonators 1660 may be disposed across at least a portion (e.g., layers #1 to #2) of the plurality of second layers. In other words, the second substrate 1620 may include the antenna elements 1640, the conductivity members 1650, and the resonators 1660.

According to an embodiment, the feeding lines (1647-1, 1647-2) may be connected to the signal lines (1645-1, 1645-2) of the second substrate 1620 through a grid array. For example, the feeding line 1647-1 may be connected to the signal line 1645-1 through a signal grid array. For example, the feeding line 1647-2 may be connected to the signal line 1645-2 through a signal grid array.

For convenience of description, the example 1600 illustrates the RU module 400 including the resonators 1660 as an example, but the embodiments of the disclosure are not limited thereto. According to an embodiment, the RU module 400 may not include the resonators 1660.

According to an embodiment, the number of the plurality of layers of the second substrate 1620 may be less than the number of the plurality of layers of the first substrate 1610. For example, the height of the first substrate 1610 in the z-axis direction may be formed to be greater than the height of the second substrate 1620 in the z-axis direction. According to an embodiment, the number of the plurality of layers of the second substrate 1620 may be variably changed depending upon the components included therein. For example, in case where the second substrate 1620 includes the feeding lines 1647, the number of the plurality of layers of the second substrate 1620 may be increased compared to a case where the second substrate 1620 does not include the feeding lines 1647.

According to an embodiment, the RFICs 1630 may generate an RF signal for radiating through the antenna elements 1640. For example, the signal generated by the first RFIC 1630-1 may be transferred to the first antenna element 1640-1 through the signal line 1615-1, the feeding line 1647-1 of the first substrate 1610, and the signal line 1645-1 of the second substrate 1620. For example, the signal generated by the second RFIC 1630-2 may be transferred to the second antenna element 1640-2 through the signal line 1615-2 of the first substrate 1610, the feeding line 1647-2 of the first substrate 1610, and the signal line 1645-2 of the second substrate 1620. According to an embodiment, the first RFIC 1630-1 connected to the first antenna element 1640-1 and the second RFIC 1630-2 connected to the second antenna element 1640-2 may generate the same signal as each other. For example, in order to transmit a signal with beamforming, the RU module 400 may transmit the same signal through a plurality of antenna elements 1640. The same signal may represent a signal including the same information or data. In this connection, the first RFIC 1630-1 and the second RFIC 1630-2 may be referred to as one set of RFICs. As described above, the first RFIC 1630-1 and the second RFIC 1630-2 may be configured of a single RFIC. A plurality of signals generated by the single RFIC may be radiated through the first antenna element 1640-1 and the second antenna element 1640-2.

Referring to the foregoing description, the example 1600 illustrates the RU module 400 in which the first RFIC 1630-1 of the two RFICs 1630 is connected to the antenna element 1640-1 and the second RFIC 1630-2 thereof is connected to the antenna element 1640-2. However, the embodiments of the disclosure are not limited thereto. For example, an RU module 400 may include one RFIC connected to the antenna elements (1640-1, 1640-2). Alternatively, the first RFIC 1630-1 may be connected to a plurality of antenna elements including the first antenna element 1640-1, and the second RFIC 1630-2 may be connected to a plurality of antenna elements including the second antenna element 1640-2.

According to an embodiment, the antenna elements 1640 may be disposed on the second substrate 1620. For example, the antenna elements 1640 may be disposed on the plurality of first layers of the second substrate 1620. For example, the antenna elements 1640 may be disposed on one first layer of the second substrate 1620.

According to an embodiment, the antenna elements 1640 may be connected to the feeding lines (1647-1, 1647-2) through the signal lines (1645-1, 1645-2). For example, the first antenna element 1640-1 may be connected to the feeding line 1647-1 through the signal line 1645-1. The second antenna element 1640-2 may be connected to the feeding line 1647-2 through the signal line 1645-2. For example, the signal line may include a coaxial plated through hole (PTH). The signal line may be referred to as a via hole.

According to an embodiment, each antenna element of the antenna elements 1640 may include a plurality of radiators. For example, the first antenna element 1640-1 of the antenna elements 1640 may include a first radiator 1641-1 electrically connected to the signal lines 1615-1, the feeding lines 1647-1, and the signal lines 1645-1. The first antenna element 1640-1 may include at least one second radiator coupled with the first radiator 1641-1. For example, the first antenna element 1640-1 may include a second radiator 1642-1 coupled with the first radiator 1641-1. The first radiator 1641-1 may be disposed on the layer #1. The second radiator 1642-1 may be disposed on the layer #2. For example, the second antenna element 1640-2 of the antenna elements 1640 may include a first radiator 1641-2 electrically connected the signal lines 1615-2, the feeding lines 1647-2, and the signal lines 1645-2. The second antenna element 1640-2 may include at least one second radiator coupled with the first radiator 1641-2. For example, the second antenna element 1640-2 may include a second radiator 1642-2 coupled with the first radiator 1641-2. The first radiator 1641-2 may be disposed on the layer #1. The second radiator 1642-2 may be disposed on the layer #2. The second radiator may represent a radiator for adjunctively radiating a signal radiated from the first radiator. The first radiator may be referred to as a main radiator. The at least one second radiator may be referred to as a sub radiator for the first radiator. For example, the antenna elements 1640 may include a patch antenna, a dipole antenna, or a magneto-electric (ME) dipole antenna.

According to an embodiment, the conductivity members 1650 may be disposed between the antenna elements 1640. For example, the conductivity member 1650-1 may be disposed in a region between the first antenna element 1640-1 and the second antenna element 1640-2. For example, the region may include a position in which a distance spaced apart from the first antenna element 1640-1 and a distance spaced apart from the second antenna element 1640-2 are the same as each other. In other words, the region may represent an area including a center point between the center of the first antenna element 1640-1 and the center of the second antenna element 1640-2. In FIG. 16, only two antenna elements (1640-1, 1640-2) are illustrated for convenience of description, but the second substrate 1620 may include a greater number of antenna elements 1640. Accordingly, the conductivity member 1650-2 may be disposed in a region between the second antenna element 1640-2 and another antenna element, and the conductivity member 1650-3 may be disposed in a region between the first antenna element 1640-1 and another antenna element.

According to an embodiment, the conductivity members 1650 may be disposed on the plurality of second layers of the second substrate 1620. The conductivity members 1650 may have various shapes. For example, in the example 1600 of FIG. 16, each of the conductivity members 1650 may be formed in a folded shape. However, the embodiments of the disclosure are not limited thereto, and the embodiments of the disclosure may include various shapes of conductivity members as described above with reference to FIGS. 7A to 8B.

According to an embodiment, the conductivity members 1650 may be formed of a conductive material. For example, each of the conductivity members 1650 formed of a conductive material (e.g., copper) may be disposed in a region between the antenna elements to resonate with respect to a signal radiated by each antenna element to generate a signal having a changed phase (or phase and amplitude). For example, when the first antenna element 1640-1 radiates a signal obtained from the first RFIC 1630-1, the conductivity member 1650-1 may generate a signal of which phase is changed with respect to the signal. The changed signal and other signals radiated from the first antenna element 1640-1 and directed to the second antenna element 1640-2 may be offset with each other. For example, the changed signal may be a signal of which phase is inverted by about 180° with respect to the other signal. Further, for example, the changed signal may be a signal of which amplitude and phase are changed with respect to the other signal. The changed phase may be greater than or less than about 180°. Accordingly, interference with the second antenna element 1640-2, which may be caused by the first antenna element 1640-1 radiating a signal, may be reduced.

According to an embodiment, the resonators 1660 may be disposed with respect to each antenna element of the antenna elements 1640. For example, the first resonators 1660-1 may be disposed with respect to the first antenna element 1640-1 across at least a portion of the plurality of second layers. The second resonators 1660-2 may be disposed with respect to the second antenna element 1640-2 across at least a portion of the plurality of second layers. As in the example 1600, the resonators 1660 may be disposed on a layer different from the layer on which the antenna element is disposed. However, the embodiments of the disclosure are not limited thereto, and the resonators 1660 may be disposed on the same layer as the layer on which the antenna elements are disposed. The resonators 1660 may increase a gain of an antenna element related thereto and expand a frequency band of a signal radiated through the related antenna element. For example, the resonators 1660 may comprise a metamaterial.

Figure 17:
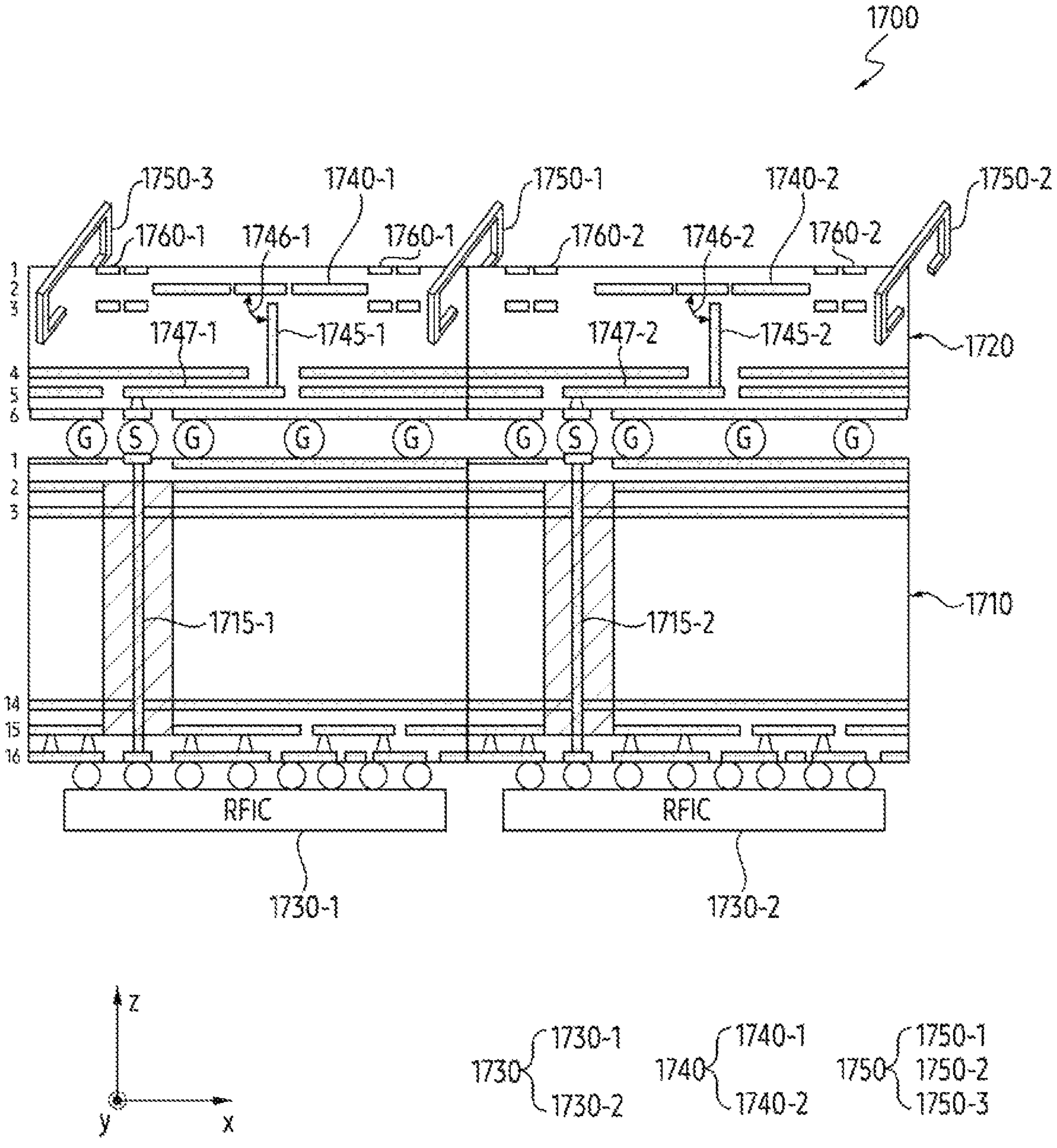

FIG. 17 illustrates an example 1700 of an RU module 400 including a decoupling conductivity member. For example, the RU module 400 may be included in an electronic device 200. For example, the electronic device 200 may include a base station 110 of FIG. 1, a terminal 120 of FIG. 1, or an apparatus for radiating a wireless signal.

The example 1700 illustrate an example of cutting the RU module 400 in a direction parallel to the x-z plane, viewed in the +y-axis direction, in order to show the stacked structure of the RU module 400. However, in order to represent the structure of the conductivity members 1750 more specifically, the conductivity members 1750 are shown three-dimensionally.

According to an embodiment, the RU module 400 may include a first substrate 1710, a second substrate 1720, and radio frequency integrated circuits (RFICs) 1730. The structure shown in the example 1700 is merely of a simplified example for convenience of description, and the embodiments of the disclosure are not limited thereto. For example, in the example 1700, the RU module 400 including one second substrate 1720 is illustrated as an example, but the embodiments of the disclosure are not limited thereto. For example, the RU module 400 may include a plurality of second substrates 1720. For example, as in the antenna substrate 420 and the antenna substrate 430 of the RU module 400 of FIG. 4, the RU module 400 may include a plurality of second substrates 1720. Further, for example, it is shown an example in which the RU module 400 includes two RFICs 1730, but the embodiments of the disclosure are not limited thereto. For example, the RU module 400 may include one RFIC or three or more RFICs.

According to an embodiment, the first substrate 1710 may include a plurality of layers. The plurality of layers may be divided into some layer regions made of different materials. According to an embodiment, the plurality of layers may include a first layer region, a second layer region, and a third layer region. For example, the first substrate 1710 may be stacked in the order of the third layer region, the second layer region, and the first layer region with respect to the +z-axis direction. For example, the first layer region and the third layer region may be formed of a material having a dissipation factor ($D_f$) lower than an FR-4. The second layer region may include the FR-4. For example, the third layer region may include at least one layer (e.g., layers #14 to #16) adjacent to a first surface of the first substrate 1710 connected to the RFICs 1730. The first layer region may include at least one layer (e.g., layers #1 to #3) adjacent to a second surface opposite to the first surface of the first substrate 1710 connected to the second substrate 1720. Layers of the first layer region and the second layer region may provide relatively higher signal transfer performance compared to the FR-4 layer.

In FIG. 17, there are shown a plurality of layers including three layer regions, but the embodiments of the disclosure are not limited thereto. For example, the plurality of layers may include a first layer region and a second layer region. Further, for example, the first layer region may be formed of a material having a dissipation factor (Df) lower than that of the FR-4. The second layer region may include the FR-4. Further, the number of layers included in each of the layer regions may be changed. For example, while FIG. 17 illustrates the first layer region including three layers, the first layer region may include two layers.

According to an embodiment, the first substrate 1710 may include signal lines (1715-1, 1715-2). For example, the first substrate 1710 may include the signal line 1715-1 for connecting the first RFIC 1730-1 and the first antenna element 1740-1. The first substrate 1710 may include the signal line 1715-2 for connecting the second RFIC 1730-2 and the second antenna element 1740-2. For example, the signal lines may be formed across the plurality of layers of the first substrate 1710.

According to an embodiment, the first substrate 1710 may include a coaxial plated through hole (PTH). The coaxial PTH may include a coaxial feeding line and a plated region surrounding the coaxial feeding line. For example, the coaxial feeding line may include the signal line 1715-1. For example, the signal line 1715-1 may be formed to extend in a vertical direction (e.g., the z-axis direction) with respect to the first substrate 1710. The coaxial feeding line may be formed across a plurality of layers of the first substrate 1710. For example, the coaxial feeding line may be formed across the layers #1 to 16 of the first substrate 1710. The plated region may be formed across at least a portion of the plurality of layers along the coaxial feeding line. For example, the plated region may be formed across the layers #2 to 16 of the first substrate 1710. For example, the signal line 1715-1 may extend in a vertical direction (e.g., the +z-axis direction) to reduce loss in transferring the signal obtained from the first RFIC 1730-1 to the antenna elements 1740. However, the embodiments of the disclosure are not limited to the particular structure of the signal line.

According to an embodiment, the first substrate 1710 may be coupled to the RFICs 1730. For example, the RFICs 1730 may be coupled to a first surface of the first substrate 1710. For example, the first surface may represent a surface opposite to a second surface on which the first substrate 1710 is coupled to the second substrate 1720. For example, the first substrate 1710 may be electrically coupled to the RFICs 1730 through a grid array with the RFICs 1730. For example, the grid array may include a BGA. Further, for example, the grid array may include an LGA.

According to an embodiment, the first substrate 1710 may be coupled to the second substrate 1720. For example, the second substrate 1720 may be coupled to the second surface of the first substrate 1710. For example, the first substrate 1710 may be electrically connected to the second substrate 1720 through a grid array. For example, the grid array may include the BGA. Further, for example, the grid array may include the LGA.

According to an embodiment, the antenna elements may be electrically connected to the RFIC. For example, the first substrate 1710 may electrically connect the RFICs 1730 with the antenna elements 1740 of the second substrate 1720. For example, the first substrate 1710 may electrically connect the antenna elements 1740 and the RFICs 1730 through the signal lines (1715-1, 1715-2) of the first substrate 1710. In other words, signals generated from the RFICs 1730 may be transferred to the antenna elements 1740 through the signal lines (1715-1, 1715-2) of the first substrate 1710 and the feeding lines (1747-1, 1747-2). For example, the signals may include an RF signal. The grid array in a region in which the signal lines (1715-1, 1715-2) are connected to the second substrate 1720 may be a grid array through which the signal generated by the RFIC is transferred. The grid array may be referred to as a signal line S. Another grid array around the signal line may act as aground for shielding for the signal transfer characteristics. The other grid array may be referred to as a ground line G. For example, the signal line may be disposed to be surrounded by a plurality of ground lines. In other words, the signal line may be electrically shielded. Accordingly, the signal transfer characteristics may be improved.

According to an embodiment, the second substrate 1720 may include a plurality of layers. For example, the plurality of layers may include the antenna elements 1740, the conductivity members 1750, the resonators 1760, and the feeding lines (1747-1, 1747-2). For example, the antenna elements 1740 may be disposed on at least one first layer (e.g., layer #2). For example, the conductivity members 1750 may be arranged across a plurality of second layers (e.g., layers #1 to #3). For example, the resonators 1760 may be disposed across at least a portion of the layers (e.g., layers #1 and #3) of the plurality of second layers. For example, the feeding lines (1747-1, 1747-2) may be disposed on a third layer (e.g., layer #5) different from the at least one first layer and the plurality of second layers, among the plurality of layers. In other words, the second substrate 1720 may include the antenna elements 1740, the conductivity members 1750, the resonators 1760, and the feeding lines (1747-1, 1747-2).

FIG. 17 illustrates an example 1700 of the RU module 400 including the resonators 1760 for convenience of description, but the embodiments of the disclosure are not limited thereto. According to an embodiment, the RU module 400 may not include the resonators 1760.

According to an embodiment, the number of the plurality of layers of the second substrate 1720 may be less than the number of the plurality of layers of the first substrate 1710. For example, the height of the first substrate 1710 in the z-axis direction may be formed to be greater than the height of the second substrate 1720 in the z-axis direction. According to an embodiment, the number of the plurality of layers of the second substrate 1720 may be variably changed depending upon the components included therein. For example, in case where the second substrate 1720 includes the feeding lines 1747, the number of the plurality of layers of the second substrate 1720 may be increased compared to a case where the second substrate 1720 does not include the feeding lines 1747.

According to an embodiment, the RFICs 1730 may generate an RF signal for radiating through the antenna elements 1740. For example, the signal generated by the first RFIC 1730-1 may be transmitted to the first antenna element 1740-1 through the signal line 1715-1 of the first substrate 1710, the feeding line 1747-1 of the second substrate 1720, and the signal line 1745-1. For example, the signal generated by the second RFIC 1730-2 may be transferred to the second antenna element 1740-2 through the signal line 1715-2 of the first substrate 1710, the feeding line 1747-2 of the second substrate 1720, and the signal line 1745-2. According to an embodiment, the first RFIC 1730-1 connected to the first antenna element 1740-1 and the second RFIC 1730-2 connected to the second antenna element 1740-2 may generate the same signal as each other. For example, in order to transmit a signal with beamforming, the RU module 400 may transmit the same signal through a plurality of antenna elements 1740. The same signal may represent a signal including the same information or data. In such a case, the first RFIC 1730-1 and the second RFIC 1730-2 may be referred to as one set of RFICs. As described above, the first RFIC 1730-1 and the second RFIC 1730-2 may be configured of one RFIC. A plurality of signals generated by the one RFIC may be radiated through the first antenna element 1740-1 and the second antenna element 1740-2.

Referring to the foregoing description, the example 1700 illustrates the RU module 400 in which the first RFIC 1730-1 of the two RFICs 1730 is connected to the antenna element 1740-1 and the second RFIC 1730-2 thereof is connected to the antenna element 1740-2. However, the embodiments of the disclosure are not limited thereto. For example, the RU module 400 may be configured such that one RFIC is connected to the antenna elements (1740-1, 1740-2). Alternatively, the first RFIC 1730-1 may be connected to a plurality of antenna elements including the first antenna element 1740-1, and the second RFIC 1730-2 may be connected to a plurality of antenna elements including the second antenna element 1740-2.

According to an embodiment, the antenna elements 1740 may be disposed on the second substrate 1720. For example, the antenna elements 1740 may be disposed on the at least one first layer of the second substrate 1720. For example, the antenna elements 1740 may be disposed on one first layer of the second substrate 1720. Alternatively, the antenna elements 1740 may be arranged across a plurality of first layers of the second substrate 1720.

According to an embodiment, the antenna elements 1740 may be connected to the feeding lines (1747-1, 1747-2) through the signal lines (1745-1, 1745-2). For example, the first antenna element 1740-1 may be connected to the feeding line 1747-1 through the signal line 1745-1. The second antenna element 1740-2 may be connected to the feeding line 1747-2 through a signal line 1745-2. For example, the signal line may include a coaxial plated through hole (PTH). The signal line may be referred to as a via hole.

The example of FIG. 1700 illustrates that a signal may be transmitted from the signal line to the antenna element using an indirect feeding scheme, unlike the example 1100 of FIG. 11. According to an embodiment, the antenna elements 1740 may be electrically connected to the signal lines (1745-1, 1745-2). For example, the first antenna element 1740-1 may be indirectly coupled with the signal line 1745-1 (see 1746-1). For example, the second antenna element 1740-2 may be indirectly coupled with the signal line 1745-2 (see 1746-2). Such an indirect coupling may refer to a coupling state in which the antenna element and the signal line are not physically connected directly to each other, but a signal may be electrically transferred therebetween.

According to an embodiment, each antenna element of the antenna elements 1740 may include at least one radiator. For example, each antenna element of the antenna elements 1740 may include a first radiator electrically connected to the signal lines (1715-1, 1715-2), the feeding lines (1747-1, 1747-2), and the signal lines (1745-1, 1745-2). The first radiator may be referred to as a main radiator. For example, each antenna element including the first radiator may include a patch antenna, a dipole antenna, or a magneto-electric (ME) dipole antenna.

According to an embodiment, the conductivity members 1750 may be disposed between the antenna elements 1740. For example, the conductivity member 1750-1 may be disposed in a region between the first antenna element 1740-1 and the second antenna element 1740-2. For example, the region may include a position in which a distance spaced apart from the first antenna element 1740-1 and a distance spaced apart from the second antenna element 1740-2 are the same as each other. In other words, the region may represent an area including a center point between the center of the first antenna element 1740-1 and the center of the second antenna element 1740-2. In FIG. 17, there are illustrated only two antenna elements (1740-1, 1740-2) for convenience of description, but the second substrate 1720 may include a greater number of antenna elements 1740. Accordingly, the conductivity member 1750-2 may be disposed in a region between the second antenna element 1740-2 and another antenna element, and the conductivity member 1750-3 may be disposed in a region between the first antenna element 1740-1 and another antenna element.

According to an embodiment, the conductivity members 1750 may be disposed on the plurality of second layers of the second substrate 1720. The conductivity members 1750 may have various shapes. For example, in the example 1700 of FIG. 17, each of the conductivity members 1750 may be formed in a folded shape. However, the embodiments of the disclosure are not limited thereto, and the embodiments of the disclosure may include various shapes of conductivity members as illustrated above in FIGS. 7A to 8B.

According to an embodiment, the conductivity members 1750 may be formed of a conductive material. For example, each of the conductivity members 1750 formed of a conductive material (e.g., copper) may be disposed in a region between the antenna elements to resonate with respect to a signal radiated by each antenna element to generate a signal having a changed phase (or phase and amplitude). For example, when the first antenna element 1740-1 radiates a signal obtained from the first RFIC 1730-1, the conductivity member 1750-1 may generate a signal of which phase is changed with respect to the signal. The changed signal and other signals radiated from the first antenna element 1740-1 and directed to the second antenna element 1740-2 may be offset with each other. For example, the changed signal may be a signal of which phase is inverted by about 180° with respect to the other signal. Further, for example, the changed signal may be a signal of which amplitude and phase are changed with respect to the other signal. The changed phase may be greater than or less than about 180°. Accordingly, interference with the second antenna element 1740-2, which may be caused by the first antenna element 1740-1 radiating a signal, may be reduced.

According to an embodiment, the conductivity members 1750 may include a conductivity member. For example, each of the conductivity members 1750 (including the conductivity member) may be disposed in a region between the antenna elements to generate a resonance signal with respect to a signal radiated by each antenna element. For example, when the first antenna element 1740-1 radiates a signal obtained from the first RFIC 1730-1, the conductivity member 1750-1 may generate a resonance signal with respect to the signal. The resonance signal and other signals radiated from the first antenna element 1740-1 and directed to the second antenna element 1740-2 may be offset with each other. The resonance signal may be a signal of which phase is inverted by about 180° with respect to the other signal. Accordingly, interference with the second antenna element 1740-2, which may be caused by the first antenna element 1740-1 radiating a signal, may be reduced.

According to an embodiment, the resonators 1760 may be disposed with respective to each antenna element of the antenna elements 1740. For example, the first resonators 1760-1 may be disposed with respect to the first antenna element 1740-1 across at least a portion of the plurality of second layers. The second resonators 1760-2 may be disposed with respect to the second antenna element 1740-2 across at least a portion of the plurality of second layers. As in the example 1700, the resonators 1760 may be disposed on a layer different from the layer on which the antenna element is disposed. However, the embodiments of the disclosure are not limited thereto, and the resonators 1760 may be disposed on the same layer as the layer on which the antenna elements are disposed. The resonators 1760 may increase a gain of an antenna element related thereto and expand a frequency band of a signal radiated through the related antenna element. For example, the resonators 1760 may comprise a metamaterial.

Figure 18:
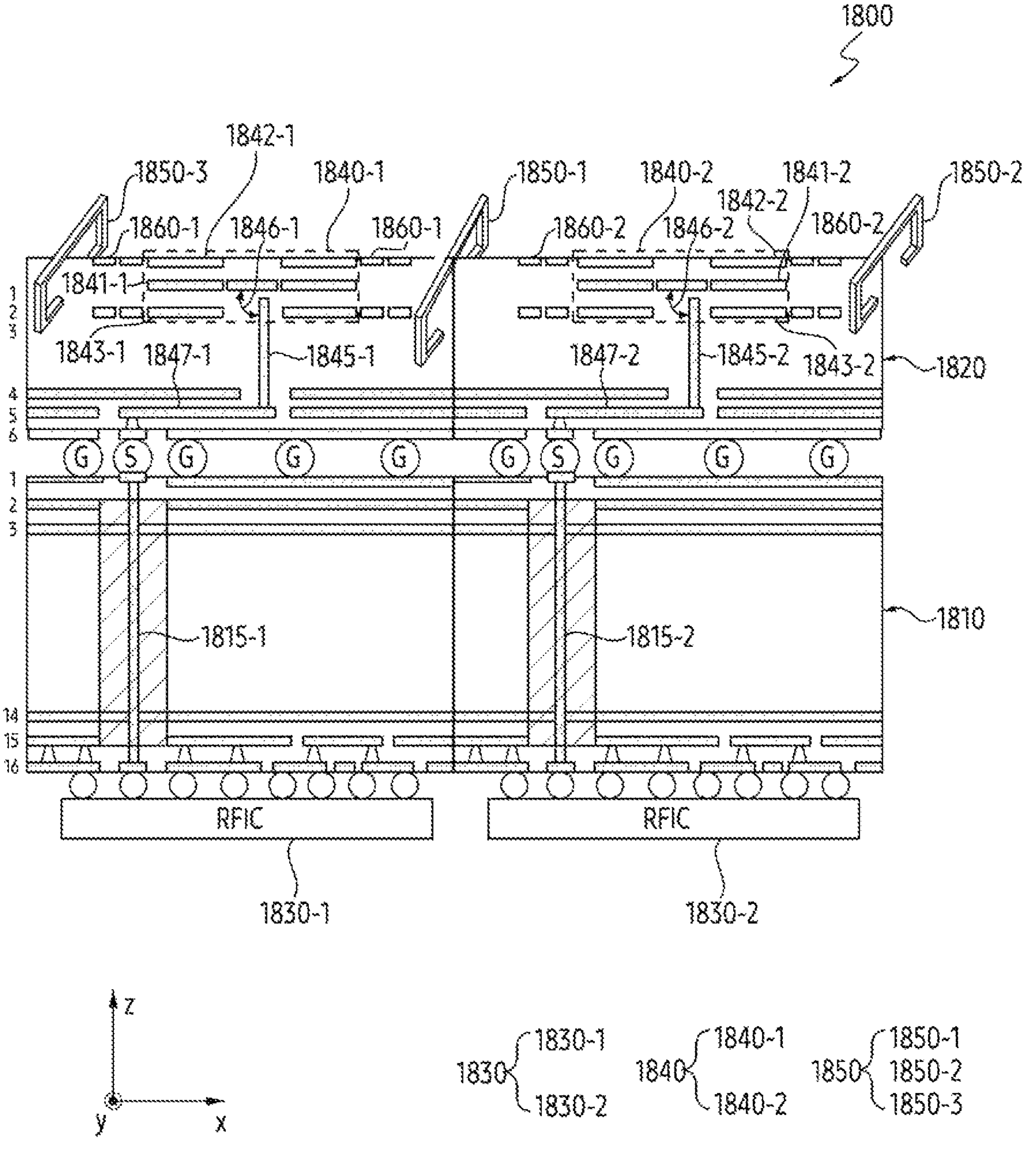

FIG. 18 illustrates an example 1800 of an RU module 400 including at least one decoupling conductivity member. For example, the RU module 400 may refer to the RU module 400 (e.g., the RU module 210 of FIG. 2A) included in the electronic device. For example, the electronic device may include a base station 110 of FIG. 1, a terminal 120 of FIG. 1, or an apparatus for radiating a wireless signal.

The example 1800 illustrates an example of cutting the RU module 400 in a direction parallel to the x-z plane, viewed in the +y-axis direction, in order to show the stacked structure of the RU module 400. However, in order to express the structure of the conductivity members 1850 more specifically, the conductivity members 1850 are shown three-dimensionally.

According to an embodiment, the RU module 400 may include a first substrate 1810, a second substrate 1820, and radio frequency integrated circuits (RFICs) 1830. The structure shown in the example 1800 is merely of a simplified example for convenience of description, and the embodiments of the disclosure are not limited thereto. For example, in the example 1800, the RU module 400 including one second substrate 1820 is illustrated as an example, but the embodiments of the disclosure are not limited thereto. For example, the RU module 400 may include a plurality of second substrates 1820. For example, like the antenna substrate 420 and the antenna substrate 430 of the RU module 400 of FIG. 4, the RU module 400 may include a plurality of second substrates 1820. Further, for example, it is shown an example in which the RU module 400 includes two RFICs 1830, but the embodiments of the disclosure are not limited thereto. For example, the RU module 400 may include one RFIC or three or more RFICs.

According to an embodiment, the first substrate 1810 may include a plurality of layers. The plurality of layers may be divided into some layer regions made of different materials. According to an embodiment, the plurality of layers may include a first layer region, a second layer region, and a third layer region. For example, the first substrate 1810 may be stacked in the order of the third layer region, the second layer region, and the first layer region based on the +z-axis direction. For example, the first layer region and the third layer region may be formed of a material having a dissipation factor ($D_f$) lower than an FR-4. The second layer region may include the FR-4. For example, the third layer region may include at least one layer (e.g., layers #14 to #16) adjacent to a first surface of the first substrate 1810 connected to the RFICs 1830. The first layer region may include at least one layer (e.g., layers #1 to #3) adjacent to a second surface opposite to the first surface of the first substrate 1810 connected to the second substrate 1820. Layers of the first layer region and the second layer region may provide relatively higher signal transfer performance compared to the FR-4 layer.

In FIG. 18 are shown a plurality of layers including three layer regions, but the embodiments of the disclosure are not limited thereto. For example, the plurality of layers may include a first layer region and a second layer region. Further, for example, the first layer region may be formed of a material having a dissipation factor (Df) lower than that of a FR-4. The second layer region may include the FR-4. Further, the number of layers included in each of the layer regions may be changed. For example, FIG. 18 illustrates the first layer region including three layers, but the first layer region may include two layers.

According to an embodiment, the first substrate 1810 may include signal lines (1815-1, 1815-2). For example, the first substrate 1810 may include the signal line 1815-1 for connecting the first RFIC 1830-1 and the first antenna element 1840-1. The first substrate 1810 may include the signal line 1815-2 for connecting the second RFIC 1830-2 and the second antenna element 1840-2. For example, the signal line may be formed across the plurality of layers of the first substrate 1810.

According to an embodiment, the first substrate 1810 may include a coaxial plated through hole (PTH). The coaxial PTH may include a coaxial feeding line and a plated region surrounding the coaxial feeding line. For example, the coaxial feeding line may include the signal line 1815-1. For example, the signal line 1815-1 may be formed to extend in a vertical direction (e.g., the z-axis direction) with respect to the first substrate 1810. The coaxial feeding line may be formed across a plurality of layers of the first substrate 1810. For example, the coaxial feeding line may be formed across the layers #1 to 16 of the first substrate 1810. The plated region may be formed across at least a portion of the plurality of layers along the coaxial feeding line. For example, the plated region may be formed across the layers #2 to 16 of the first substrate 1810. For example, the signal line 1815-1 may extend in a vertical direction (e.g., the +z-axis direction) to reduce loss in transferring the signal obtained from the first RFIC 1830-1 to the antenna elements 1840. However, the embodiments of the disclosure are not limited to the particular structure of the signal line.

According to an embodiment, the first substrate 1810 may be coupled to the RFICs 1830. For example, the RFICs 1830 may be coupled to a first surface of the first substrate 1810. For example, the first surface may represent a surface opposite to a second surface on which the first substrate 1810 is coupled to the second substrate 1820. For example, the first substrate 1810 may be electrically coupled to the RFICs 1830 through a grid array with the RFICs 1830. For example, the grid array may include a ball grid array (BGA). Further, for example, the grid array may include a land grid array (LGA).

According to an embodiment, the first substrate 1810 may be coupled to the second substrate 1820. For example, the second substrate 1820 may be coupled to the second surface of the first substrate 1810. For example, the first substrate 1810 may be electrically connected to the second substrate 1820 through a grid array. For example, the grid array may include the BGA. Further, for example, the grid array may include the LGA.

According to an embodiment, the antenna elements may be electrically connected to the RFIC. For example, the first substrate 1810 may electrically connect the antenna elements 1840 of the second substrate 1820 with the RFICs 1830. For example, the first substrate 1810 may electrically connect the antenna elements 1840 and the RFICs 1830 through the signal lines (1815-1, 1815-2) of the first substrate 1810. In other words, the signals generated from the RFICs 1830 may be transferred to the antenna elements 1840 through the signal lines (1815-1, 1815-2) of the first substrate 1810 and the feeding lines (1847-1, 1847-2). For example, the signals may include an RF signal. The grid array in a region in which the signal lines (1815-1, 1815-2) are connected to the second substrate 1820 may be a grid array through which a signal generated by the RFIC is transferred. The grid array may be referred to as a signal line S. Another grid array around the signal line may act as aground for shielding for the signal transfer characteristics. The other grid array may be referred to as a ground line G. For example, the signal line may be disposed to be surrounded by a plurality of ground lines. In other words, the signal line may be electrically shielded. Accordingly, the signal transfer characteristics may be improved.

According to an embodiment, the second substrate 1820 may include a plurality of layers. For example, the plurality of layers may include the antenna elements 1840, the conductivity members 1850, the resonators 1860, and the feeding lines (1847-1, 1847-2). For example, the antenna elements 1840 may be disposed on a plurality of first layers (e.g., layers #1 to #3). For example, the conductivity members 1850 may be arranged across a plurality of second layers (e.g., layers #1 to #3). For example, the resonators 1860 may be disposed across at least a portion (e.g., layers #1 and #3) of the plurality of second layers. For example, the feeding lines (1847-1, 1847-2) may be disposed on a third layer (e.g., layer #5) different from the at least one first layer and the plurality of second layers, amongst the plurality of layers. In other words, the second substrate 1820 may include the antenna elements 1840, the conductivity members 1850, the resonators 1860, and the feeding lines (1847-1, 1847-2).

FIG. 18 illustrates an example 1800 of the RU module 400 including the resonators 1860 for convenience of description, but the embodiments of the disclosure are not limited thereto. According to an embodiment, the RU module 400 may not include the resonators 1860.

According to an embodiment, the number of the plurality of layers of the second substrate 1820 may be less than the number of the plurality of layers of the first substrate 1810. For example, the height of the first substrate 1810 in the z-axis direction may be formed to be greater than the height of the second substrate 1820 in the z-axis direction. According to an embodiment, the number of the plurality of layers of the second substrate 1820 may be variably changed depending upon the components included therein. For example, in case where the second substrate 1820 includes the feeding lines 1847, the number of the plurality of layers of the second substrate 1820 may be increased compared to a case where the second substrate 1820 does not include the feeding lines 1847.

According to an embodiment, the RFICs 1830 may generate an RF signal for radiating through the antenna elements 1840. For example, the signal generated by the first RFIC 1830-1 may be transferred to the first antenna element 1840-1 through the signal line 1815-1 of the first substrate 1810, the feeding line 1847-1 of the second substrate 1820, and the signal line 1845-1. For example, the signal generated by the second RFIC 1830-2 may be transferred to the second antenna element 1840-2 through the signal line 1815-2 of the first substrate 1810, the feeding line 1847-2 of the second substrate 1820, and the signal line 1845-2. According to an embodiment, the first RFIC 1830-1 connected to the first antenna element 1840-1 and the second RFIC 1830-2 connected to the second antenna element 1840-2 may generate the same signal as each other. For example, in order to transmit a signal with beamforming, the RU module 400 may transmit the same signal through a plurality of antenna elements 1840. The same signal may represent a signal including the same information or data. In this circumstance, the first RFIC 1830-1 and the second RFIC 1830-2 may be referred to as one set of RFICs. As described above, the first RFIC 1830-1 and the second RFIC 1830-2 may be configured of one RFIC. A plurality of signals generated by the one RFIC may be radiated through the first antenna element 1840-1 and the second antenna element 1840-2.

Referring to the above description, the example 1800 illustrates the RU module 400 in which the first RFIC 1830-1 of the two RFICs 1830 is connected to the antenna element 1840-1 and the second RFIC 1830-2 thereof is connected to the antenna element 1840-2. However, the embodiments of the disclosure are not limited thereto. For example, the RU module 400 may be configured such that one RFIC is connected to the antenna elements (1840-1, 1840-2). Alternatively, the first RFIC 1830-1 may be connected to a plurality of antenna elements including the first antenna element 1840-1, and the second RFIC 1830-2 may be connected to a plurality of antenna elements including the second antenna element 1840-2.

According to an embodiment, the antenna elements 1840 may be disposed on the second substrate 1820. For example, the antenna elements 1840 may be disposed on the plurality of first layers of the second substrate 1820. For example, the antenna elements 1840 may be disposed on one first layer of the second substrate 1820.

According to an embodiment, the antenna elements 1840 may be connected to the feeding lines (1847-1, 1847-2) through the signal lines (1845-1, 1845-2). For example, the first antenna element 1840-1 may be connected to the feeding line 1847-1 through the signal line 1845-1. The second antenna element 1840-2 may be connected to the feeding line 1847-2 through the signal line 1845-2. For example, the signal line may include a coaxial plated through hole (PTH). The signal line may be referred to as a via hole.

The example 1800 of FIG. 18 shows, unlike the example 1400 of FIG. 14, that a signal may be transferred from the signal line to the antenna element through an indirect feeding scheme. According to an embodiment, the antenna elements 1840 may be electrically connected to the signal lines (1845-1, 1845-2). For example, the first radiator 1841-1 of the first antenna element 1840-1 may be indirectly coupled with the signal line 1845-1 (see 1846-1). For example, the first radiator 1841-2 of the second antenna element 1840-2 may be indirectly coupled with the signal line 1845-2 (see 1846-2). Such an indirect coupling may refer to a state of coupling in which the antenna element and the signal line are not physically connected directly with each other, but a signal can be electrically transmitted therebetween.

According to an embodiment, each antenna element of the antenna elements 1840 may include a plurality of radiators. For example, the first antenna element 1840-1 of the antenna elements 1840 may include a first radiator 1841-1 electrically connected to the signal lines 1815-1, the feeding lines

1847-1, and the signal lines 1845-1. The first antenna element 1840-1 may include at least one second radiator coupled with the first radiator 1841-1. For example, the first antenna element 1840-1 may include second radiators (1842-1, 1843-1) coupled with the first radiator 1841-1. The first radiator 1841-1 may be disposed on the layer #2. The second radiator 1842-1 may be disposed on the layer #1. The second radiator 1843-1 may be disposed on the layer #3. For example, the second antenna element 1840-2 of the antenna elements 1840 may include a first radiator 1841-2 electrically connected to the signal lines 1815-2, the feeding lines 1847-2, and the signal lines 1845-2. The second antenna element 1840-2 may include at least one second radiator coupled with the first radiator 1841-2. For example, the second antenna element 1840-2 may include second radiators (1842-2, 1843-2) coupled with the first radiator 1841-2. The first radiator 1841-2 may be disposed on the layer #2. The second radiator 1842-2 may be disposed on the layer #1. The second radiator 1843-2 may be disposed on the layer #3. The plurality of second radiators may represent a radiator for adjunctively radiating a signal radiated from the first radiator. The first radiator may be referred to as a main radiator. The at least one second radiator may be referred to as a sub radiator for the first radiator. For example, the antenna elements 1840 may include a patch antenna, a dipole antenna, or a magneto-electric (ME) dipole antenna.

According to an embodiment, the conductivity members 1850 may be disposed between the antenna elements 1840. For example, the conductivity member 1850-1 may be disposed in a region between the first antenna element 1840-1 and the second antenna element 1840-2. For example, the region may include a position in which a distance spaced apart from the first antenna element 1840-1 and a distance spaced apart from the second antenna element 1840-2 are the same as each other. In other words, the region may represent an area including a center point between the center of the first antenna element 1840-1 and the center of the second antenna element 1840-2. FIG. 18 illustrates only two antenna elements (1840-1, 1840-2) for convenience of description, but the second substrate 1820 may include a greater number of antenna elements 1840. Accordingly, the conductivity member 1850-2 may be disposed in a region between the second antenna element 1840-2 and another antenna element, and the conductivity member 1850-3 may be disposed in a region between the first antenna element 1840-1 and another antenna element.

According to an embodiment, the conductivity members 1850 may be disposed on the plurality of second layers of the second substrate 1820. The conductivity members 1850 may have various shapes. For example, in the example 1800 of FIG. 18, each of the conductivity members 1850 may be formed in a folded shape. However, the embodiments of the disclosure are not limited thereto, and the embodiments of the disclosure may include various shapes of conductivity member as described above with reference to FIGS. 7A to 8B.

According to an embodiment, the conductivity members 1850 may be formed of a conductive material. For example, each of the conductivity members 1850 formed of a conductive material (e.g., copper) may be disposed in a region between the antenna elements to resonate with respect to a signal radiated by each antenna element to generate a signal having a changed phase (or phase and amplitude). For example, when the first antenna element 1840-1 radiates a signal obtained from the first RFIC 1830-1, the conductivity member 1850-1 may generate a signal of which phase is changed with respect to the signal. The changed signal and other signals radiated from the first antenna element 1840-1 and directed to the second antenna element 1840-2 may be offset with each other. For example, the changed signal may be a signal of which phase is inverted by about 180° with respect to the other signal. Further, for example, the changed signal may be a signal of which amplitude and phase are changed with respect to the other signal. The changed phase may be greater than or less than about 180°. Accordingly, interference with the second antenna element 1840-2, which may be caused by the first antenna element 1840-1 radiating a signal, may be reduced.

According to an embodiment, the resonators 1860 may be disposed with respect to each antenna element of the antenna elements 1840. For example, the first resonators 1860-1 may be disposed with respect to the first antenna element 1840-1 across at least a portion of the plurality of second layers. The second resonators 1860-2 may be disposed with respect to the second antenna element 1840-2 across at least a portion of the layers of the plurality of second layers. As in the example 1800, the resonators 1860 may be disposed on a layer different from the layer on which the antenna element is disposed. However, the embodiments of the disclosure are not limited thereto, and the resonators 1860 may be disposed on the same layer as the layer on which the antenna elements are disposed. The resonators 1860 may increase a gain of an antenna element related thereto and expand a frequency band of a signal radiated through the related antenna element. For example, the resonators 1860 may comprise a metamaterial.

Referring to FIGS. 11 to 18, FIGS. 11 to 13 illustrate examples of the RU module 400 including antenna elements having one radiator (e.g., a first radiator). FIGS. 14 to 16 illustrate examples of the RU module 400 including antenna elements having a plurality of radiators (e.g., a first radiator and at least one second radiator). FIGS. 17 to 18 illustrate examples of the RU module 400 utilizing an indirect feeding method (e.g., a coupling method) in transferring an RF signal to an antenna element. The RU module 400 may significantly reduce the interference in between the antenna elements, through at least one decoupling conductivity member disposed between the antenna elements. Accordingly, the electronic device including the decoupling conductivity member according to one or more embodiments of the disclosure can increase a gain of a radiated signal.

Figure 19:
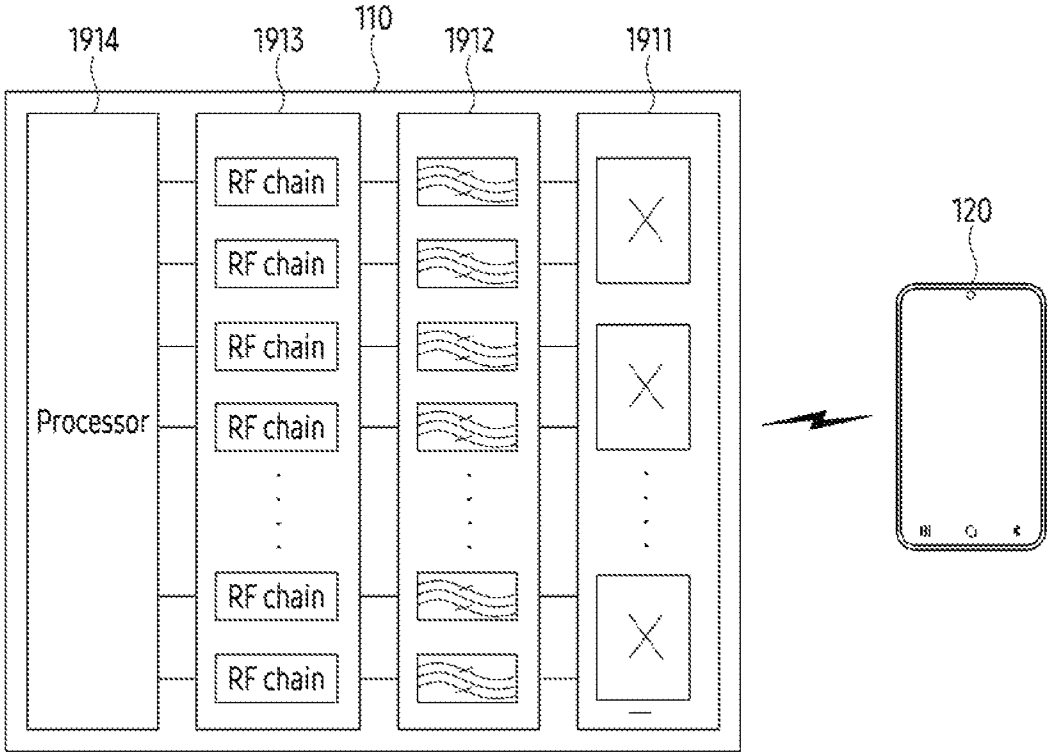
FIG. 19 illustrates an example of a functional configuration of an electronic device including an RU module.

FIG. 19 illustrates an example of a functional configuration of an electronic device including an RU module.

FIG. 19 illustrates an example of a functional configuration of an electronic device according to an embodiment. The electronic device 1910 may be either one of a base station or a terminal. When the electronic device 1910 is a base station, the electronic device 1910 may include a DU (e.g., the DU module 220 of FIG. 2A) and an RU (e.g., the RU module 210 of FIG. 2A or the RU module 400 of FIG. 4). In addition to the RU module described with reference to FIGS. 1 to 18 above, the electronic device including the same will be also included in the embodiments of the disclosure.

Referring to FIG. 19, it is illustrated an example of functional configuration of the electronic device 1910. The electronic device 1910 may include an antenna unit 1911, a filter unit 1912, a radio frequency (RF) processing unit 1913, and a controller 1914.

The antenna unit 1911 may include a plurality of antennas. The antenna performs functions for transmitting and receiving signals through a wireless channel. The antenna may include a radiator including a conductor or a conductive pattern formed on a substrate (e.g., an antenna PCB, an antenna substrate, the second substrate, etc.). The antenna may radiate an up-converted signal over the wireless channel or acquire a signal radiated by another device. Each antenna may be referred to as an antenna element or an antenna device. In some embodiments, the antenna unit 1911 may include an antenna array (e.g., a sub array) in which a plurality of antenna elements form an array. The antenna unit 1911 may be electrically connected to the filter unit 1912 through RF signal lines. The antenna unit 1911 may be mounted on a PCB including a plurality of antenna elements. The PCB may include a plurality of RF signal lines for connecting each antenna element and a filter of the filter unit 1912. These RF signal lines may be referred to as a feeding network. The antenna unit 1911 may provide the received signal to the filter unit 1912 or radiate the signal provided from the filter unit 1912 into the air. The antenna elements, the decoupling conductivity members, and the resonators of the electronic device according to an embodiment of the disclosure may be included in a region on which the antenna unit 1911 is disposed on the antenna substrate (or the second substrate).

According to embodiments, the antenna unit 1911 may include at least one antenna module having a dual-polarized antenna. The dual-polarized antenna may be, for example, a cross-pol (x-pol) antenna. The dual-polarized antenna may include two antenna elements corresponding to different polarized waves. For example, the dual-polarized antenna may include a first antenna element having a polarization of +45° and a second antenna element having a polarization of −45°. It is to be well appreciated that the polarization may be formed of other orthogonal polarizations in addition to +45° and −45°. Each antenna element may be connected to a feeding line and electrically connected to the filter unit 1912, the RF processing unit 1913, and the controller 1914 to be described later.

The dual-polarized antenna may be a patch antenna (or a microstrip antenna). The dual-polarized antenna having the form of a patch antenna may be easily implemented and integrated into an array antenna. Two signals having different polarizations may be input to each antenna port. Each antenna port corresponds to an antenna element. For high efficiency, it is required to optimize the relationship between co-pol characteristics and cross-pol characteristics in between two signals having different polarizations. In the dual-polarized antenna, the co-pol characteristics represent the characteristics for a particular polarization component and the cross-pol characteristic represent the characteristics for a polarization component different from the particular polarization component.

The filter unit 1912 may perform filtering to transfer a desired frequency of signal. The filter unit 1912 may perform a function for selectively identifying a frequency by forming resonance. In some embodiments, the filter unit 1912 may form the resonance through a cavity including a dielectric structurally. Further, in some embodiments, the filter unit 1912 may form the resonance through elements forming inductance or capacitance. Furthermore, in some embodiments, the filter unit 1912 may include an elastic filter, such as a bulk acoustic wave (BAW) filter or a surface acoustic wave (SAW) filter. The filter unit 1912 may include at least one of a band pass filter, a low pass filter, a high pass filter, or a band reject filter. That is, the filter unit 1912 may include RF circuits for obtaining a signal of a frequency band for transmission or a frequency band for reception. The filter unit 1912 according to one or more embodiments may electrically connect the antenna unit 1911 and the RF processing unit 1913.

The RF processing unit 1913 may include a plurality of RF paths. The RF path may be a unit of a path through which a signal received through an antenna or a signal radiated through an antenna passes. At least one RF path may be referred to as an RF chain. The RF chain may include a plurality of RF elements. The RF elements may include an amplifier, a mixer, an oscillator, a DAC, an ADC, or the like. For example, the RF processing unit 1913 may include an up converter for up-converting a baseband digital transmission signal to a transmission frequency, and a digital-to-analog converter (DAC) for converting the up-converted digital transmission signal into an analog RF transmission signal. The up converter and the DAC form part of the transmission path. The transmission path may further include a power amplifier (PA) or a coupler (or combiner). Further, for example, the RF processing unit 1913 may include an analog-to-digital converter (ADC) for converting an analog RF reception signal into a digital reception signal and a down converter for converting the digital reception signal into a baseband digital reception signal. The ADC and the down converter form part of the reception path. The reception path may further include a low-noise amplifier (LNA) or a coupler (or divider). RF components of the RF processing unit may be implemented in a PCB. The electronic device 1910 may have a structure stacked in the order of the antenna unit 1911, the filter unit 1912, and the RF processing unit 1913. The antennas and the RF components of the RF processing unit may be implemented on a PCB, and the filters may be repeatedly coupled between the PCBs to form a plurality of layers. The RFIC of the electronic device according to the embodiments of the disclosure may be included in the RF processing unit 1913.

The controller 1914 may control overall operations of the electronic device 1910. The controller 1914 may include various modules for performing communication. The controller 1914 may include at least one processor such as a modem. The controller 1914 may include modules for digital signal processing. For example, the controller 1914 may include a modem. Upon transmitting of data, the controller 1914 may generate complex symbols by encoding and modulating a transmit bit string. Further, for example, upon receiving of data, the controller 1914 may restore a receive bit string through demodulation and decoding of the baseband signal. The controller 1914 may perform functions of protocol stacks that are required by the communication standard.

Referring to FIG. 19, it has been described an example of a functional configuration of the electronic device 1910. However, the example shown in FIG. 19 merely shows an example of a functional configuration of the electronic device including the decoupling conductivity member according to the embodiments of the disclosure described with reference to FIGS. 1 to 18, and the embodiments of the disclosure are not limited to the components of the equipment shown in FIG. 19. Accordingly, an RU module including the decoupling conductivity member according to the embodiments of the disclosure, a structure of communication equipment including the same, and communication equipment including the same are to be also understood as embodiments of the disclosure.

An RU module including a decoupling conductivity member (or a decoupling resonator) according to an embodiment of the disclosure and an electronic device including the same may include the decoupling conductivity member disposed across a plurality of layers of a substrate including the layer on which an antenna element is disposed, as opposed to the structure having a decoupling structure arranged on a substrate on which the antenna element is disposed and another substrate on a path in which the antenna element radiates a signal. Further, an RU module including a decoupling conductivity member according to an embodiment of the disclosure and an electronic device including the same may include an antenna element and a decoupling conductivity member across at least a portion of a plurality of layers included in a substrate, as opposed to the structure in which the antenna element and the decoupling structure are disposed on a substrate. An RU module including a decoupling conductivity member according to an embodiment of the disclosure and an electronic device including the same may include the decoupling conductivity member in a region between the antenna elements. An RU module including a decoupling conductivity member according to an embodiment of the disclosure and an electronic device including the same may reduce the interference between the antenna elements and enhance the gain of signals radiated by the antenna element, through phase cancellation interference owing to the resonance caused by the decoupling conductivity member.

As described above, a module (a RU module) may comprise a first substrate. The module may include a second substrate on which a plurality of antenna elements are mounted or disposed. The plurality of antenna elements may include a first antenna element and a second antenna element. The module may include a radio frequency integrated circuit (RFIC). The RFIC may be coupled to a first surface of the first substrate. The second substrate may be coupled to a second surface opposite to the first surface of the first substrate. The second substrate may include the plurality of antenna elements disposed on at least one first layer of a plurality of layers of the second substrate. The second substrate may include a plurality of conductivity members disposed across a plurality of second layers including the at least one first layer. The plurality of conductivity members may include a conductivity member formed across an area in the plurality of the second layers, the conductivity member being disposed between the first antenna element and the second antenna element.

According to an embodiment, the second substrate may include a feeding line for transferring a signal to the plurality of antenna elements, the feeding line being formed on a third layer different from the at least one first layer and the plurality of the second layers of the plurality of layers.

According to an embodiment, the first substrate may include a feeding line for transferring a signal to the plurality of antenna elements, the feeding line formed on a third layer corresponding to the second surface among a plurality of other layers of the first substrate.

According to an embodiment, the plurality of the second layers may include a first portion layer, a second portion layer, and a third portion layer. Each of the plurality of the conductivity members may include a first portion extending along the first portion layer and included in the first portion layer, second portions connected to each of two ends of the first portion through a via, each of the second portions extended along the second portion layer, and third portions connected to each of the second portions through a via, each of the third portions extending along the third portion layer.

According to an embodiment, a sum of lengths of the first portion, the second portions, and the third portions may be identified based on a wavelength of a signal transferred from the RFIC.

According to an embodiment, each of the plurality of the conductivity members may be positioned on the area spaced apart from each other by a same distance from each of two antenna elements consecutively disposed in a first direction or a second direction perpendicular to the first direction among the plurality of the antenna elements.

According to an embodiment, the first substrate may include a plurality of other layers. Each of the plurality of the antenna elements may be coupled to the RFIC and may be configured to receive a signal through a signal line formed across the plurality of the other layers. The signal line may include a coaxial plated through hole (PTH).

According to an embodiment, the number of the plurality of the other layers of the first substrate may be more than the number of the plurality of the layers of the second substrate.

According to an embodiment, the second substrate may be coupled to a ball grid array (BGA) on the second surface of the first substrate. The third layer may include a layer directly coupled to the BGA or a layer coupled to the BGA through a via. The feeding line may extend along the third layer and may be coupled to a corresponding antenna element of the plurality of the antenna elements, the feeding line coupled to the BGA.

According to an embodiment, each of the plurality of the antenna elements may include a first radiator and at least one second radiator. The first radiator may be coupled to a feeding line for transferring a signal to the plurality of the antenna elements through another signal line formed across the plurality of the layers of the second substrate. The at least one second radiator may be coupled with the first radiator.

According to an embodiment, the first radiator may be disposed on a layer different from the at least one first layer in which the at least one second radiator is disposed.

According to an embodiment, each of the plurality of the antenna elements may include a magneto-electric (ME) dipole antenna.

According to an embodiment, the plurality of the second layers may include a layer corresponding to a second surface of the second substrate opposite to a first layer of the second substrate coupled to the second surface of the first substrate.

According to an embodiment, the module may further include a plurality of resonators disposed on at least one layer of the plurality of the second layers with respect to each antenna element of the plurality of the antenna elements.

According to an embodiment, the plurality of the resonators may be included in another area different from the area.

As described above, an electronic device for a base station may comprise a power supply. The base station may comprise a processor. The electronic device may comprise a first substrate coupled to the power supply and the processor. The electronic device may comprise a plurality of radio frequency integrated circuits (RFICs) coupled to a first surface of the first substrate. The electronic device may comprise a plurality of second substrates coupled to a second surface opposite to the first surface of the first substrate. Each of the plurality of the second substrates may be coupled to an RFIC of the plurality of the RFICs. Each of the plurality of the second substrates may include a plurality of antenna elements disposed on at least one first layer of a plurality of layers of the second substrate. Each of the plurality of the second substrates may include a plurality of conductivity members disposed across a plurality of second layers including the at least one first layer. The plurality of the antenna elements may include a first antenna element and a second antenna elements. The plurality of conductivity members may include a conductivity member formed across an area in the plurality of the second layers, the conductivity member disposed between the first antenna element and the second antenna element.

According to an embodiment, each of the plurality of the second substrates may include a feeding line for transferring a signal to the plurality of antenna elements, the feeding line formed on a third layer different from the at least one first layer and the plurality of the second layers of the plurality of layers.

According to an embodiment, the first substrate may include a feeding line for transferring a signal to the plurality of antenna elements, the feeding line formed on a third layer corresponding to the second surface of a plurality of other layers.

According to an embodiment, the plurality of the second layers may include a first portion layer, a second portion layer, and a third portion layer. Each of the plurality of the conductivity members may include a first portion extended along the first portion layer and included in the first portion layer, second portions connected to each of two ends of the first portion through a via, each of the second portions extended along the second portion layer, and third portions connected to each of the second portions through a via, each of the third portions extended along the third portion layer. A sum of lengths of the first portion, the second portions, and the third portions may be identified based on a wavelength of a signal transferred from the RFIC.

According to an embodiment, each of the plurality of the conductivity members may be positioned on the area spaced apart from each other by a same distance from each of two antenna elements consecutively disposed in a first direction or a second direction perpendicular to the first direction among the plurality of the antenna elements.

Methods according to the embodiments described in the claims or specifications of the disclosure may be implemented in the form of hardware, software, or a combination of hardware and software.

When implemented in software, a computer readable storage medium storing one or more programs (software modules) may be provided. One or more programs stored in the computer readable storage medium are configured for execution by one or more processors in the electronic device. The one or more programs include instructions that cause the electronic device to execute methods according to embodiments described in the claims or specification of the disclosure.

These programs (software modules, software) may be stored in random access memory, non-volatile memory including flash memory, read only memory (ROM), electrically erasable programmable read only memory (EEPROM), magnetic disc storage device, compact disc-ROM (CD-ROM), digital versatile discs (DVDs) or other form of optical storage, or magnetic cassette. Alternatively, it may be stored in a memory configured as a combination of some or all of them. In addition, a plurality of each configuration memory may be included.

In addition, the program may be stored in an attachable storage device that may be accessed through a communication network such as the Internet, an intranet, a local area network (LAN), a wide area network (WAN), or a storage area network (SAN), or a communication network configured with a combination thereof. Such a storage device may access a device performing an embodiment of the disclosure through an external port. In addition, a separate storage device on the communication network may access a device performing an embodiment of the disclosure.

In the specific embodiments of the disclosure described above, components included in the disclosure are represented in singular or plural numbers according to the specific embodiments presented. However, singular or plural expressions are selected appropriately for the presented situation for convenience of explanation, the disclosure is not limited to singular or plural components, and even if it is a component expressed in plural, it may be configured with singular, or even if it is a component expressed in singular, it may be configured with plural.

In the detailed description of the disclosure, specific embodiments have been described, but various modifications are possible without departing from the scope of the disclosure.

What is claimed is:

1. A radio unit (RU) module comprising:

a first substrate including a first side and a second side opposite to the first side;

a radio frequency integrated circuit (RFIC);

a plurality of antenna elements including a first antenna element and a second antenna element;

a second substrate including a plurality of layers that includes at least one first layer on which the antenna element and the second antenna element are disposed; and a plurality of conductivity members including a conductivity member, wherein the RFIC is coupled to the first side of the first substrate, wherein the second substrate is coupled to the second side of the first substrate, wherein the conductivity members is disposed across the at least one layers of the second substrate, and wherein the conductivity member is disposed between the first antenna element and the second antenna element that are on the at least one layer of the second substrate.

2. The RU module of claim 1, wherein the second substrate includes a feeding line for transferring a signal to the plurality of antenna elements, and wherein the feeding line is disposed on a layer different from the at least one layer of the plurality of layers.

3. The RU module of claim 2, wherein the second substrate is coupled to a ball grid array (BGA) on the second side of the first substrate, wherein the layer different from the at least one layer includes a layer coupled to the BGA, directly or through a via, wherein the feeding line extends along the layer different from the at least one layer and is coupled to a corresponding antenna element of the plurality of antenna elements, and wherein the feeding line is coupled to the BGA.

4. The RU module of claim 1, wherein the first substrate includes a feeding line for transferring a signal to the plurality of antenna elements, and wherein the feeding line is disposed on a layer corresponding to the second side of the first substrate, the layer being among a plurality of layers of the first substrate.

5. The RU module of claim 1, wherein the at least one layers includes a first portion layer, a second portion layer, and a third portion layer, and wherein the conductivity members includes:

a first portion extending along the first portion layer and included in the first portion layer, second portions connected to each of two ends of the first portion through a via, each of the second portions being extended along the second portion layer, and third portions connected to each of the second portions through a via, each of the third portions being extending along the third portion layer.

6. The RU module of claim 5, wherein, based on a wavelength of a signal transferred from the RFIC, a sum of lengths of the first portion, the second portions, and the third portions is determined.

7. The RU module of claim 1, wherein the conductivity members is disposed on an area spaced apart from each other by a same distance from the first antenna elements and the second antenna element consecutively disposed in a first direction or a second direction perpendicular to the first direction.

8. The RU module of claim 1, wherein the first substrate includes a plurality of other layers, wherein each of the plurality of antenna elements is coupled to the RFIC and is configured to receive a signal through a signal line formed across the plurality of the other layers, and wherein the signal line includes a coaxial plated through hole (PTH).

9. The RU module of claim 8, wherein a number of the plurality of the other layers of the first substrate is higher than a number of the plurality of layers of the second substrate.

10. The RU module of claim 1, wherein each of the plurality of antenna elements includes a first radiator and at least one second radiator, wherein the first radiator is coupled to a feeding line for transferring a signal to the plurality of antenna elements through another signal line disposed across the plurality of layers of the second substrate, and wherein the at least one second radiator is coupled with the first radiator.

11. The RU module of claim 10, wherein the at least one second radiator is disposed in the at least one layer of the second substrate, and wherein the first radiator is disposed on a layer different from the at least one layer of the second substrate.

12. The RU module of claim 1, wherein each of the plurality of antenna elements includes a magneto-electric (ME) dipole antenna.

13. The RU module of claim 1, wherein the at least one layers includes a layer corresponding to a second side of the second substrate, the layer being opposite to the at least first layer of the second substrate coupled to the second side of the first substrate.

14. The RU module of claim 1, further comprising a plurality of resonators disposed on the at least one layer with respect to each of the plurality of antenna elements.

15. The RU module of claim 14, wherein the plurality of resonators are included in a first area that is different from a second area on which the conductivity members is disposed.

16. An electronic device for a base station, comprising:

a power supply;

at least one processor;

a first substrate coupled to the power supply and the at least one processor;

a plurality of radio frequency integrated circuits (RFICs) coupled to a first side of the first substrate; and a plurality of second substrates coupled to a second side of the first substrate, the second side being opposite to the first side of the first substrate, wherein each of the plurality of second substrates is coupled to an RFIC of the plurality of RFICs, wherein each of the plurality of second substrates includes:

a plurality of antenna elements disposed on at least one layer of a plurality of layers of the second substrate; and a plurality of conductivity members disposed across the at least one layer, wherein the plurality of antenna elements includes a first antenna element and a second antenna element, wherein the plurality of conductivity members includes a conductivity member, and wherein at least a portion of the conductivity member is disposed between the first antenna element and the second antenna element that are on the at least one layer of the plurality of layers of the second substrate.

17. The electronic device of claim 16, wherein each of the plurality of second substrates includes a feeding line for transferring a signal to the plurality of antenna elements, and wherein the feeding line is disposed on a layer that is different from the at least one layer of the plurality of layers.

18. The electronic device of claim 16, wherein the first substrate includes a feeding line for transferring a signal to the plurality of antenna elements, and wherein the feeding line is disposed on a layer corresponding to the second side, the layer being one layer of a plurality of other layers.

19. The electronic device of claim 16, wherein the at least one layers includes a first portion layer, a second portion layer, and a third portion layer, wherein each of the plurality of conductivity members includes:

a first portion extended along the first portion layer, the first portion being included in the first portion layer, second portions connected to each of two ends of the first portion through a via, each of the second portions extended along the second portion layer, and third portions connected to each of the second portions through a via, each of the third portions extended along the third portion layer, and wherein, based on a wavelength of a signal transferred from the RFIC, a sum of lengths of the first portion, the second portions, and the third portions is determined.

20. The electronic device of claim 16, wherein each of the plurality of conductivity members is disposed on an area spaced apart from each other by a same distance from each of two antenna elements consecutively disposed in a first direction or a second direction perpendicular to the first direction, the two antenna elements being among the plurality of antenna elements.

* * * * *